Figure 1:
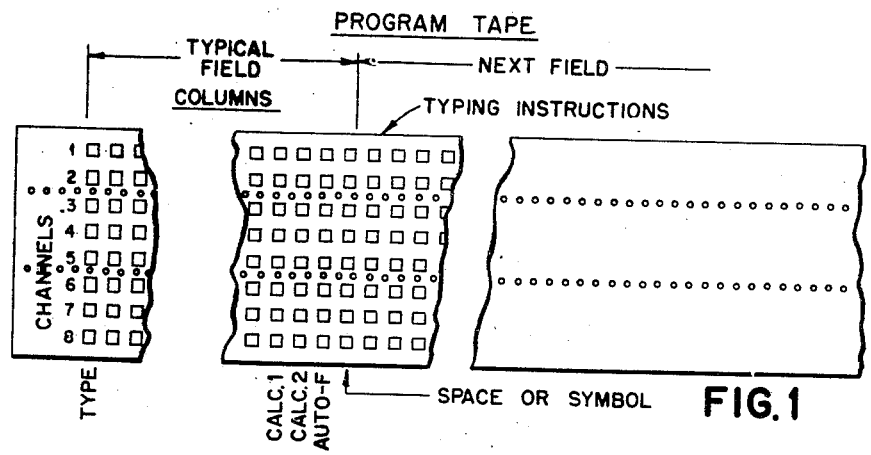

Nov. 14, 1961

F. E. SAKALAY 3,008,635

TYPEWRITING CALCULATING MACHINE

Filed May 17, 1957

58 Sheets-Sheet 1

INVENTOR
FRED. E. SAKALAY
BY John A. Harvey
ATTORNEY

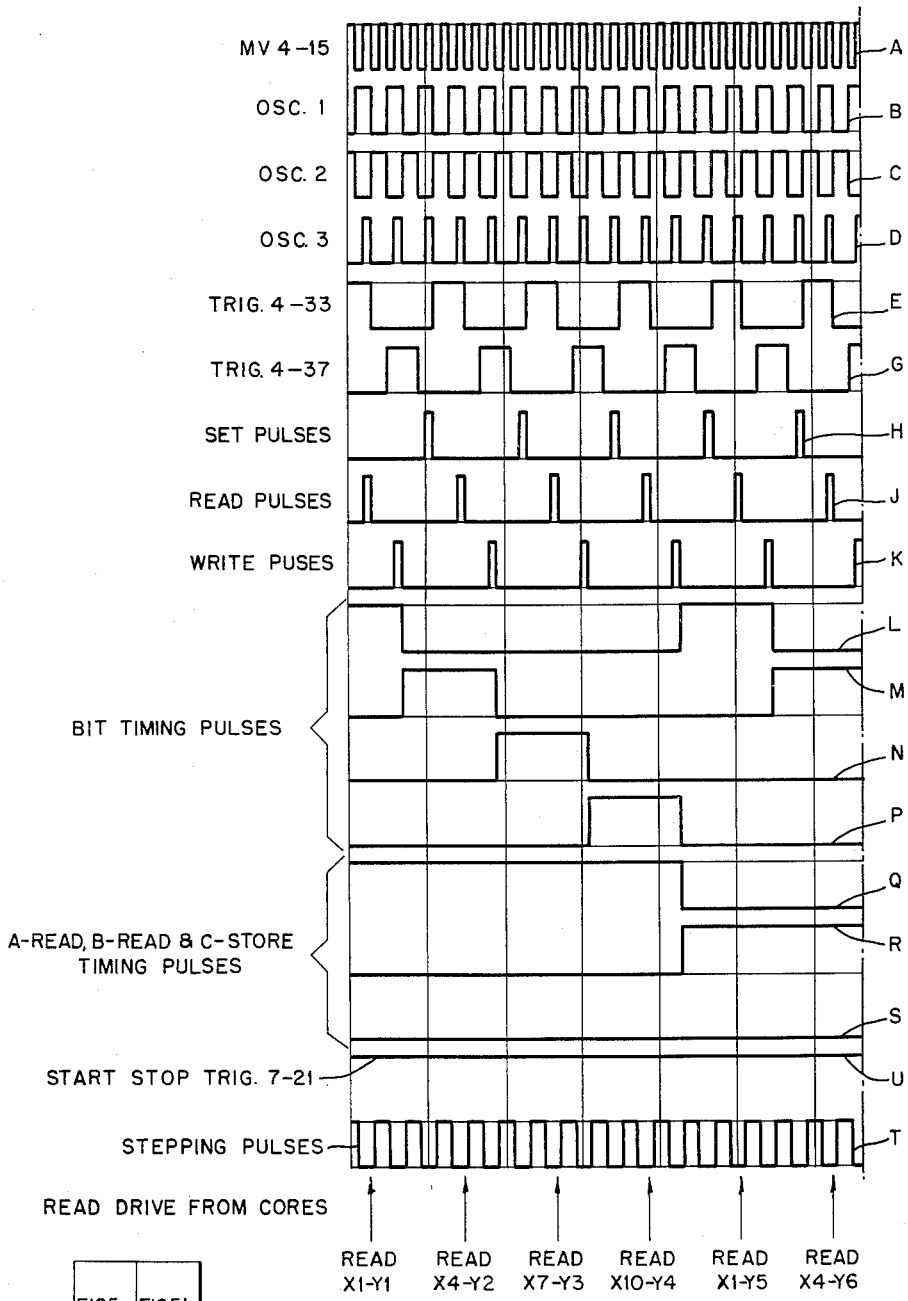

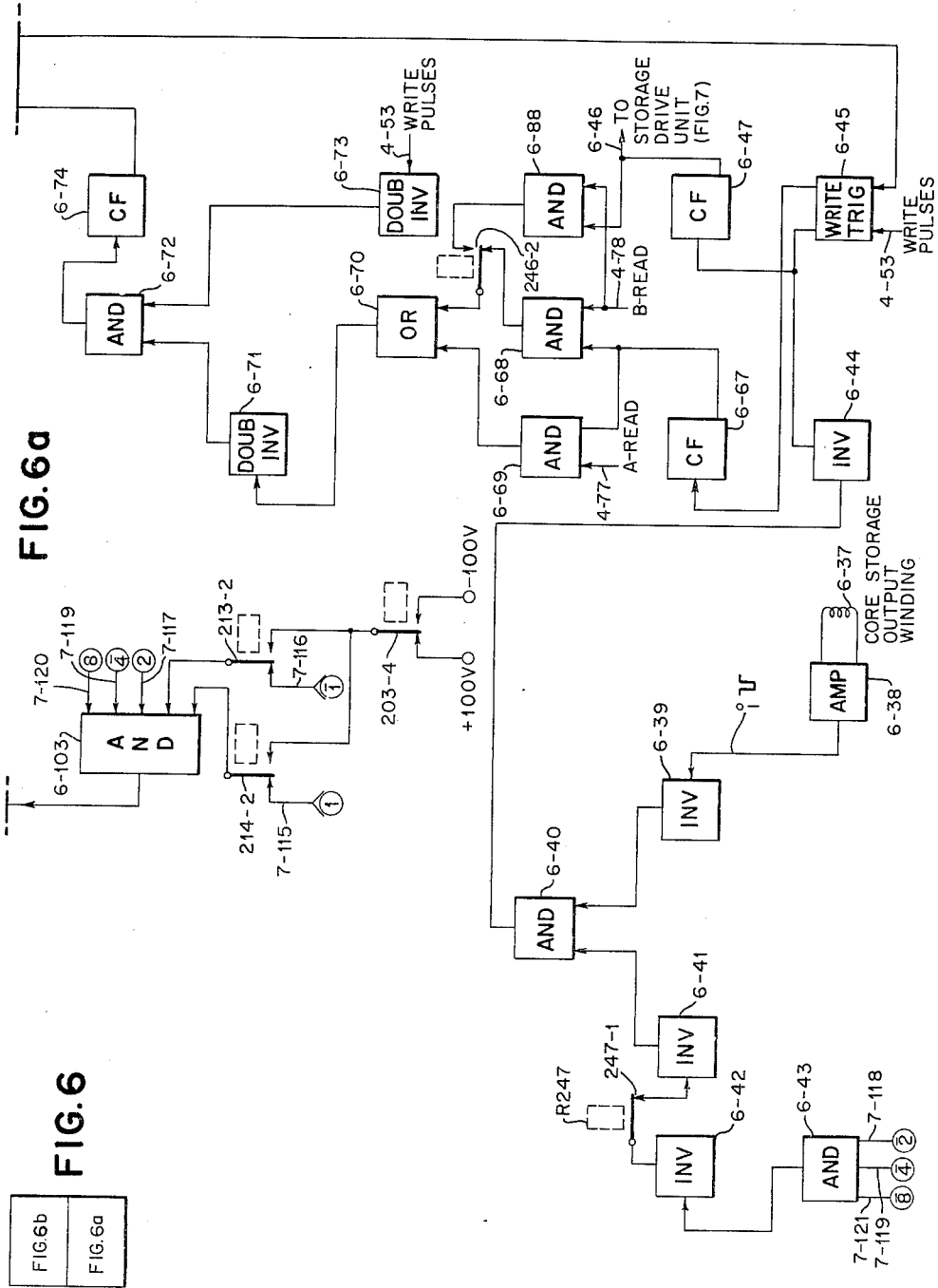

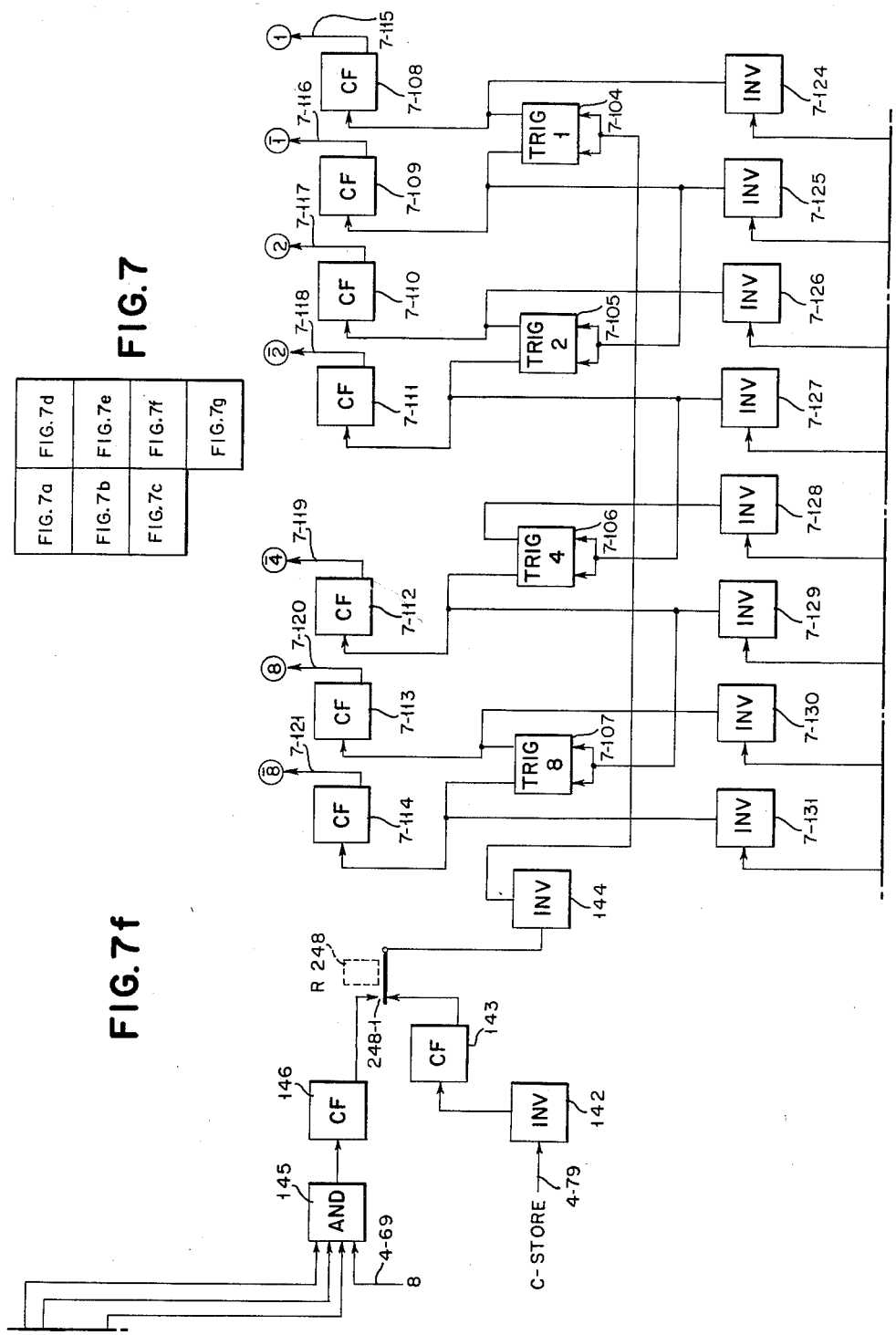

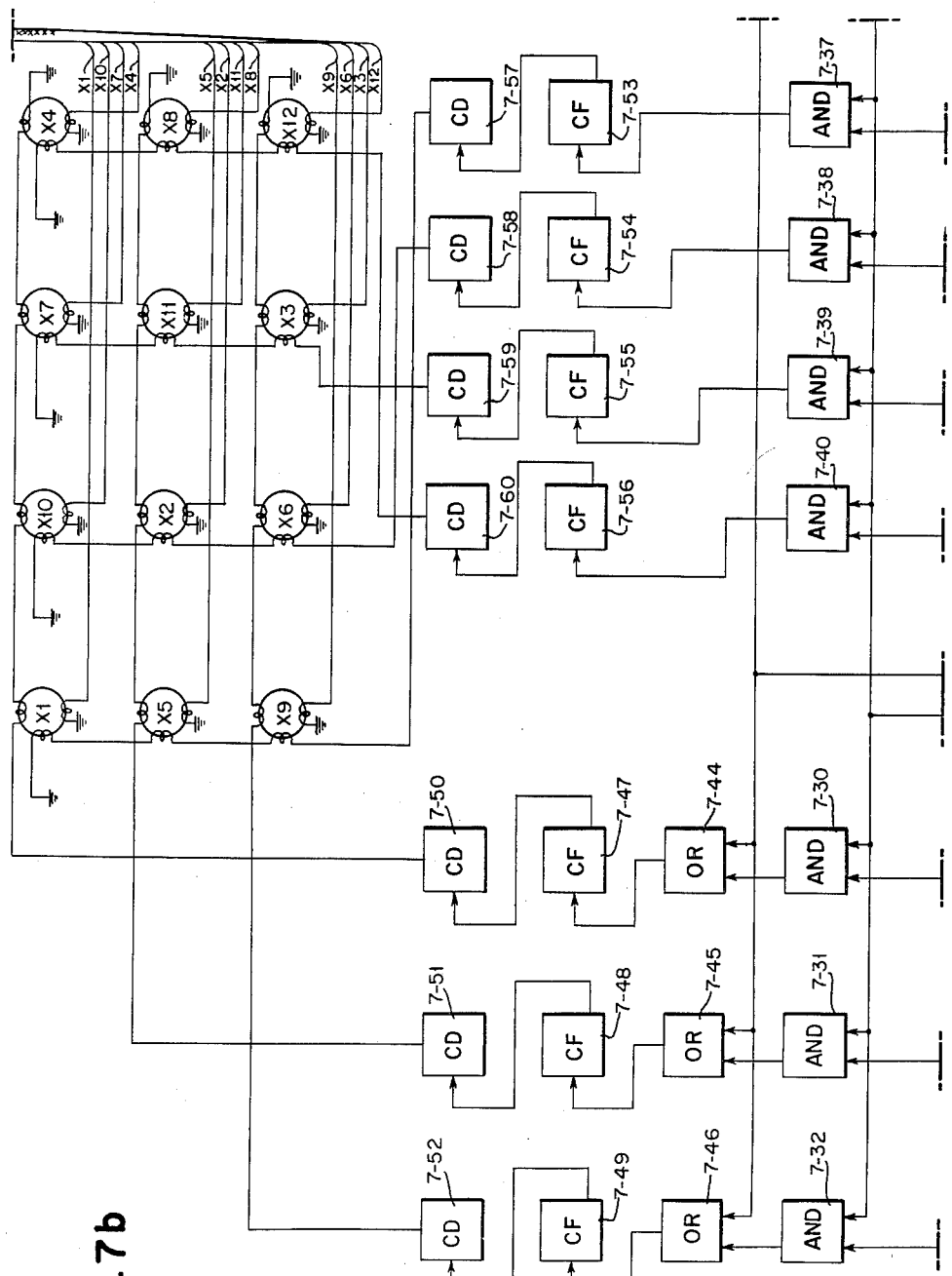

Nov. 14, 1961    F. E. SAKALAY    3,008,635
TYPEWRITING CALCULATING MACHINE
Filed May 17, 1957    58 Sheets-Sheet 15

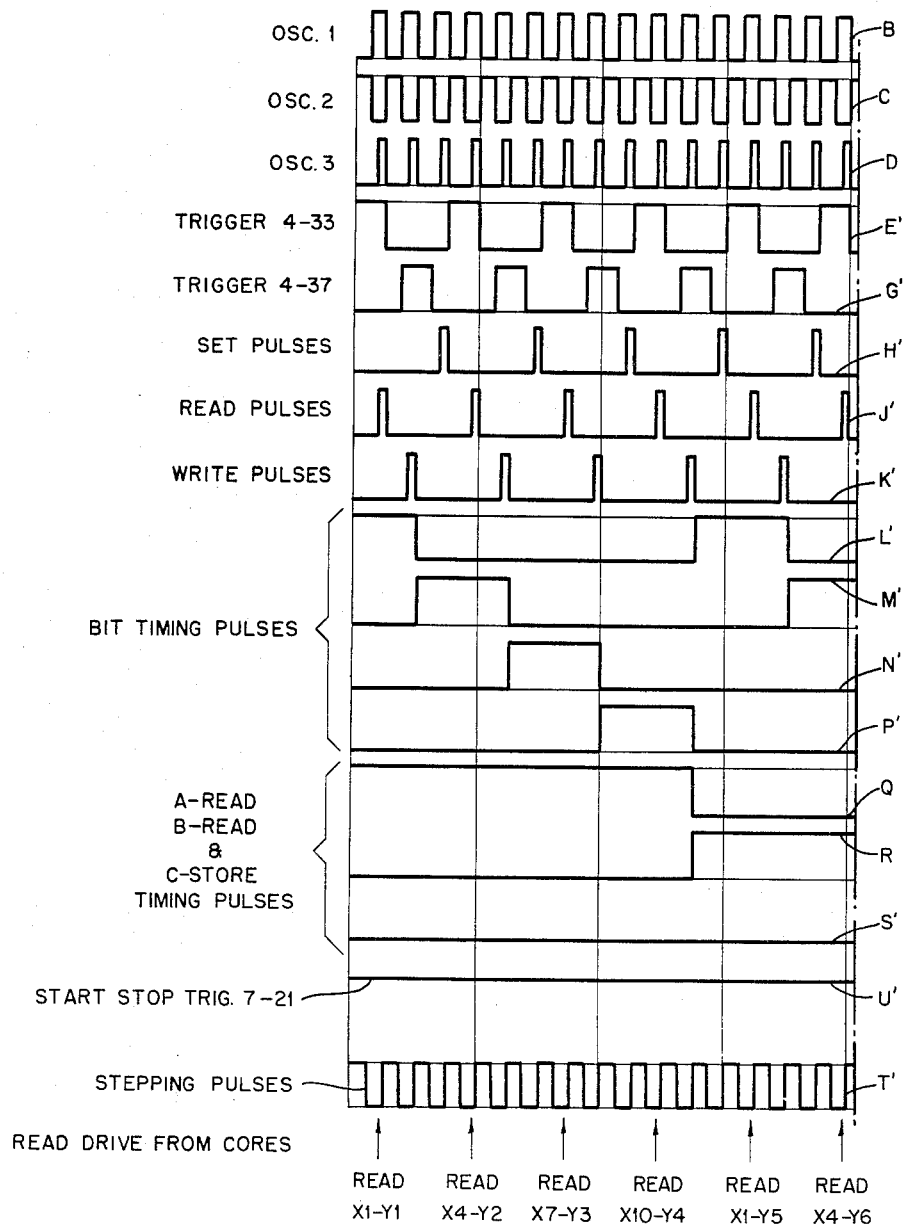
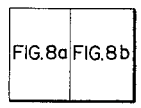
FIG.8

Nov. 14, 1961   F. E. SAKALAY   3,008,635
TYPEWRITING CALCULATING MACHINE
Filed May 17, 1957   58 Sheets-Sheet 18

Nov. 14, 1961  F. E. SAKALAY  3,008,635
TYPEWRITING CALCULATING MACHINE
Filed May 17, 1957  58 Sheets-Sheet 22

FIG.9d

FIG.9e

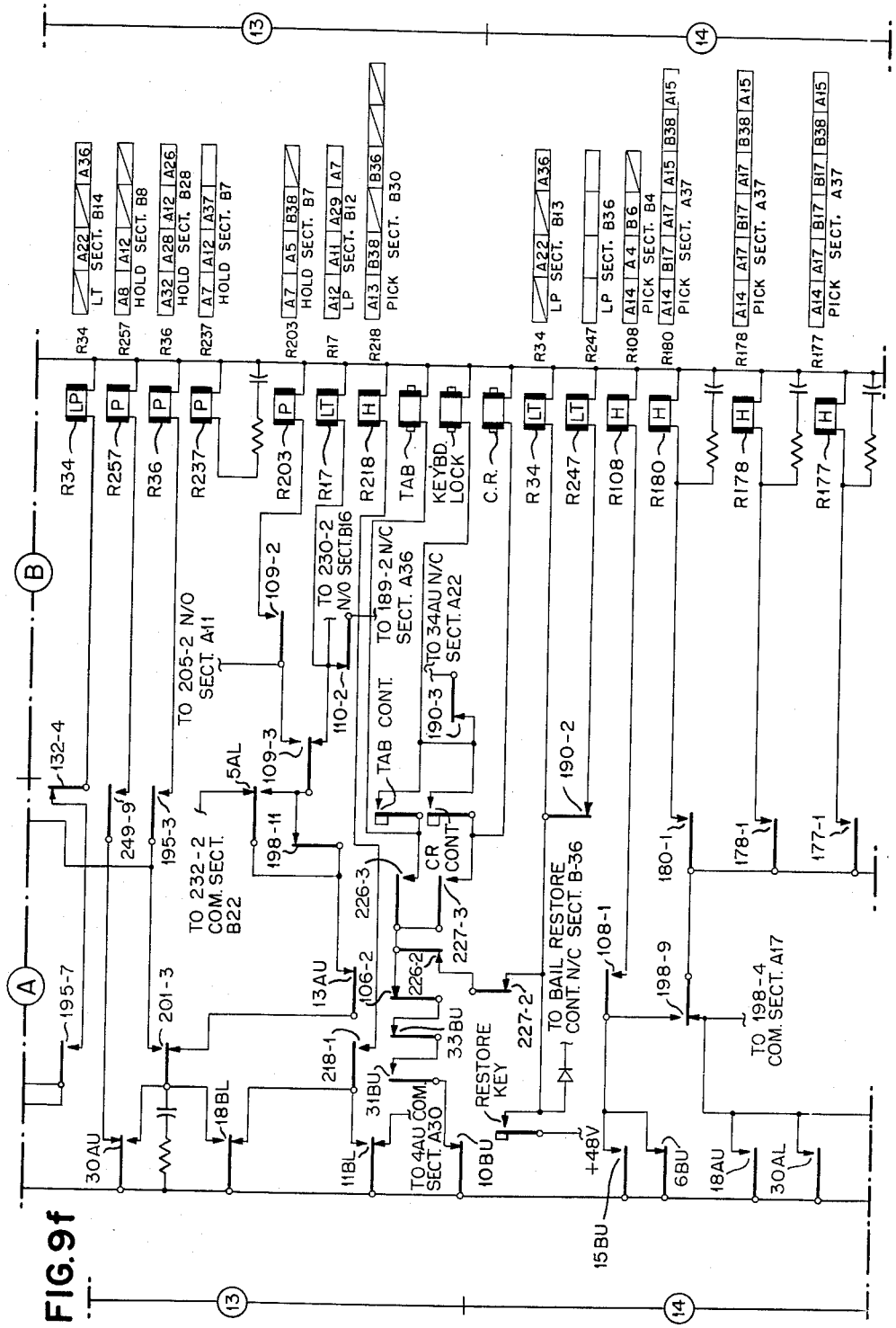

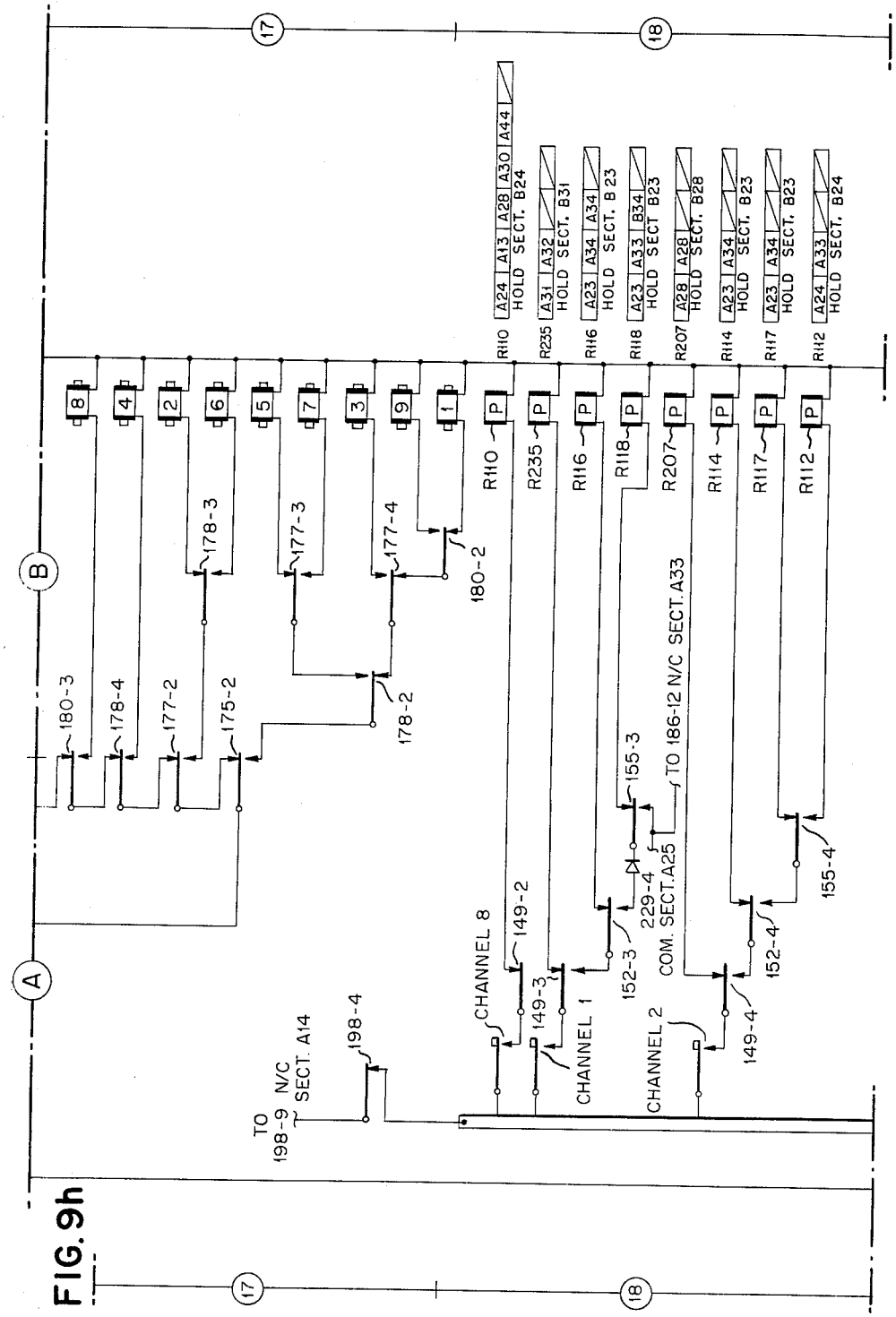

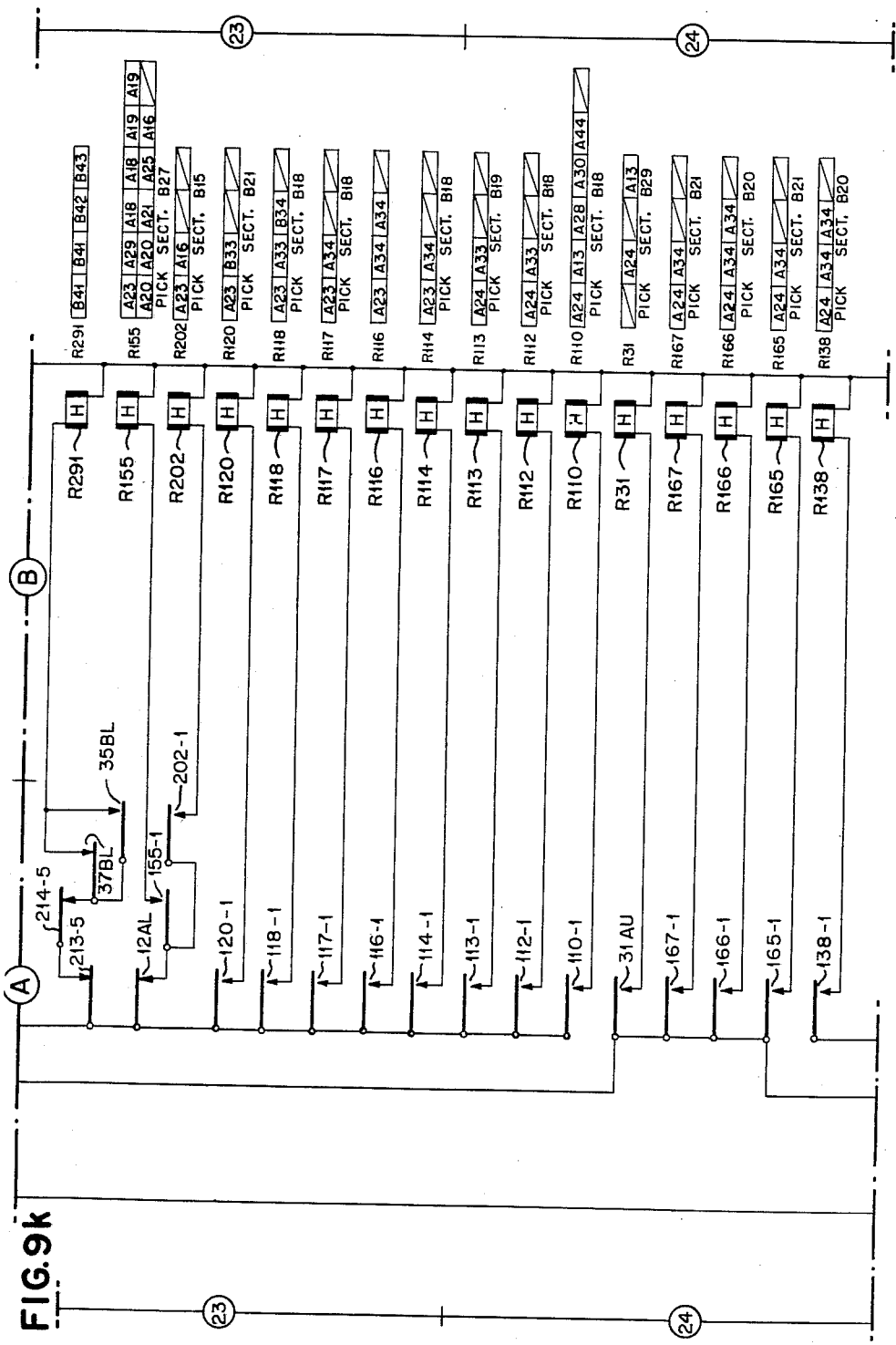

FIG. 9l

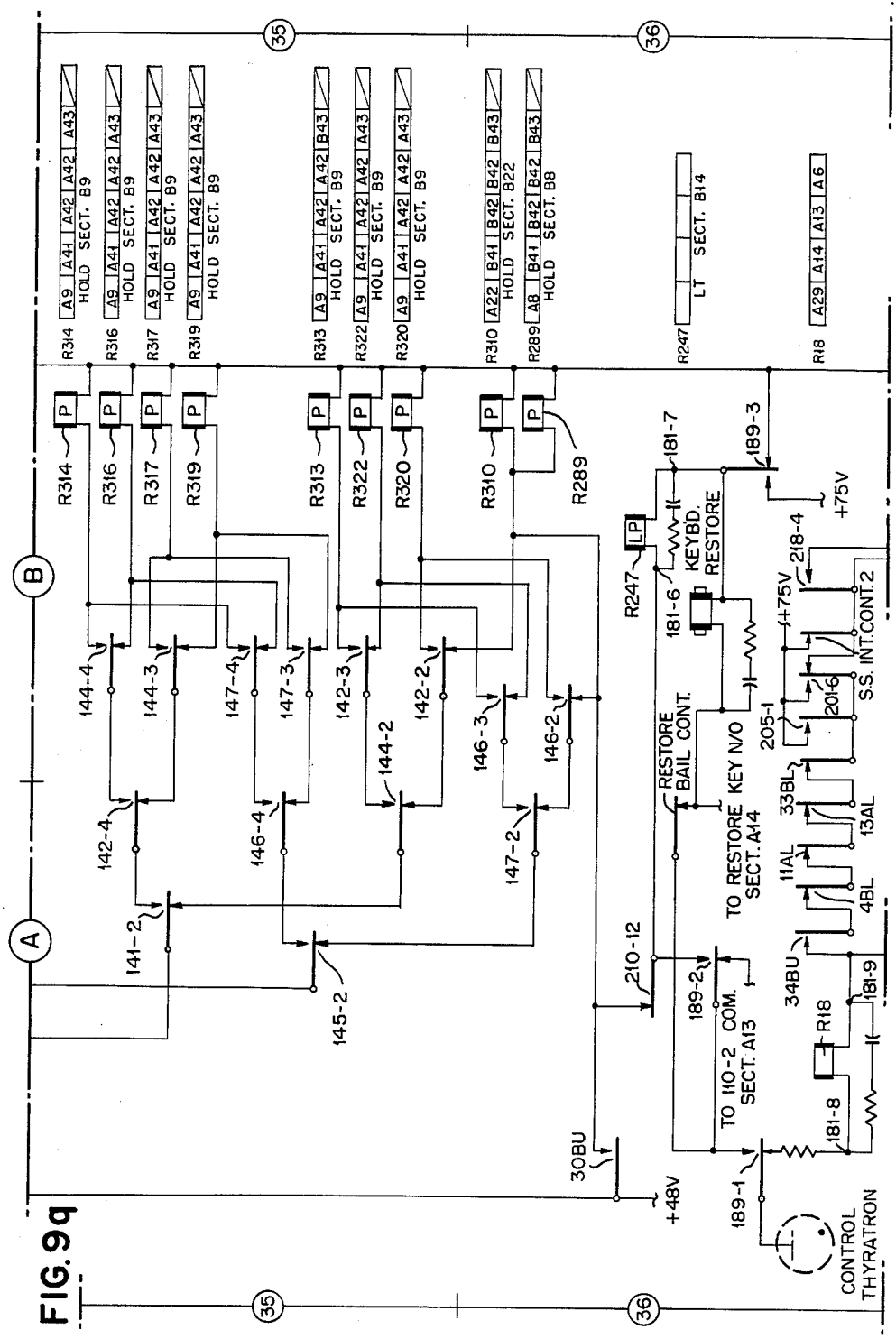

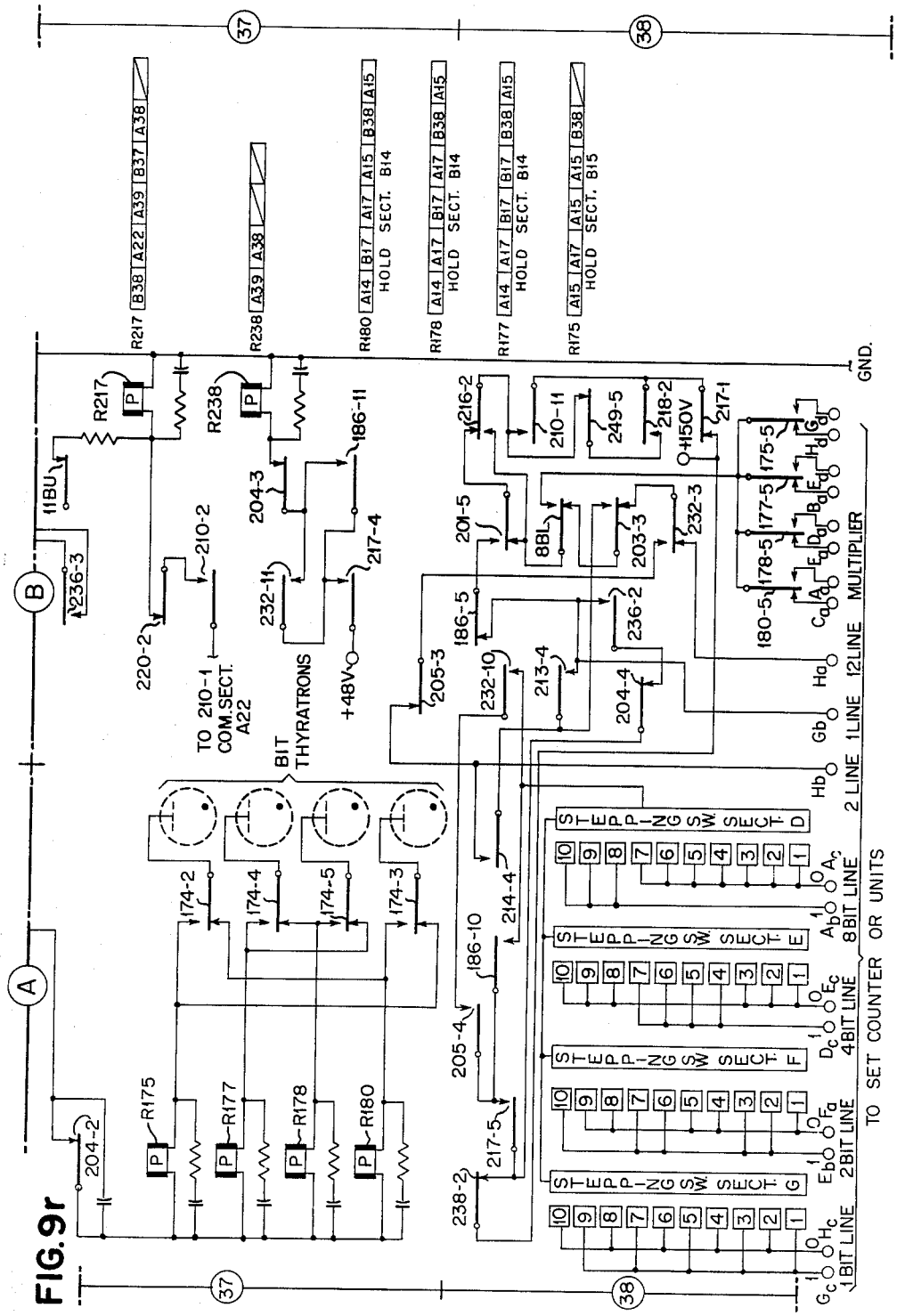

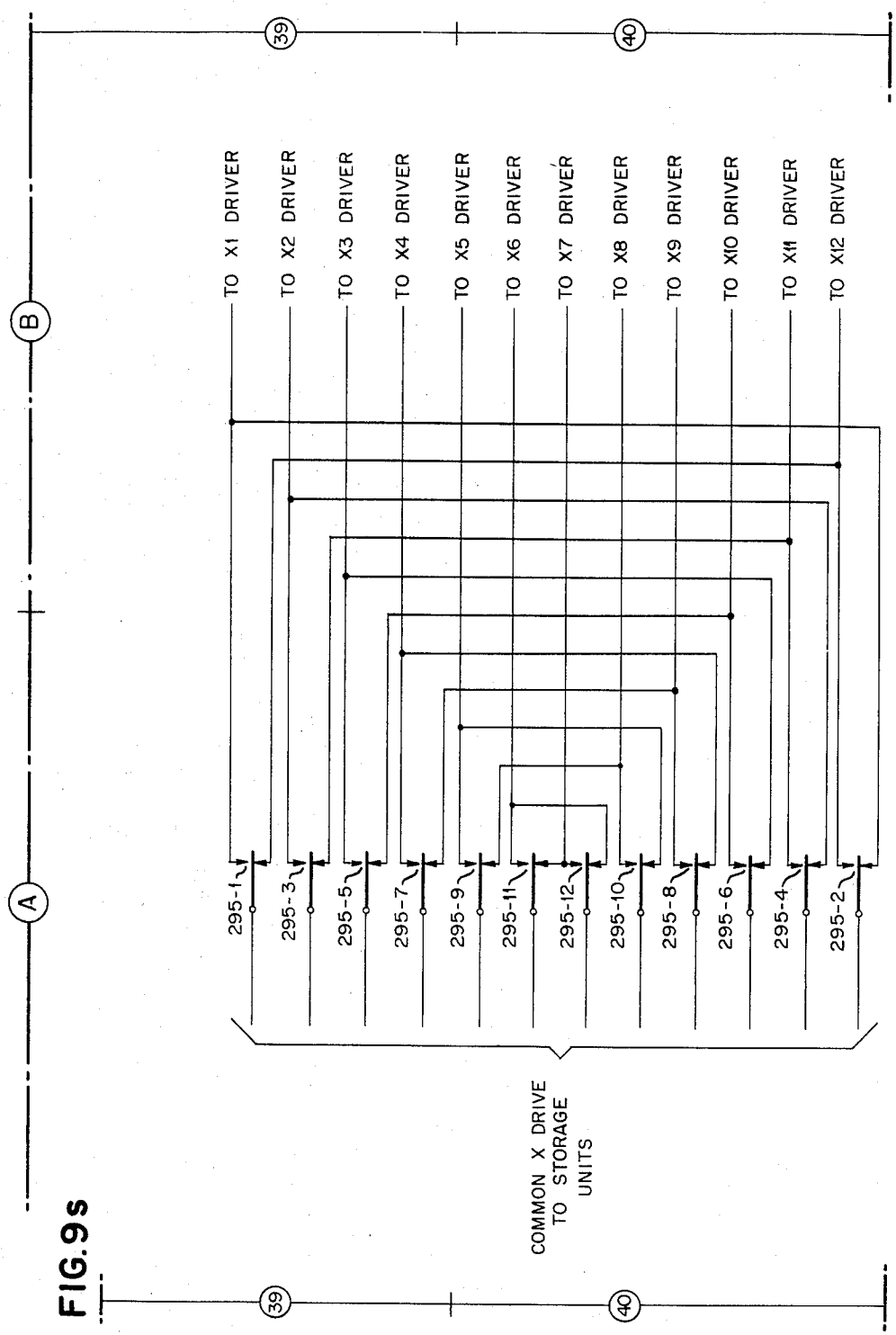

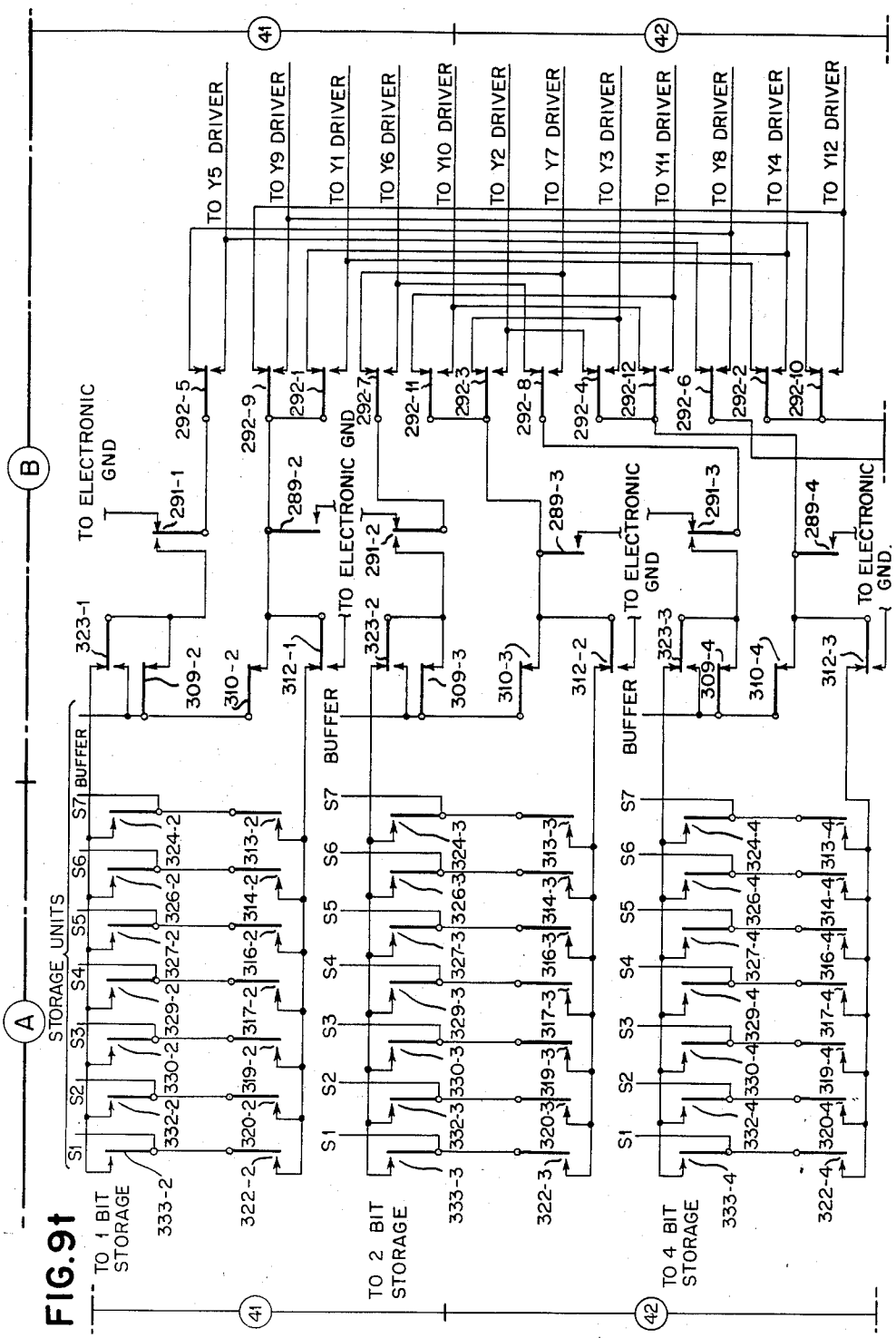

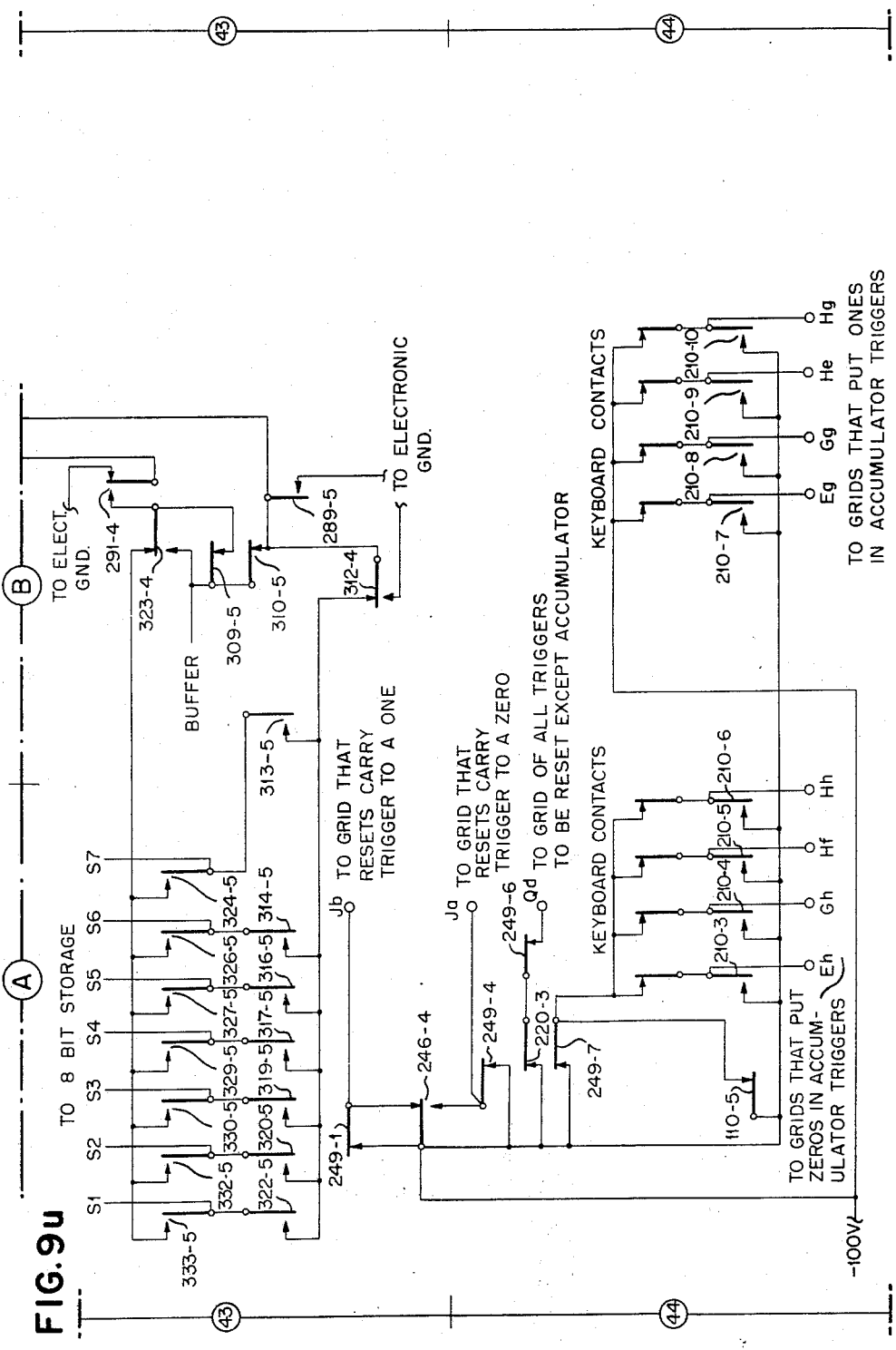

FIG.9v

DUO RELAYS

| RELAY | P | H |
|---|---|---|
| 4 | B10 | B30 |
| 5 | B15 | B6 |
| 6 | B6 | B5 |
| 7 | B34 | B5 |
| 8 | B5 | B6 |
| 9 | B34 | B11 |
| 10 | B11 | B7 |
| 11 | B12 | B10 |
| 12 | B10 | |
| 13 | B11 | B30 |
| 14 | B11 | |
| 15 | B12 | B13 |
| 16 | B12 | |
| 17 | B12 | B12 |
| 18 | A36 | |
| 30 | B21 | B24 |
| 31 | B29 | B4 |
| 32 | B5 | |
| 33 | B3 | B14 |
| 34 | B6 | B6 |
| 35 | B13 | B28 |
| 36 | B13 | B6 |
| 37 | B4 | |

WIRE CONTACT RELAYS

| RELAY | P | H |
|---|---|---|
| 217 | B37 | |
| 218 | B30 | B13 |
| 220 | B22 | |
| 226 | B20 | B26 |
| 227 | B20 | B26 |
| 228 | B32 | B7 |
| 229 | B3 | |
| 230 | B28 | B29 |
| 232 | B5 | B31 |
| 235 | B18 | B6 |
| 236 | B22 | B7 |
| 237 | B13 | |
| 238 | B37 | B8 |
| 246 | B34 | B14 |
| 247 | B36 | |
| 248 | B5 | |
| 249 | B12 | B3 |
| 252 | B3 | B8 |
| 253 | B25 | B8 |
| 257 | B13 | B8 |
| 289 | B36 | B23 |
| 291 | | |
| 292 | B29 | B12 |
| 295 | B29 | B12 |
| 308 | B29 | B12 |
| 309 | B31 | B22 |
| 310 | B36 | |
| 312 | B5 | B9 |
| 313 | B35 | |

| RELAY | P | H |
|---|---|---|
| 314 | B35 | B9 |
| 316 | B35 | B9 |
| 317 | B35 | B9 |
| 319 | B35 | B9 |
| 320 | B35 | B9 |
| 322 | B35 | |
| 323 | B5 | B9 |
| 324 | B34 | B10 |
| 326 | B33 | B10 |
| 327 | B33 | B10 |
| 329 | B33 | B10 |
| 330 | B33 | B10 |
| 332 | B34 | B10 |
| 333 | B34 | B10 |

| RELAY | P | H |
|---|---|---|
| 158 | B11 | B7 |
| 161 | B20 | B32 |
| 162 | B19 | B32 |
| 163 | B19 | B24 |
| 165 | B21 | B24 |
| 166 | B20 | B7 |
| 167 | B21 | B15 |
| 174 | B30 | B14 |
| 175 | A37 | B14 |
| 177 | A37 | B14 |
| 178 | A37 | B14 |
| 180 | A37 | B26 |
| 184 | B29 | |
| 186 | B22 | B26 |
| 189 | B22 | |
| 190 | B19 | B30 |
| 191 | B6 | B25 |
| 195 | B33 | B23 |
| 198 | B21 | B7 |
| 201 | B15 | B22 |
| 202 | B13 | B4 |
| 203 | B13 | B28 |
| 204 | B29 | B22 |
| 205 | B15 | B8 |
| 207 | B18 | B8 |
| 210 | B3 | B8 |
| 213 | B33 | |
| 214 | B33 | |
| 216 | B29 | |

| RELAY | P | H |
|---|---|---|
| 105 | B11 | B11 |
| 106 | B27 | B30 |
| 107 | B16 | B4 |
| 108 | B4 | B14 |
| 109 | B33 | B12 |
| 110 | B18 | B24 |
| 112 | B18 | B24 |
| 113 | B19 | B24 |
| 114 | B18 | B23 |
| 116 | B18 | B23 |
| 117 | B18 | B23 |
| 118 | B18 | B23 |
| 120 | B21 | B27 |
| 121 | B31 | B27 |
| 122 | B31 | B28 |
| 124 | B28 | |
| 125 | B27 | |
| 132 | B12 | B7 |
| 138 | B20 | B24 |
| 139 | B21 | B31 |
| 140 | B20 | B25 |
| 141 | B20 | B25 |
| 142 | B19 | B25 |
| 144 | B19 | B25 |
| 145 | B20 | B25 |
| 146 | B19 | B25 |
| 147 | B19 | B7 |
| 149 | B26 | B7 |
| 152 | B26 | B7 |
| 155 | B27 | B23 |

Nov. 14, 1961
F. E. SAKALAY
3,008,635
TYPEWRITING CALCULATING MACHINE
Filed May 17, 1957
58 Sheets-Sheet 41
FIG. 10a
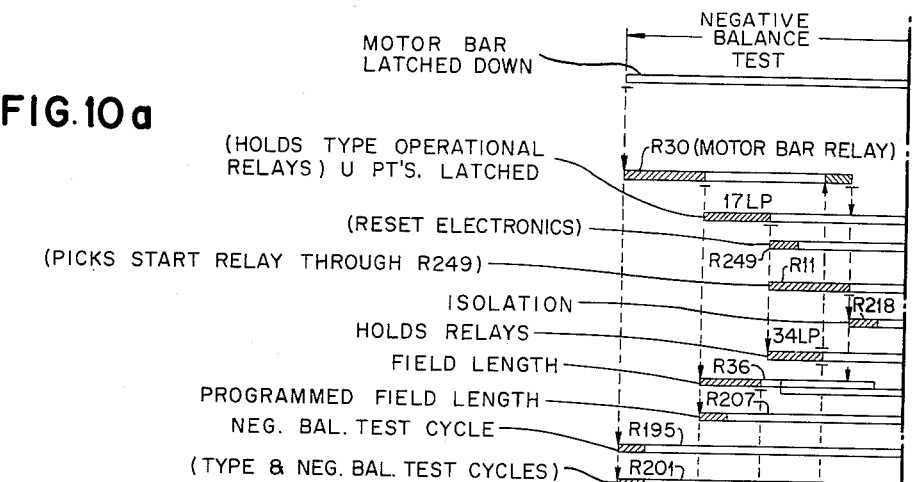
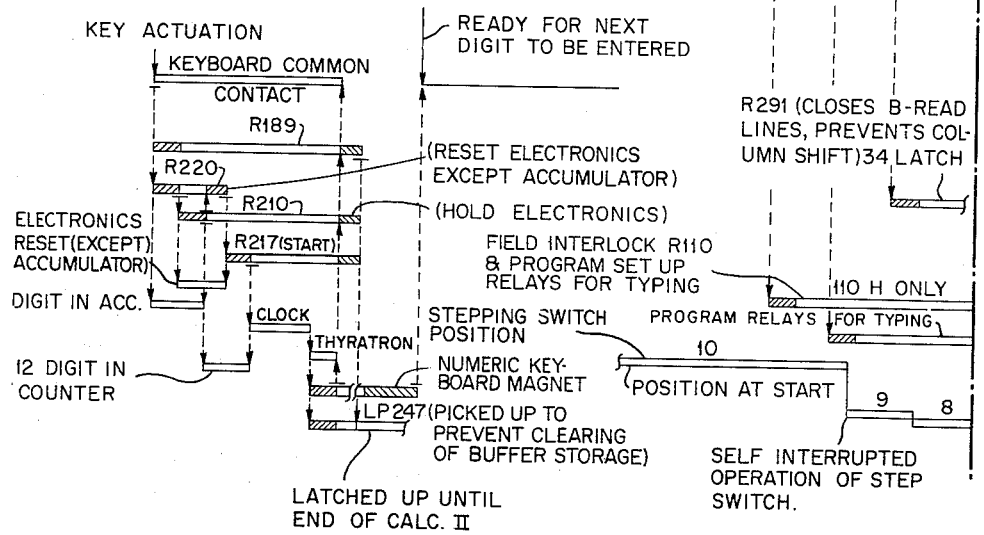
| FIG. 10a | FIG. 10b | FIG. 10c | FIG. 10d | FIG. 10e | FIG. 10f | FIG. 10g | FIG. 10h | FIG. 10i | FIG. 10j |
|---|---|---|---|---|---|---|---|---|---|
FIG. 10

United States Patent Office 3,008,635
Patented Nov. 14, 1961

3,008,635
TYPEWRITING CALCULATING MACHINE
Fred E. Sakalay, Poughkeepsie, N.Y., assignor to International Business Machines Corporation, New York, N.Y., a corporation of New York
Filed May 17, 1957, Ser. No. 659,852
40 Claims. (Cl. 235—60.12)

The present invention relates to business machines and more particularly to business machines of relatively simple and inexpensive arrangement suitable for many types of accounting applications.

The preparation of many types of business forms requires writing of both descriptive matter and numeric data often including the results of one or more numeric computations. Typical examples of this are in the preparation of orders and invoices, payrolls and payroll vouchers, telephone toll billing, inventory control documents, and other like applications.

In the smaller business establishments, computations necessary to a form preparation are usually performed manually by the use of an adding machine and desk calculator as a separate initial operation, and the manually recorded results of computation then enable a subsequent form preparation to be accomplished merely as a typing operation. In larger business establishments there is the widespread practice of preparing business forms by accounting machines operating automatically under control of information recorded in punched tabulating or business cards. These machines are capable of automatically performing at high speed the usual accounting computations required for form preparation, and do this essentially concurrently with printing required information on the form.

Accounting machines of the type last mentioned involve a relatively high initial cost and are more costly to operate and maintain than is desirable for many applications, especially in connection with their use by smaller business establishments. The use of these machines requires operator prepunching of information into the tabulating or business cards used with the machine, and requires appreciable floor space not only for their own installation but also to provide storage facilities for filing of the tabulating cards for record purposes after their use. The matter of the initial and continuing operating costs, office floor space limitations, and other similar factors have given rise to the widespread practice of providing central installations of accounting machines in the larger cities in order to make them readily available for use by moderate and small-sized establishments.

In order to meet the requirements of many types of business enterprise, especially of small and moderate size, it would be highly desirable to provide a relatively low cost, compact, moderately rapid business machine capable of automatically accomplishing a limited number of arithmetic computations and recording the results thereof and especially one utilizing a typewriter in conjunction therewith to enable simplified preparation of many of the usual business forms. In this, the availability of the typewriter for normal typing functions should be unaffected. It would further be desirable that various types of computations involved in a form preparation be easily preselectable and preestablished for each form and be readily changeable with change from one type of form to another, be performed essentially concurrently with entry of data on the form, automatically, and either or both that the results of computation be typed out automatically and under operator control as described and as needed in the process of preparing the form, or that the computational results be typed out both automatically in certain instances and under operator control in other instances as the demands of each particular form preparation require. Additionally, flexibility in adapting such simplified form of business machine to numerous diverse applications makes it desirable that information for computation be entered into the computer thereof by an operator in a simple manner much like a typing operation and concurrently with the need for the information during preparation of the form, and that this be accomplished without the need to use any prepunched tabulating or business cards. It would be desirable in many applications that certain types of such information be prestored in the computer of the machine in readiness for program-controlled selection and use and be readily replaced or modified in storage from time to time as desired by the operator.

It is an object of the present invention to provide a novel business machine of the type last described which includes a printer having a document transporting reciprocal carriage and wherein there is preestablished with relation to each form in preparation plural vertically disposed fields each relating to a specific kind of numeric information, and all processing of numeric data is field controlled and can be initiated only at preselectable positions of the printer carriage.

It is a further object of the invention to provide a business machine in which numeric data processing under program control is effected by a relay control system and an electronic data translation system so intercontrolled one by the other as to provide alternate operations of the systems to completion of each programmed data processing operation.

It is an additional object of the invention to provide an improved business machine for preparing numerous types of business forms and one wherein processing of numeric data may be programmed according to preselectable kinds of numeric information to appear on the form, and each data processing step is effected electronically at relatively high speed but under control of plural program-selectable relay sequences which establish the desired function to be performed by each such electronic processing step.

Figure 2:
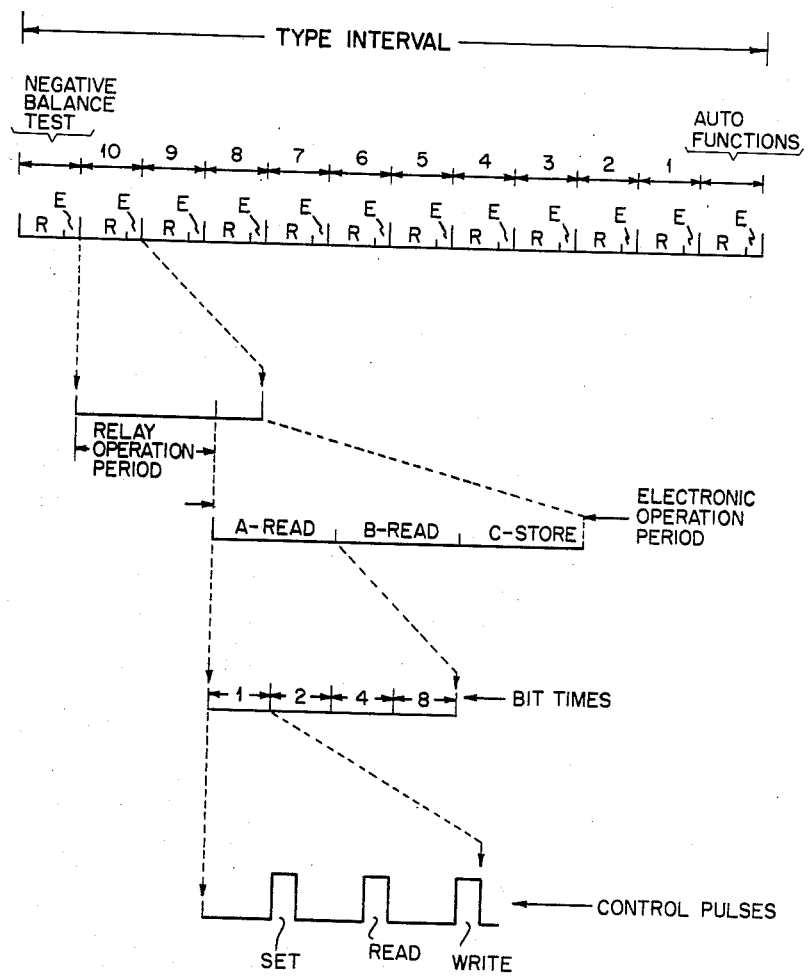
Figure 3:
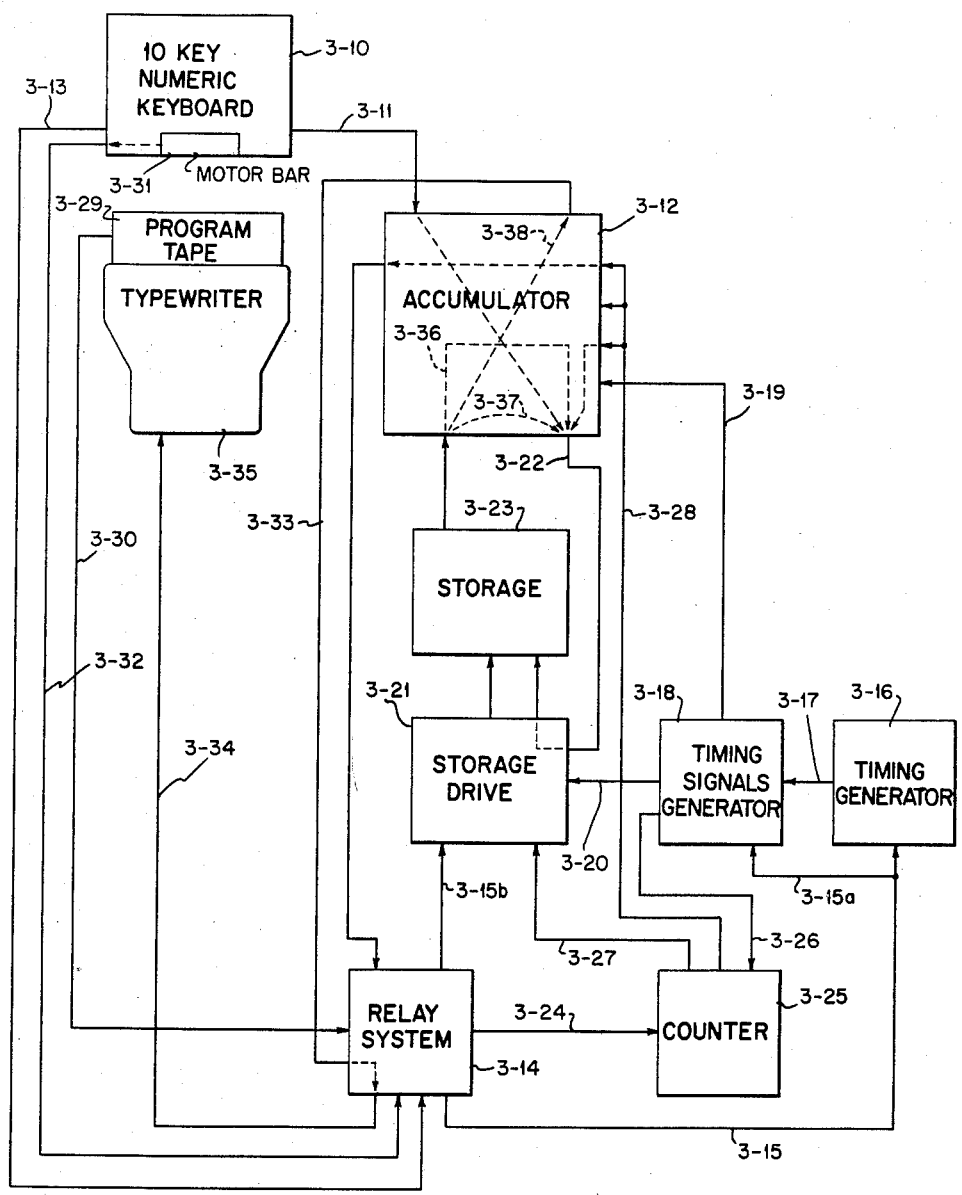
Figure 4A:
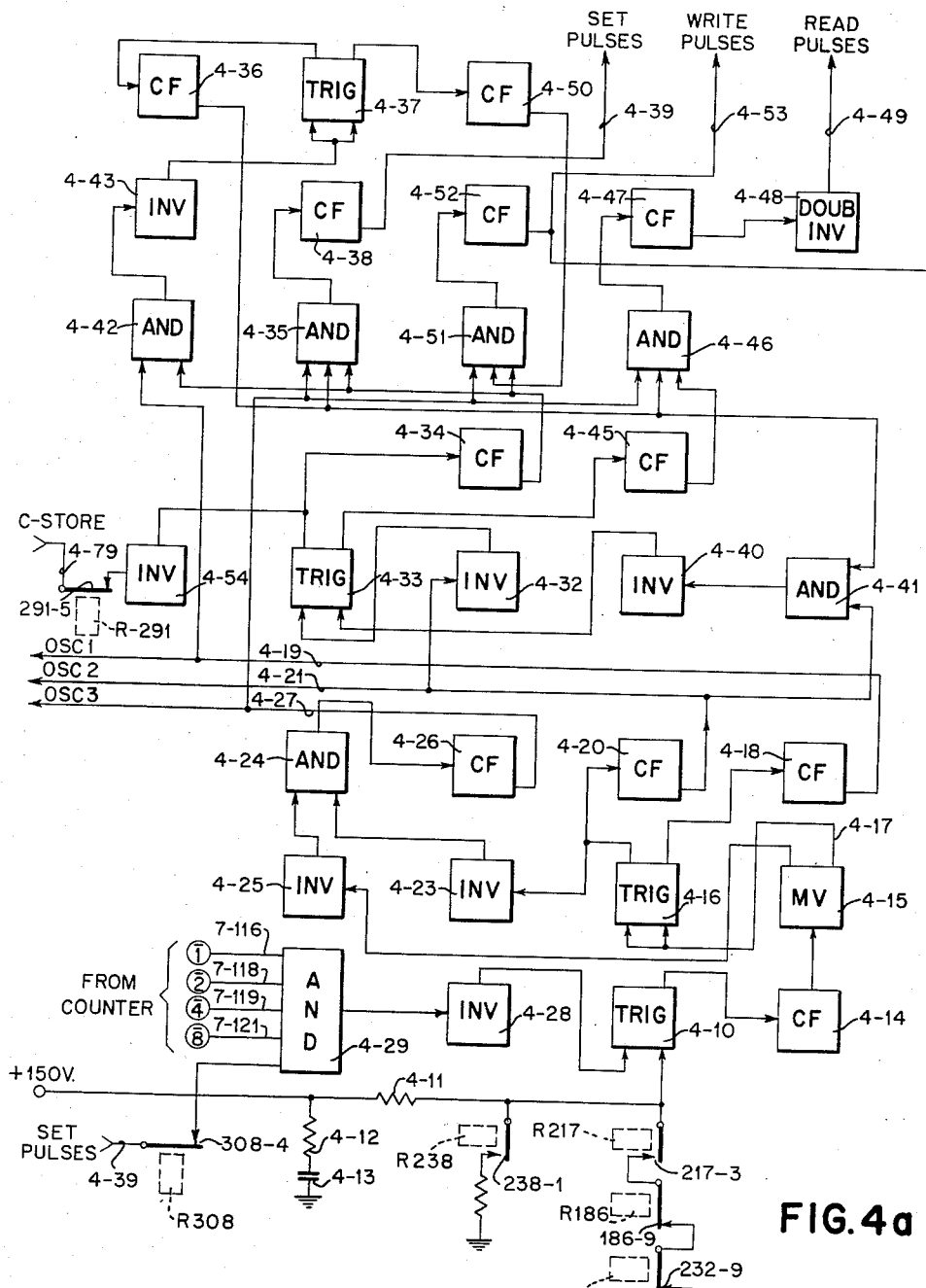
Figure 4B:
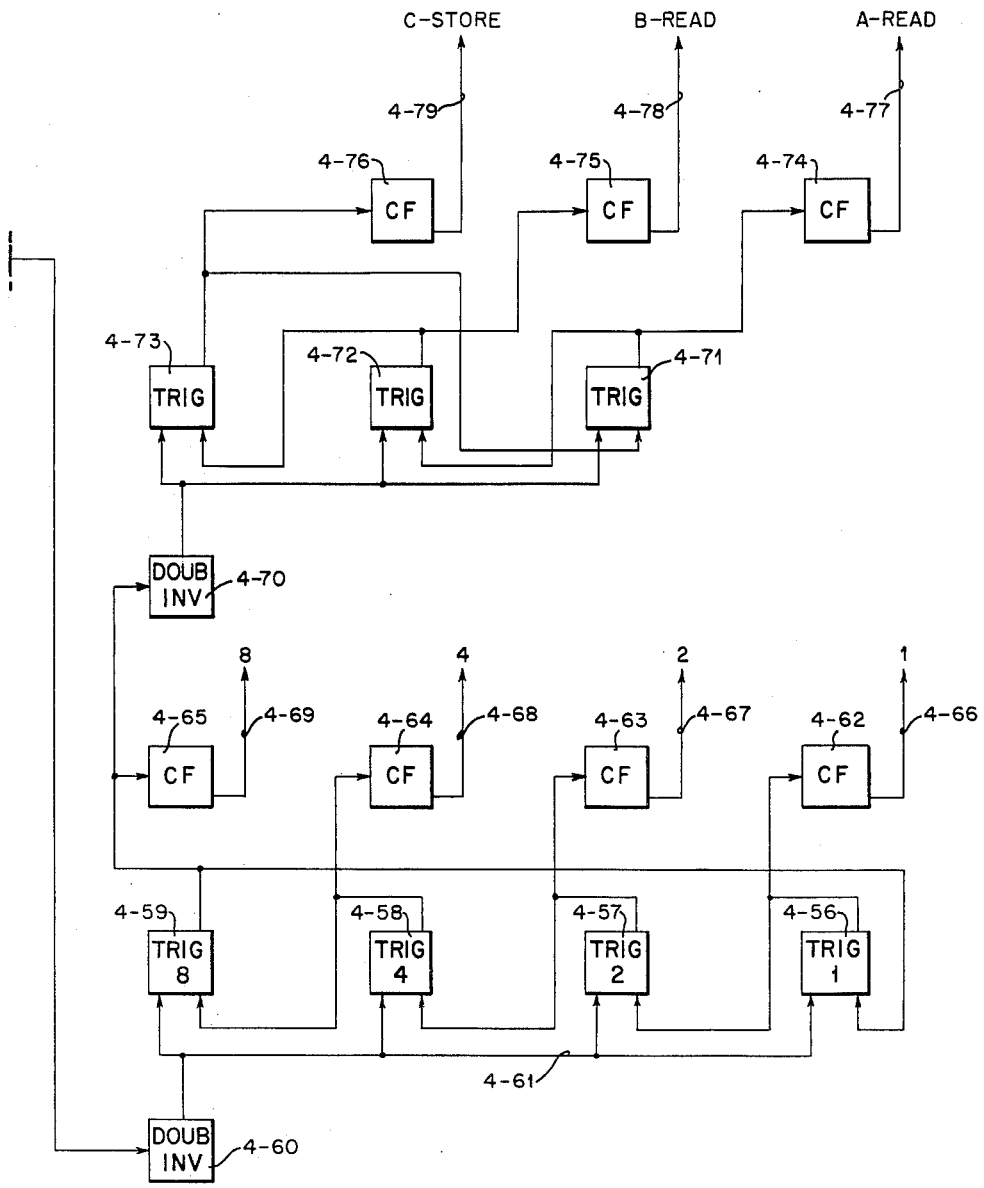
Figure 5B:
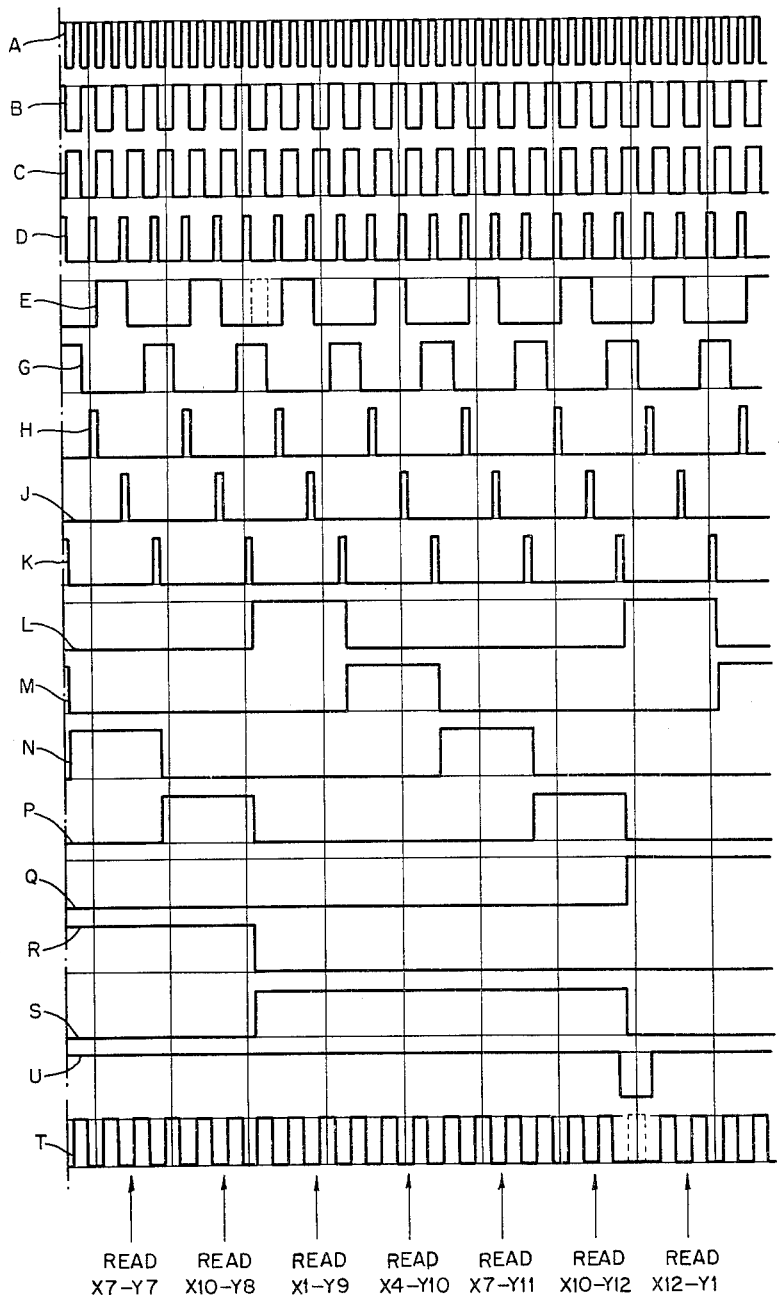
Figure 6B:
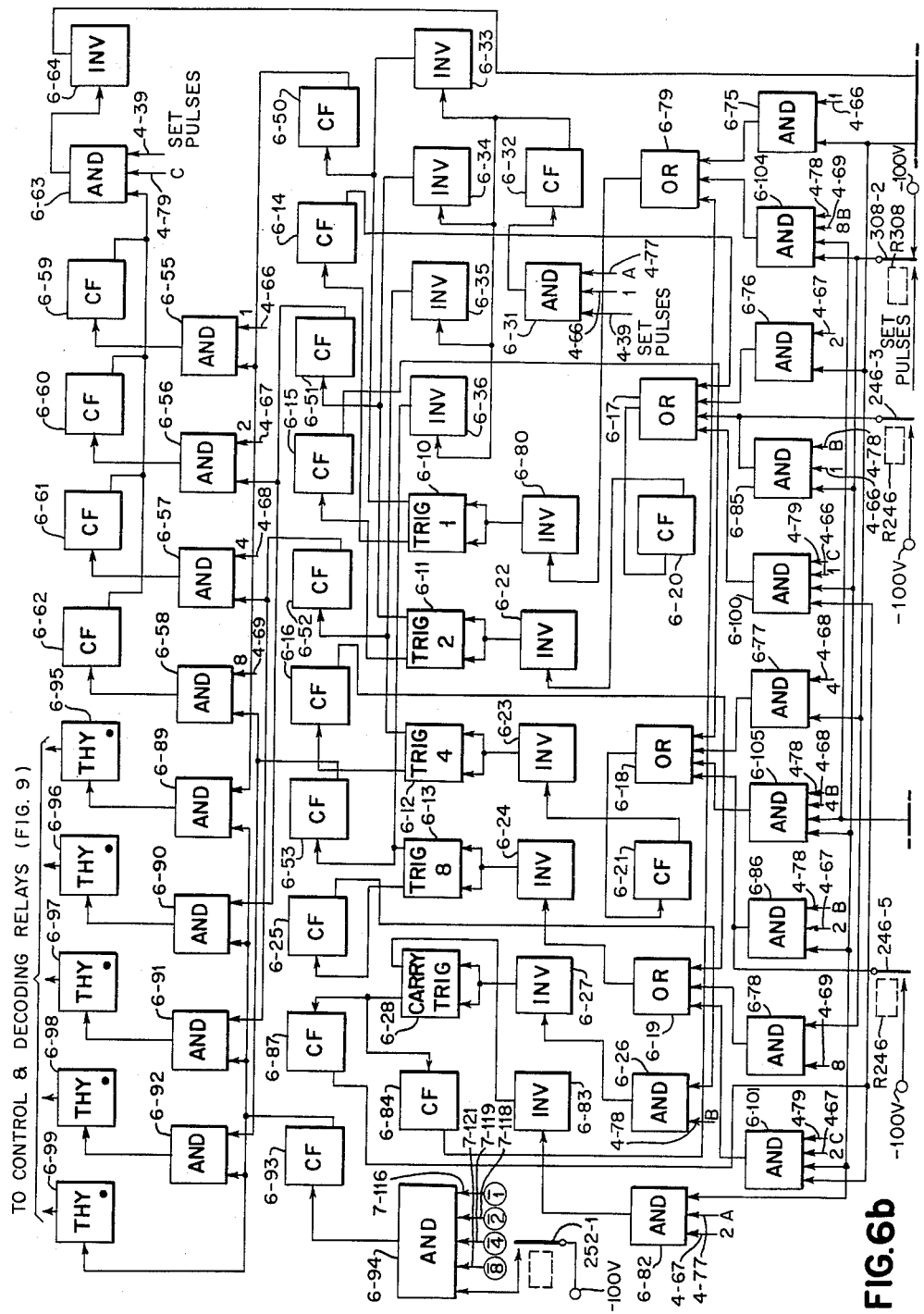
Figure 7A:
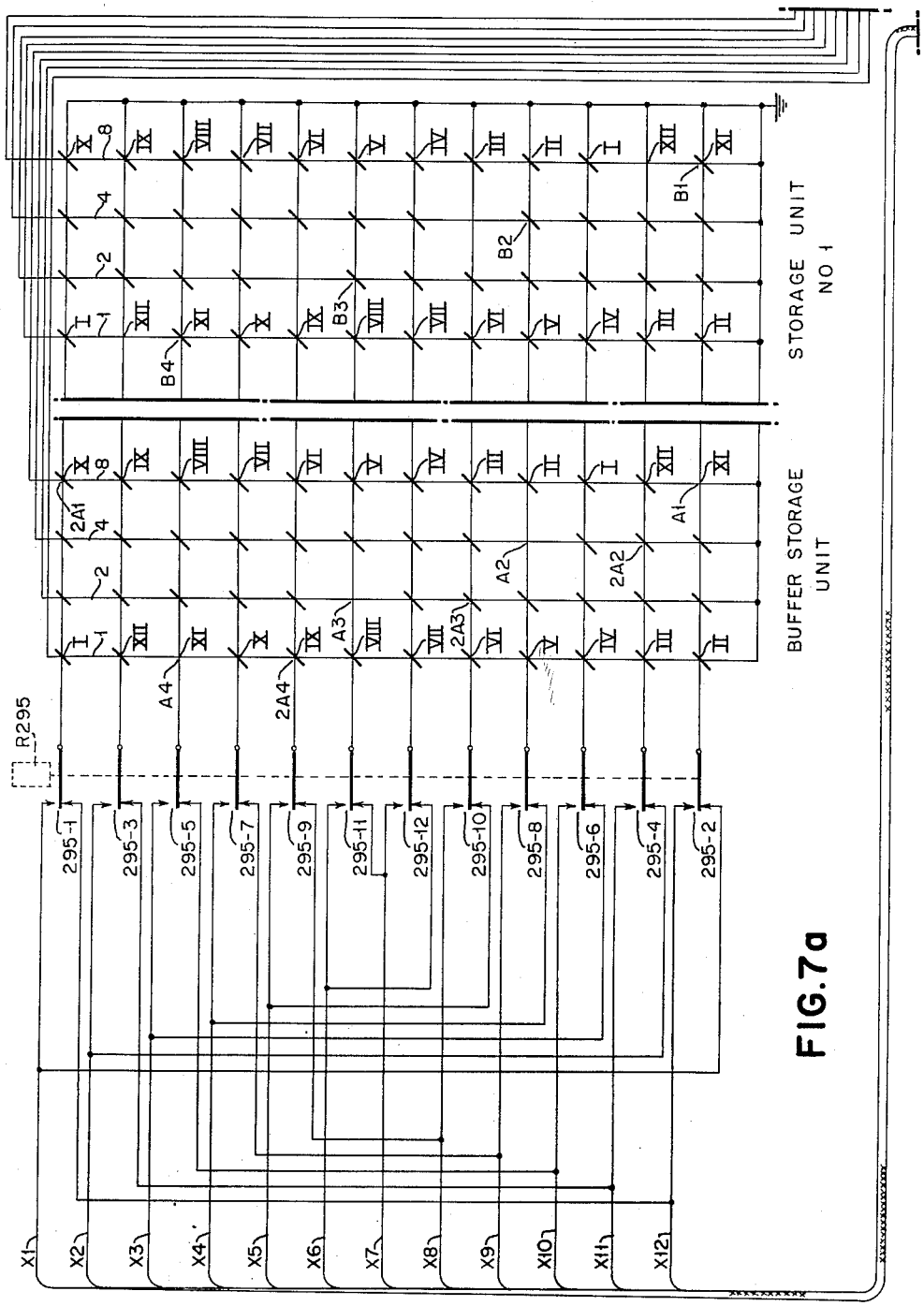
Figure 7C:
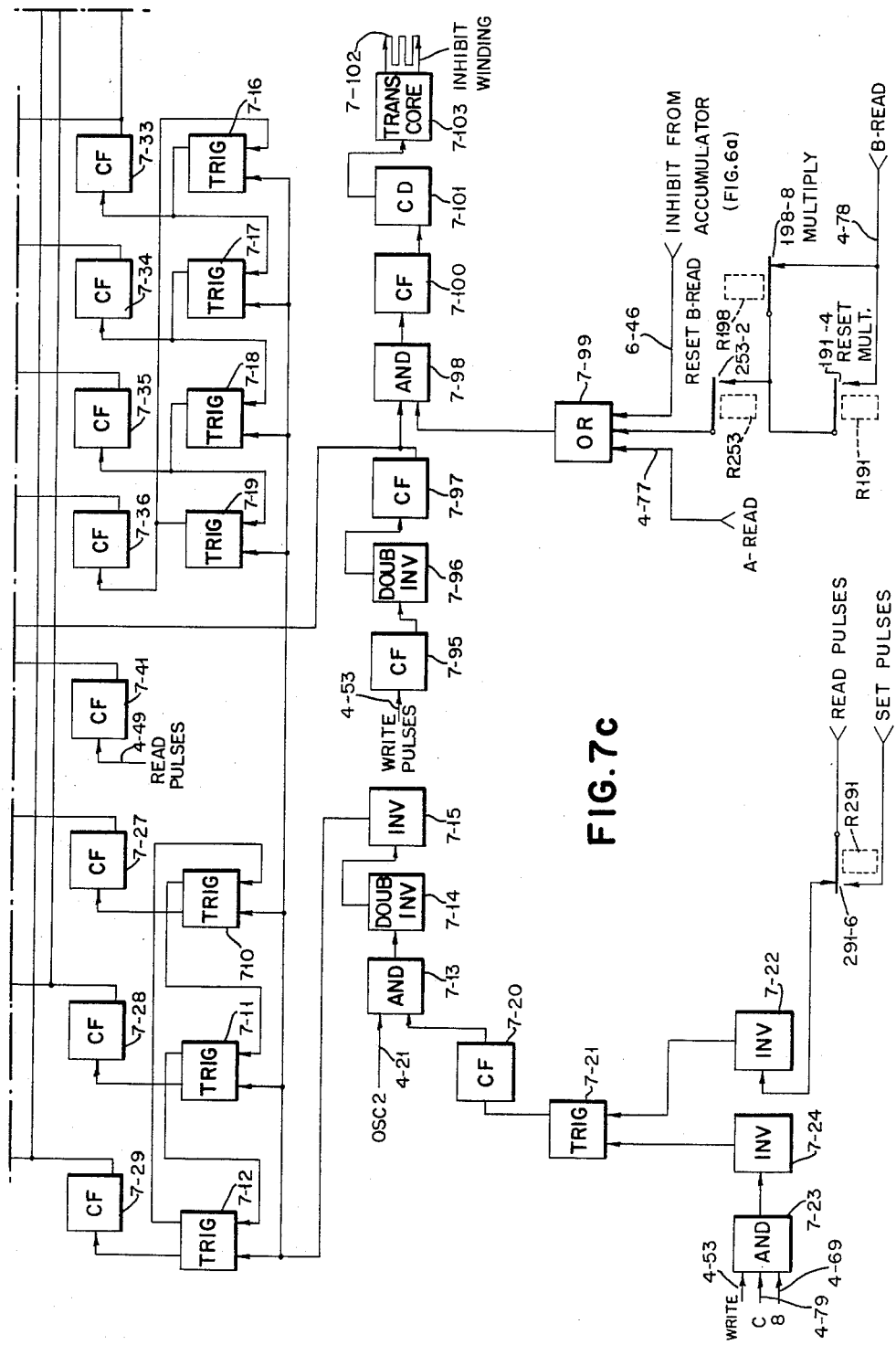
Figure 7D:
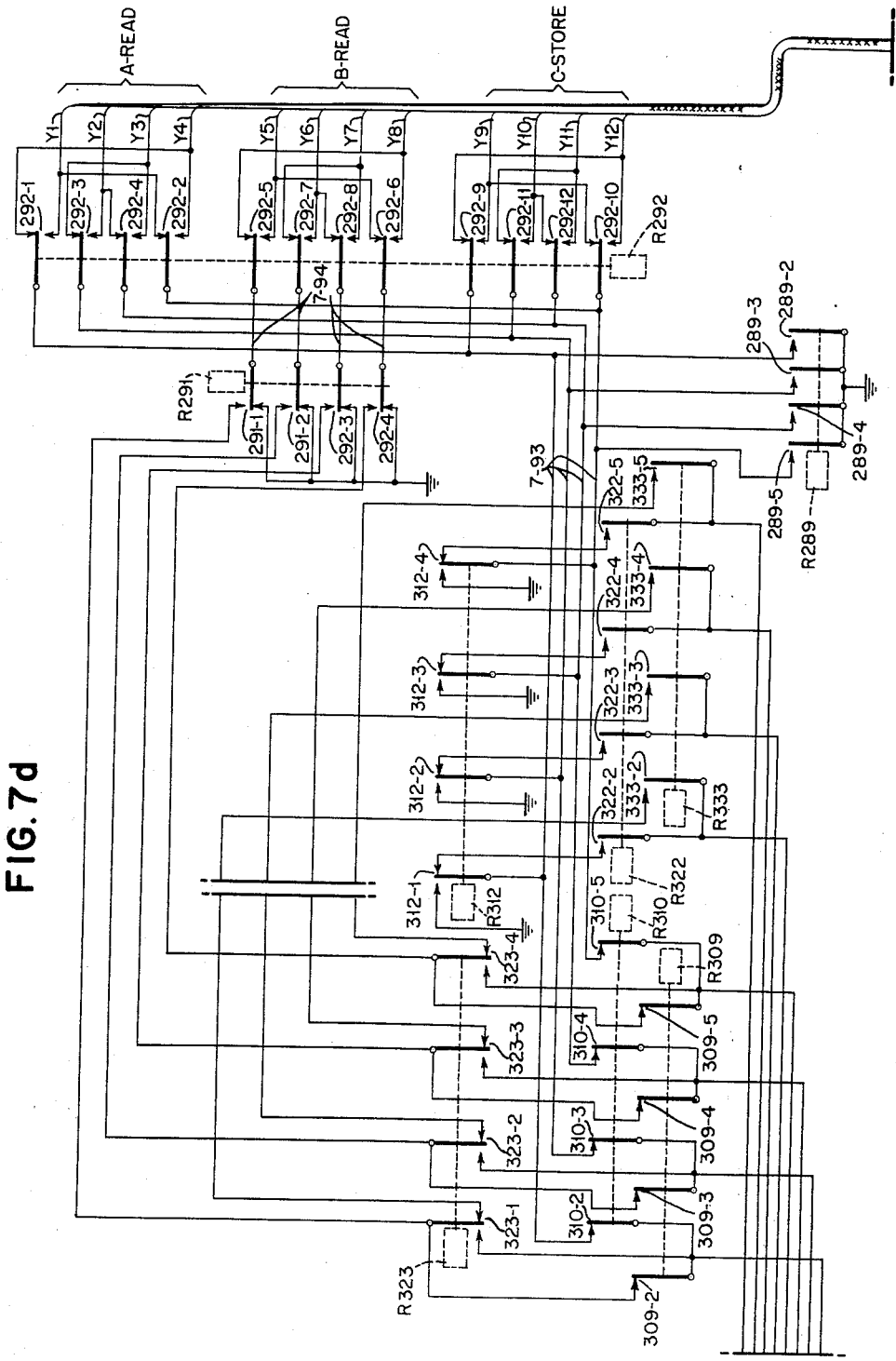
Figure 7E:
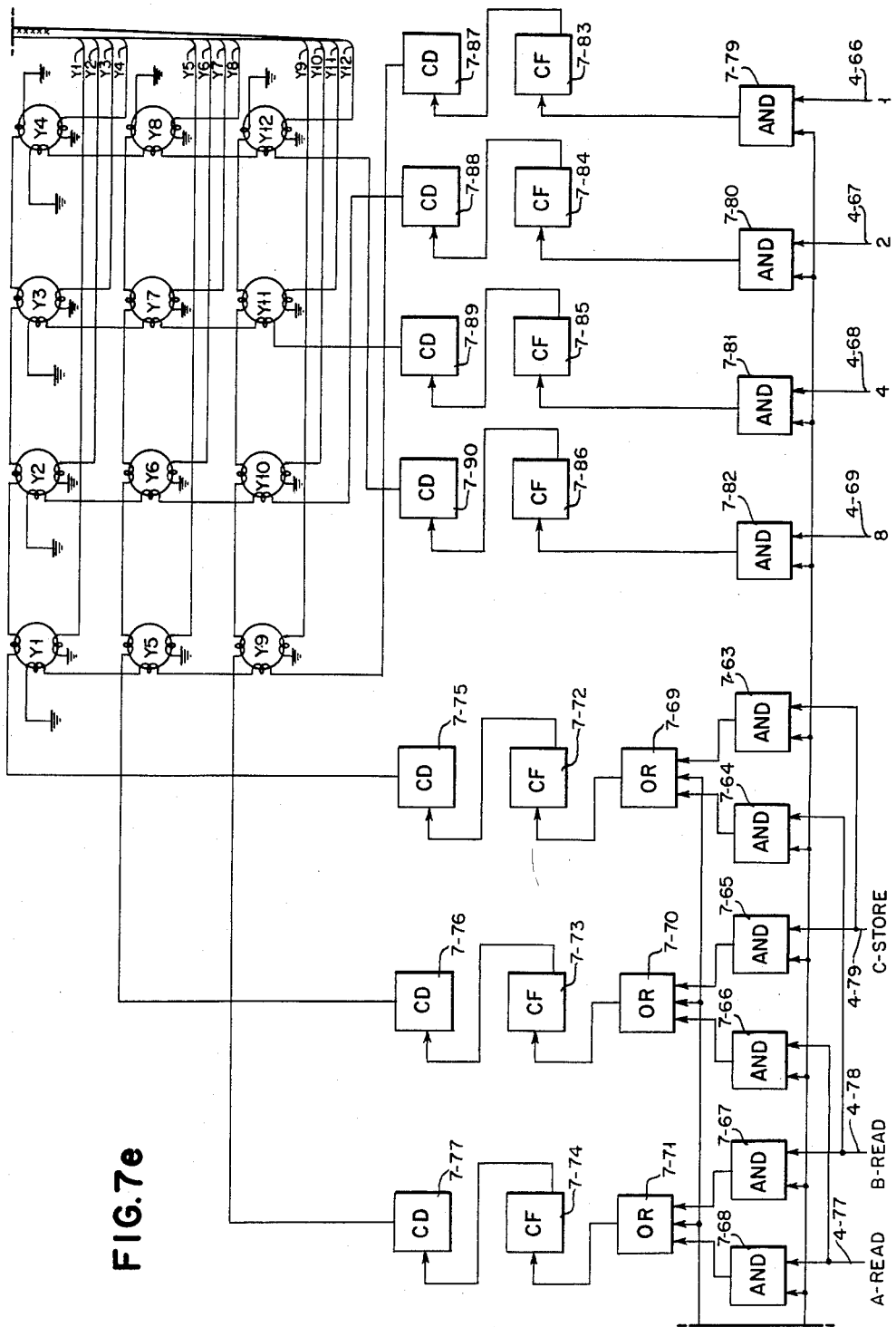
Figure 7G:
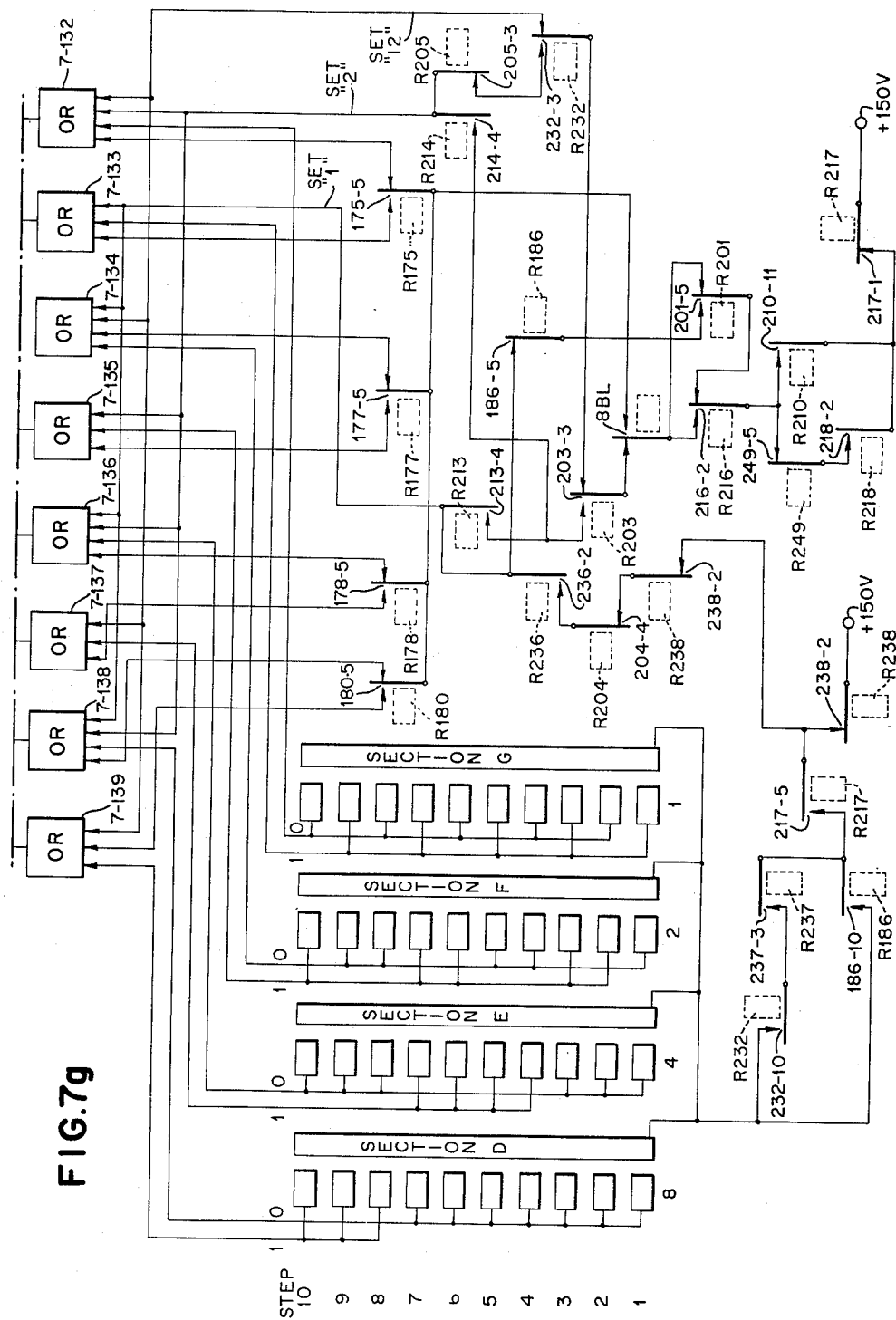
Figure 8B:
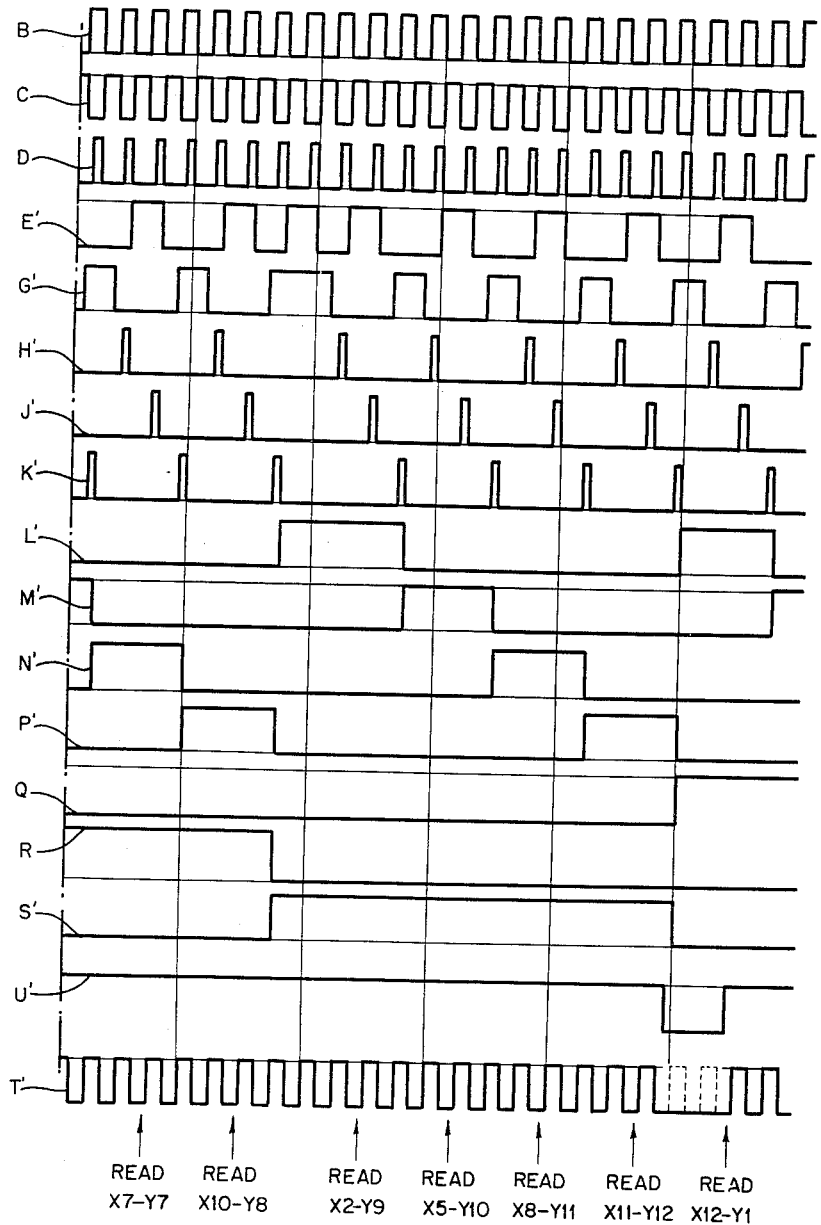
Figure 9A:
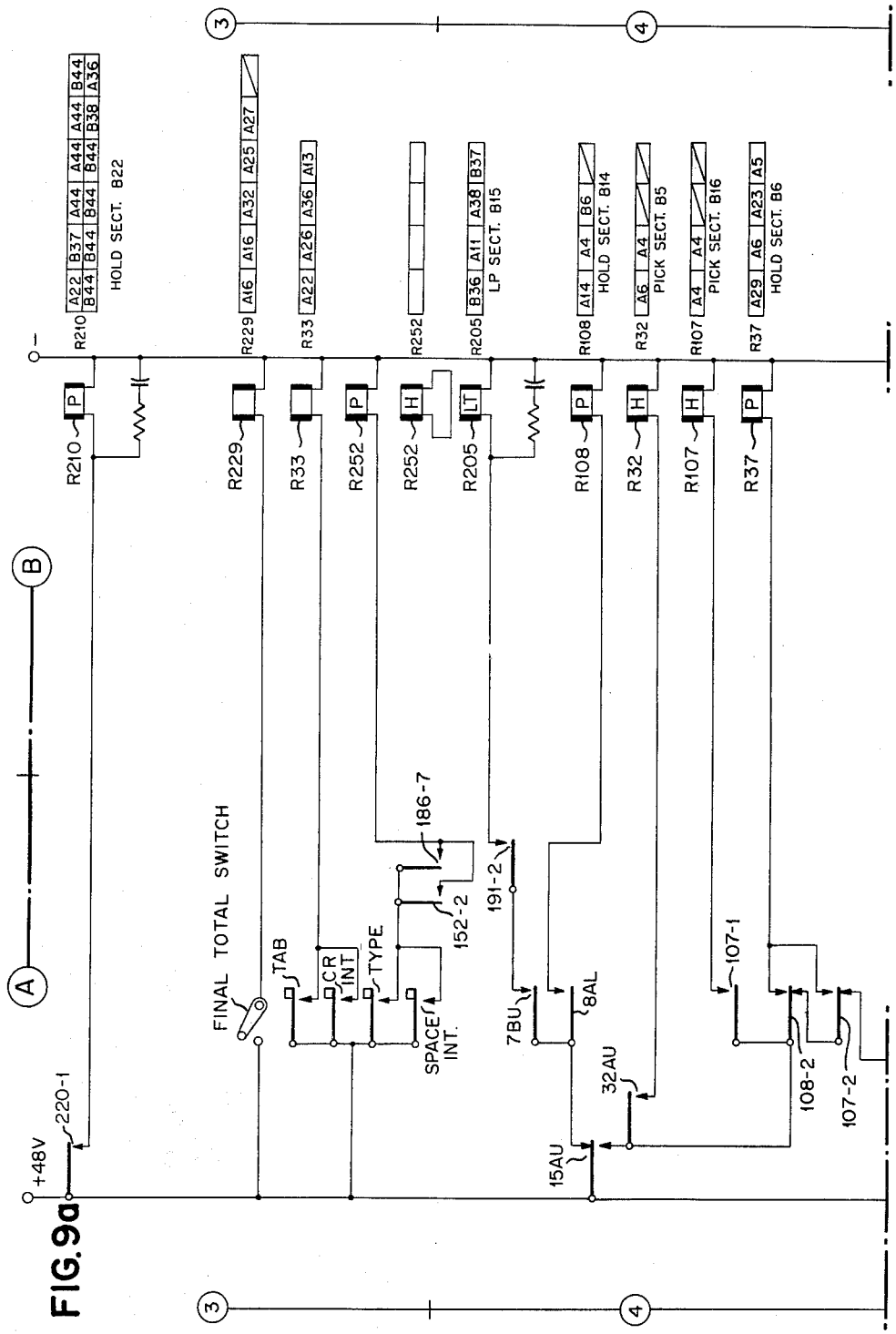
Figure 9B:
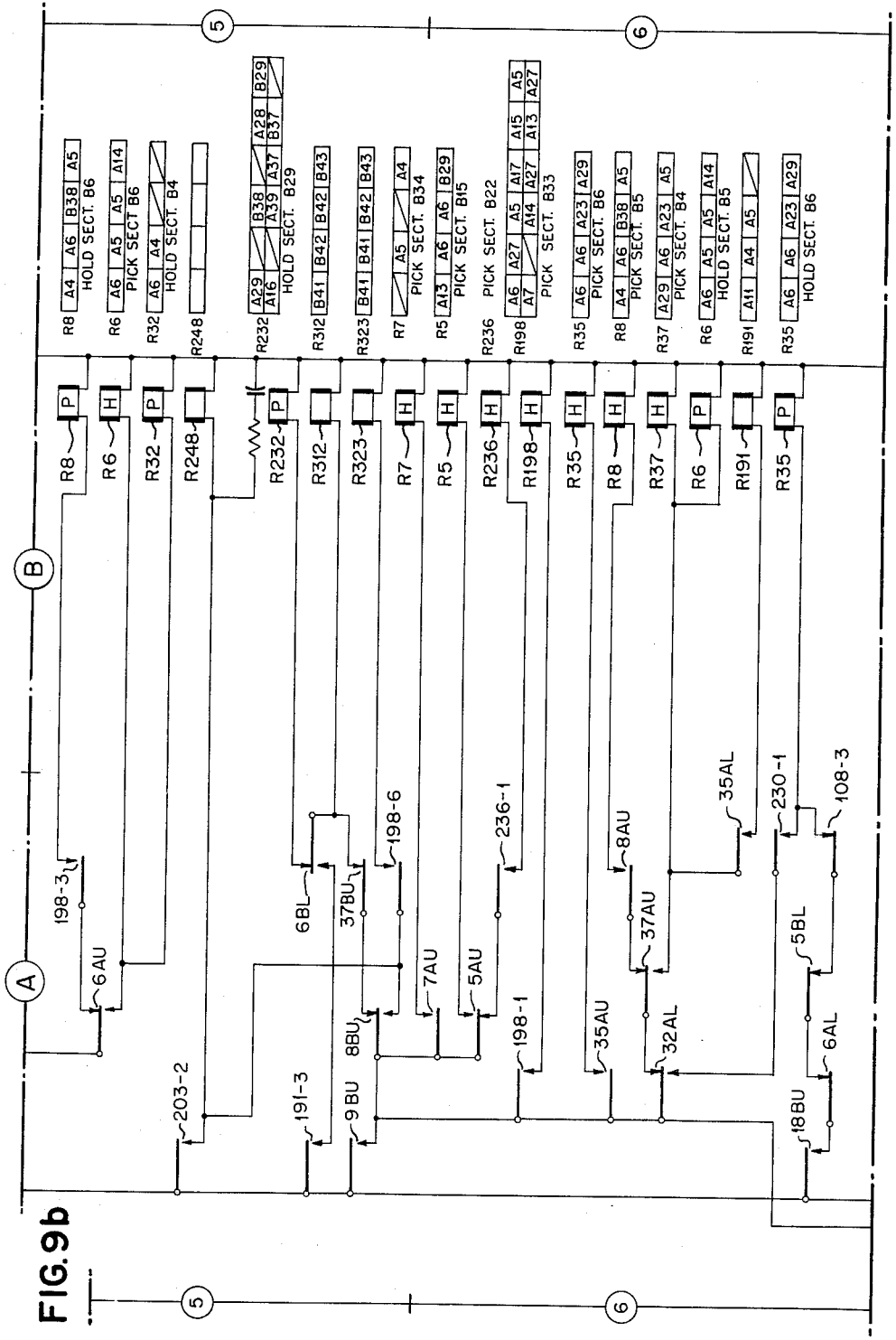
Figure 9C:
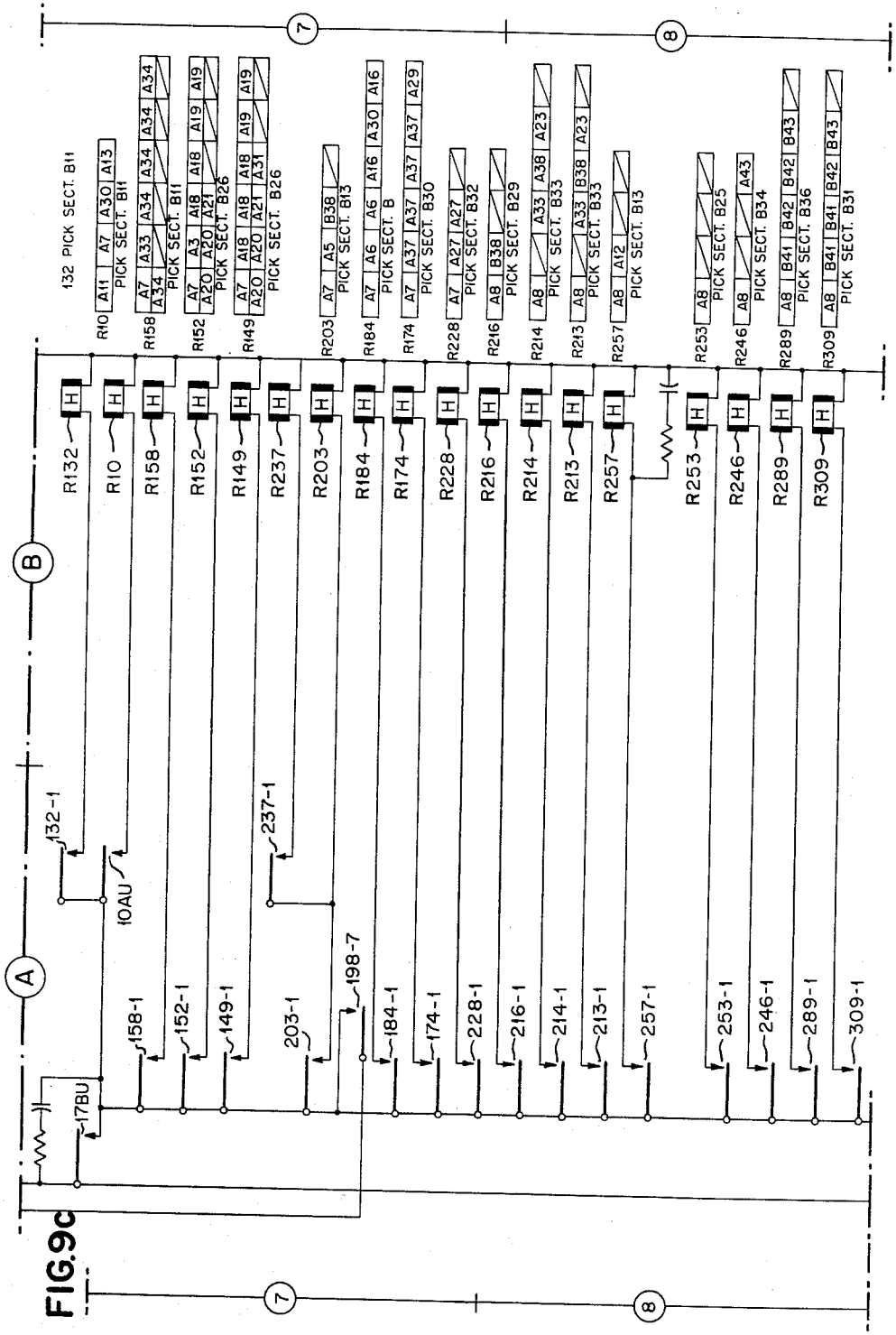
Figure 9G:
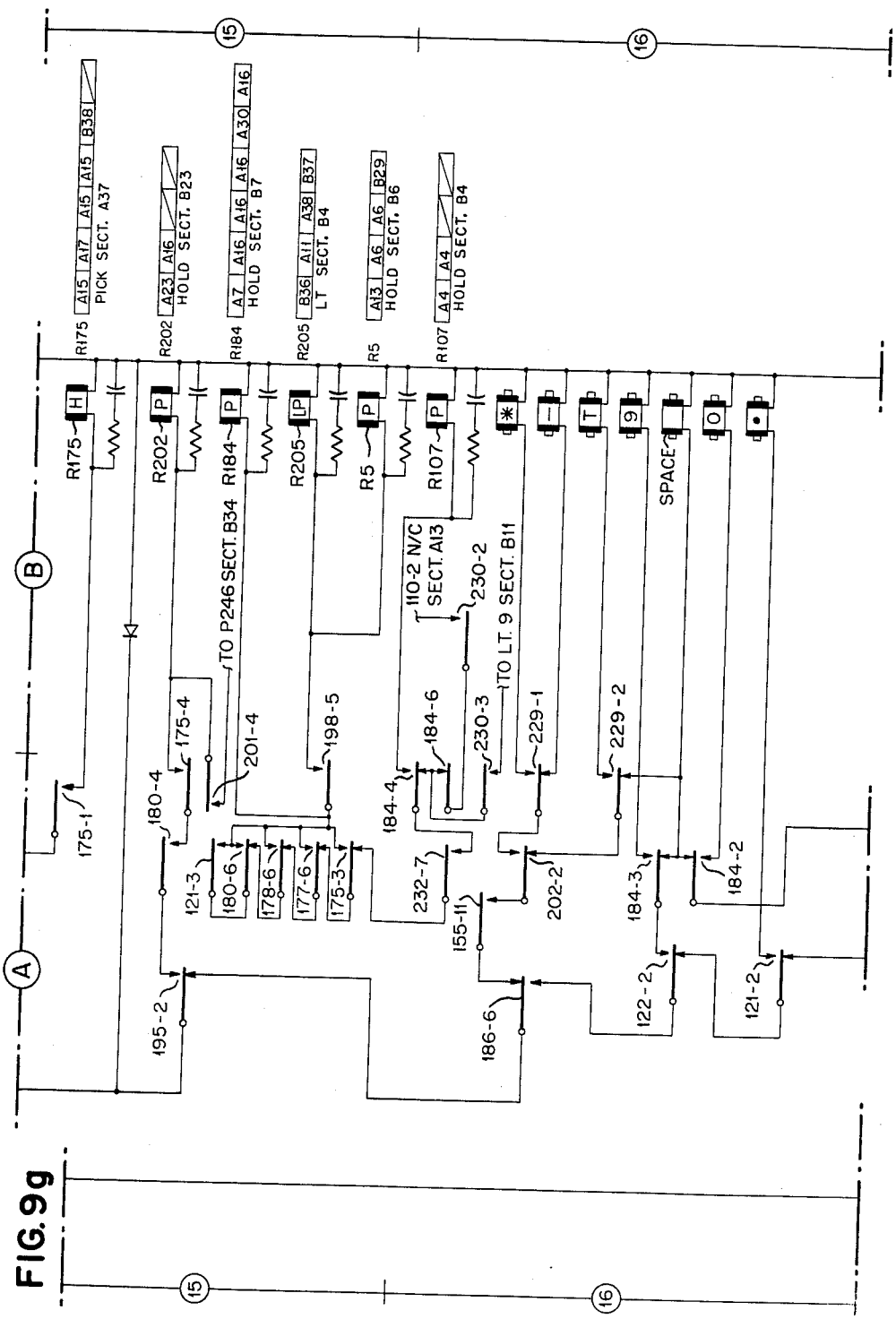
Figure 9I:
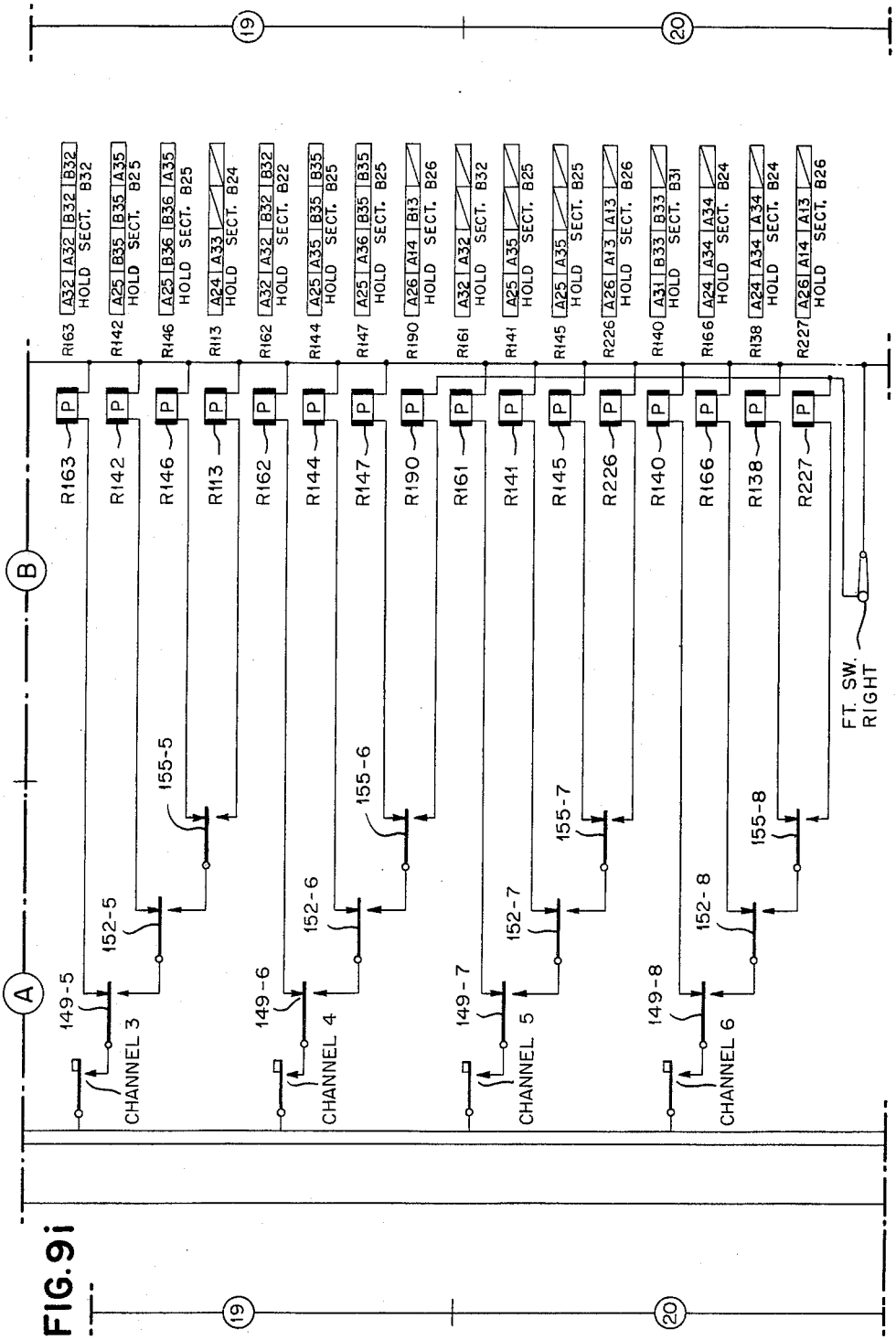
Figure 9J:
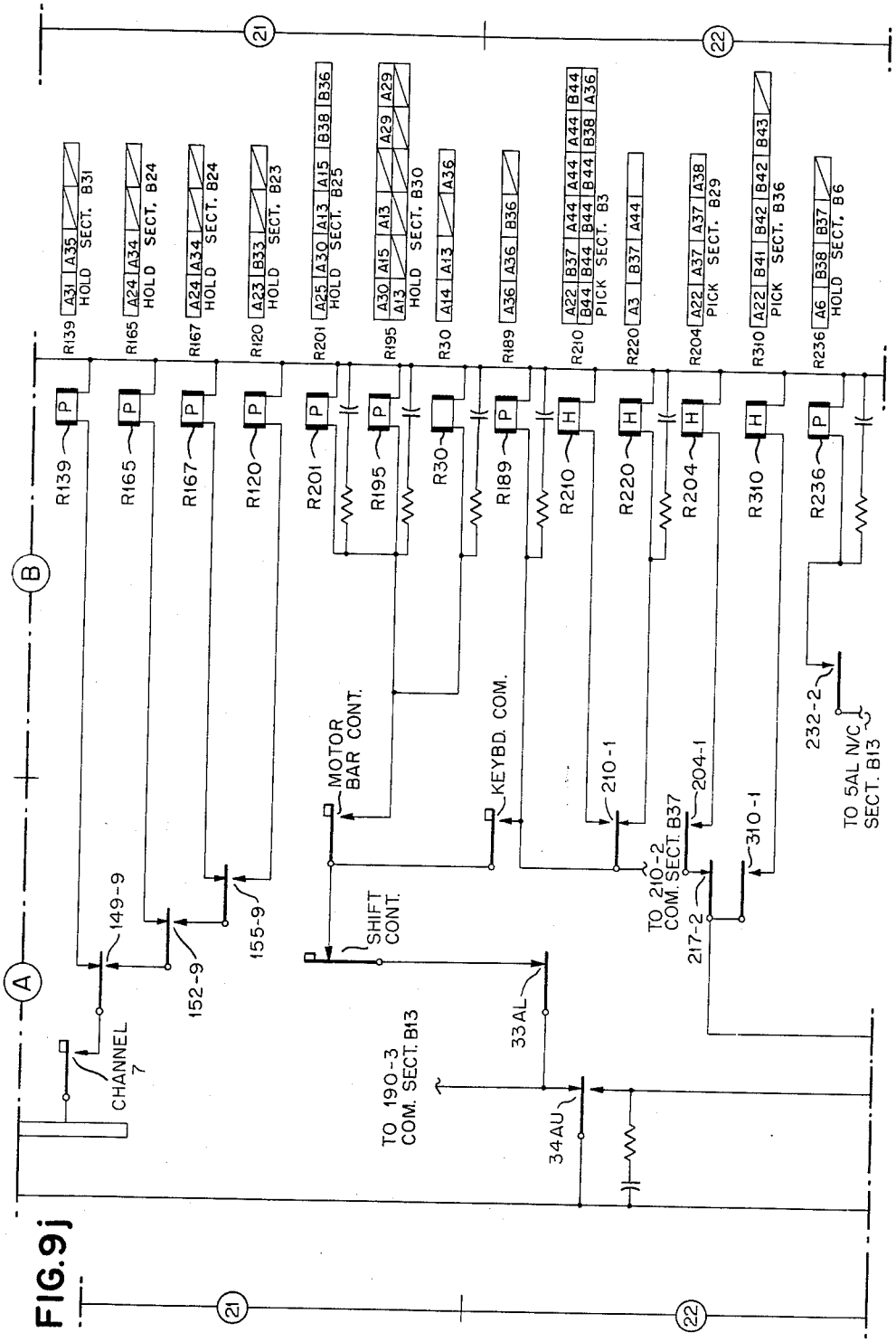
Figure 9M:
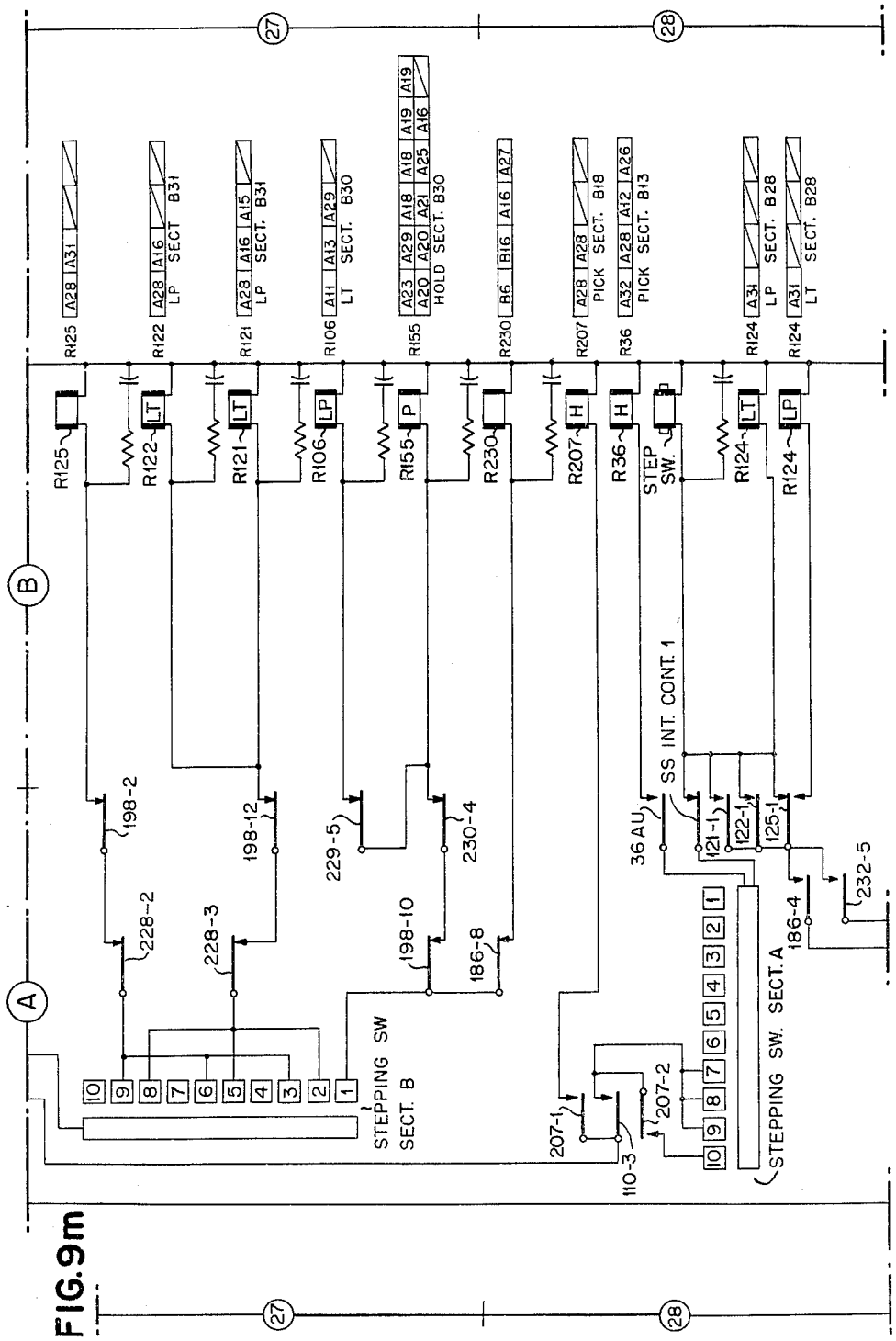
Figure 9N:
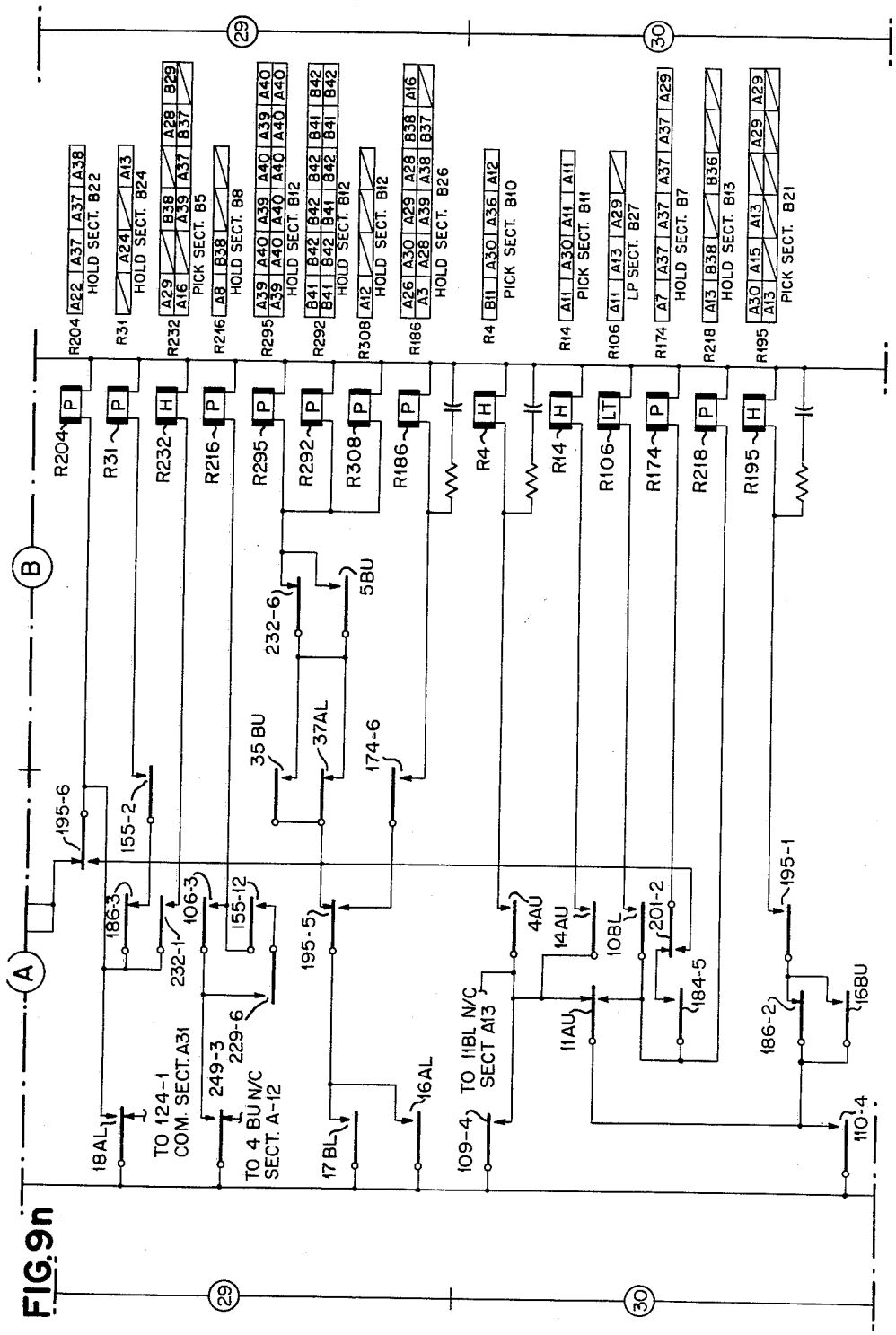
Figure 9O:
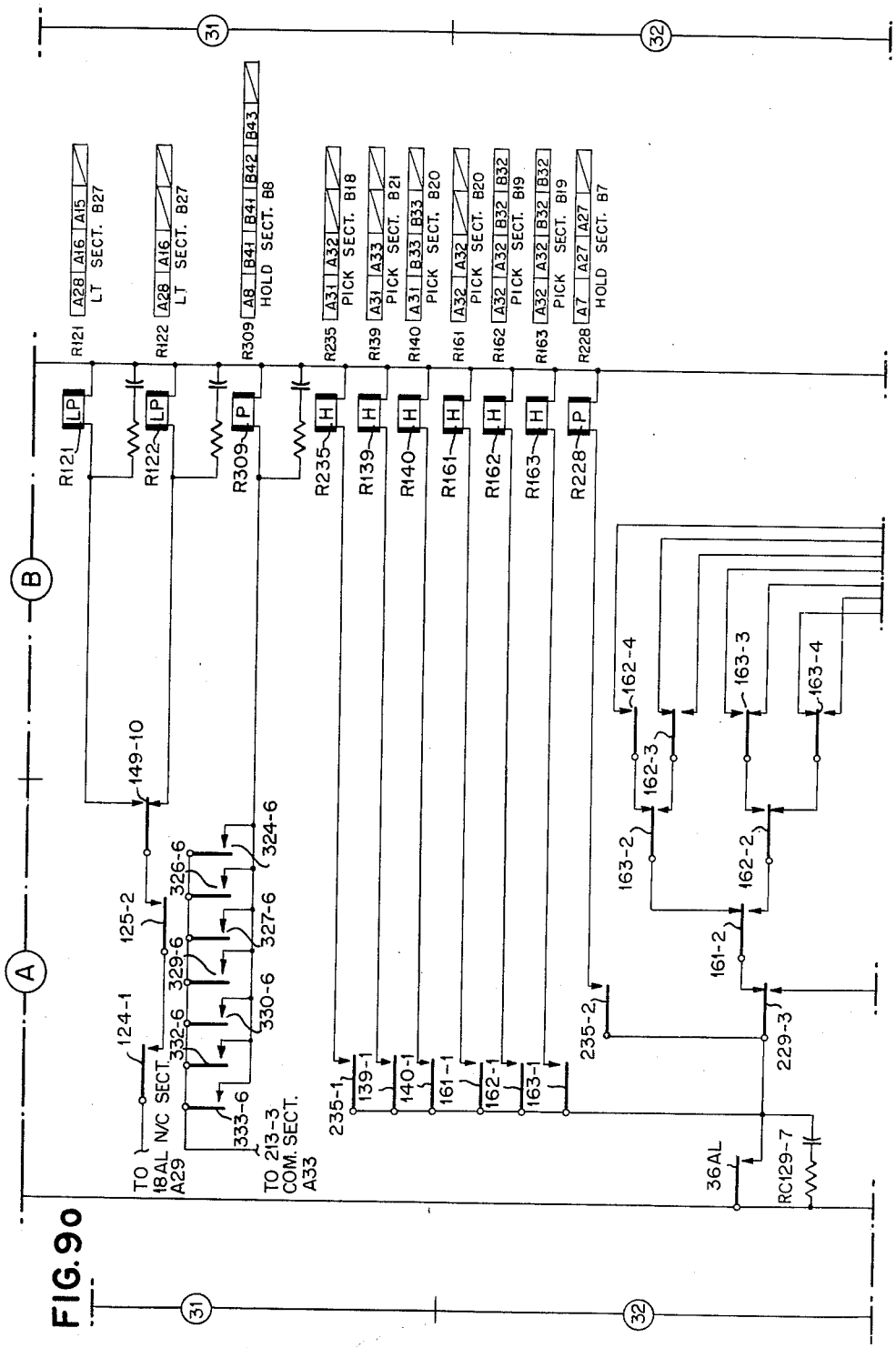
Figure 9P:
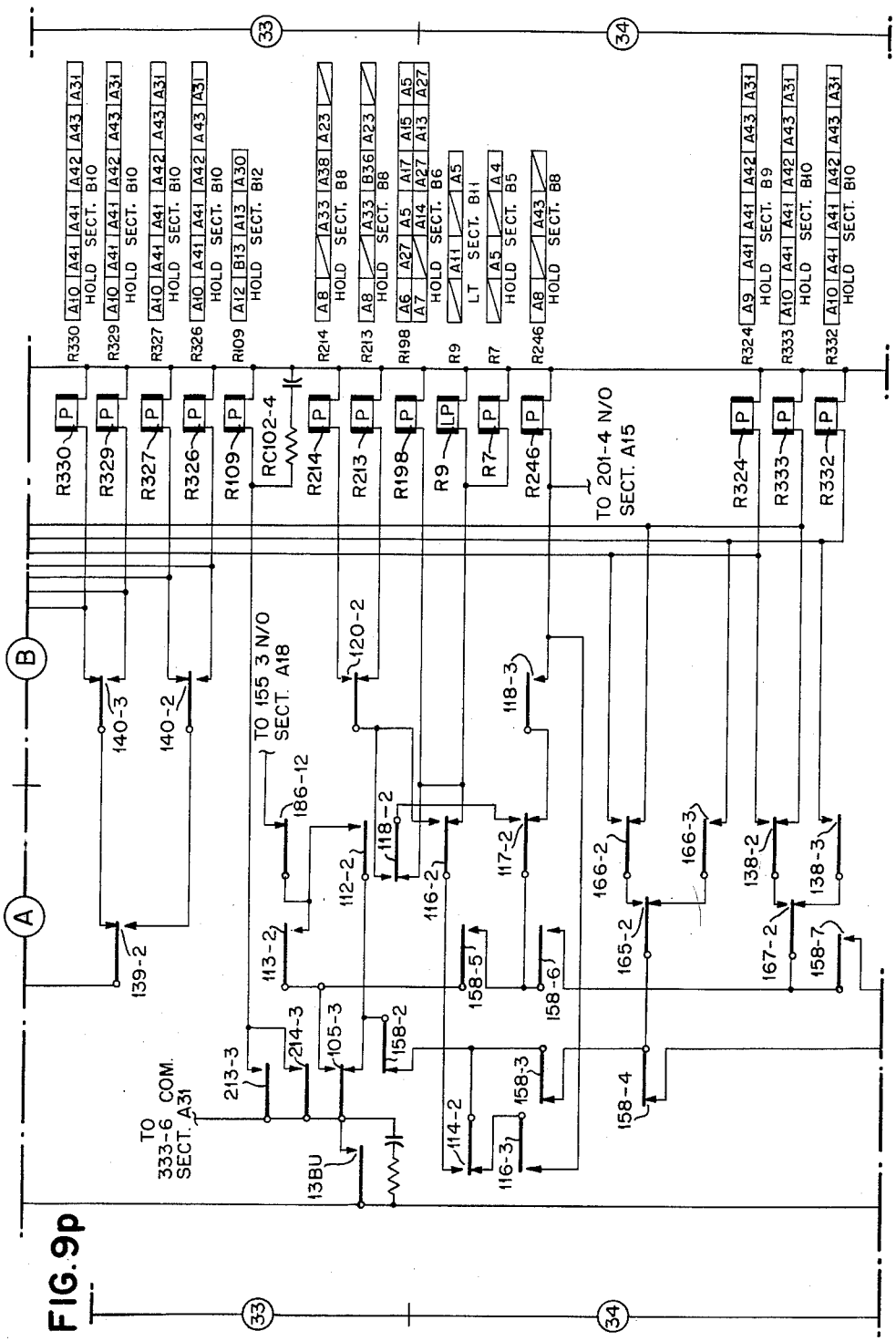
Figure 10B:
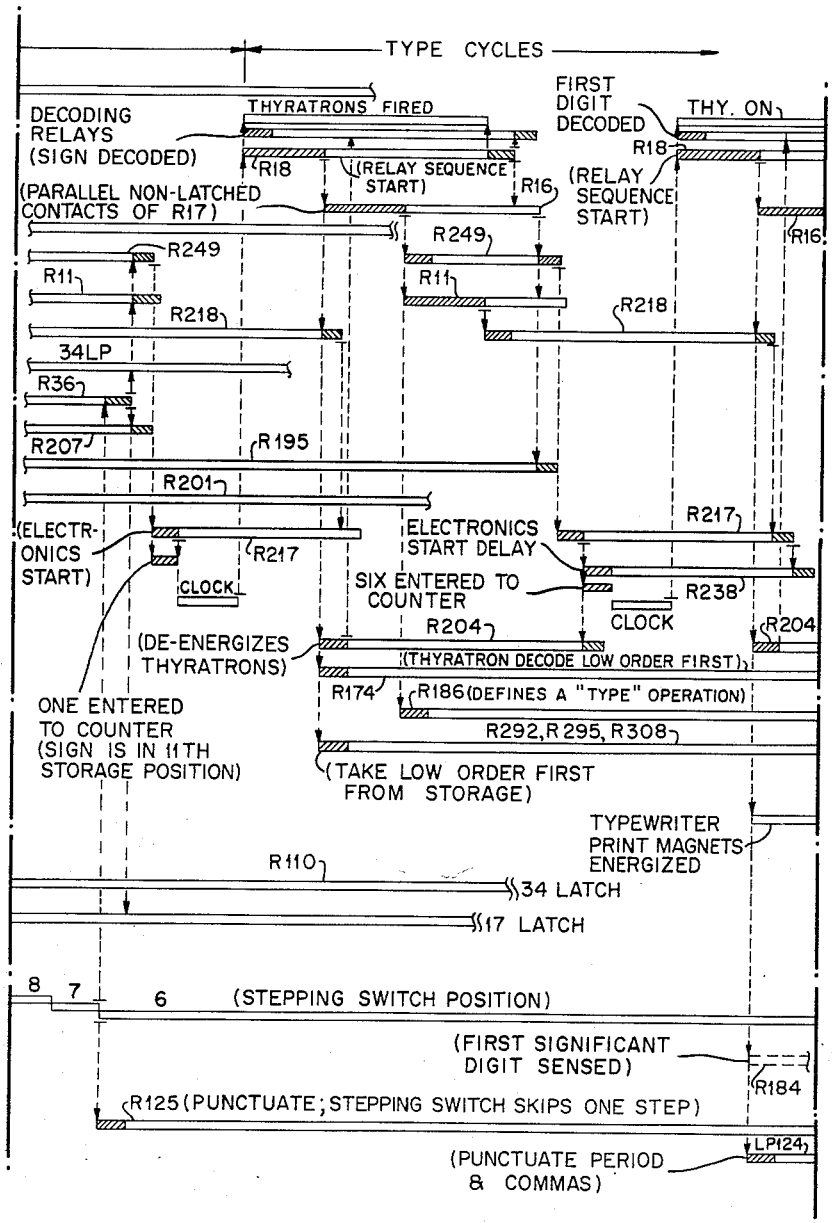
Figure 10C:
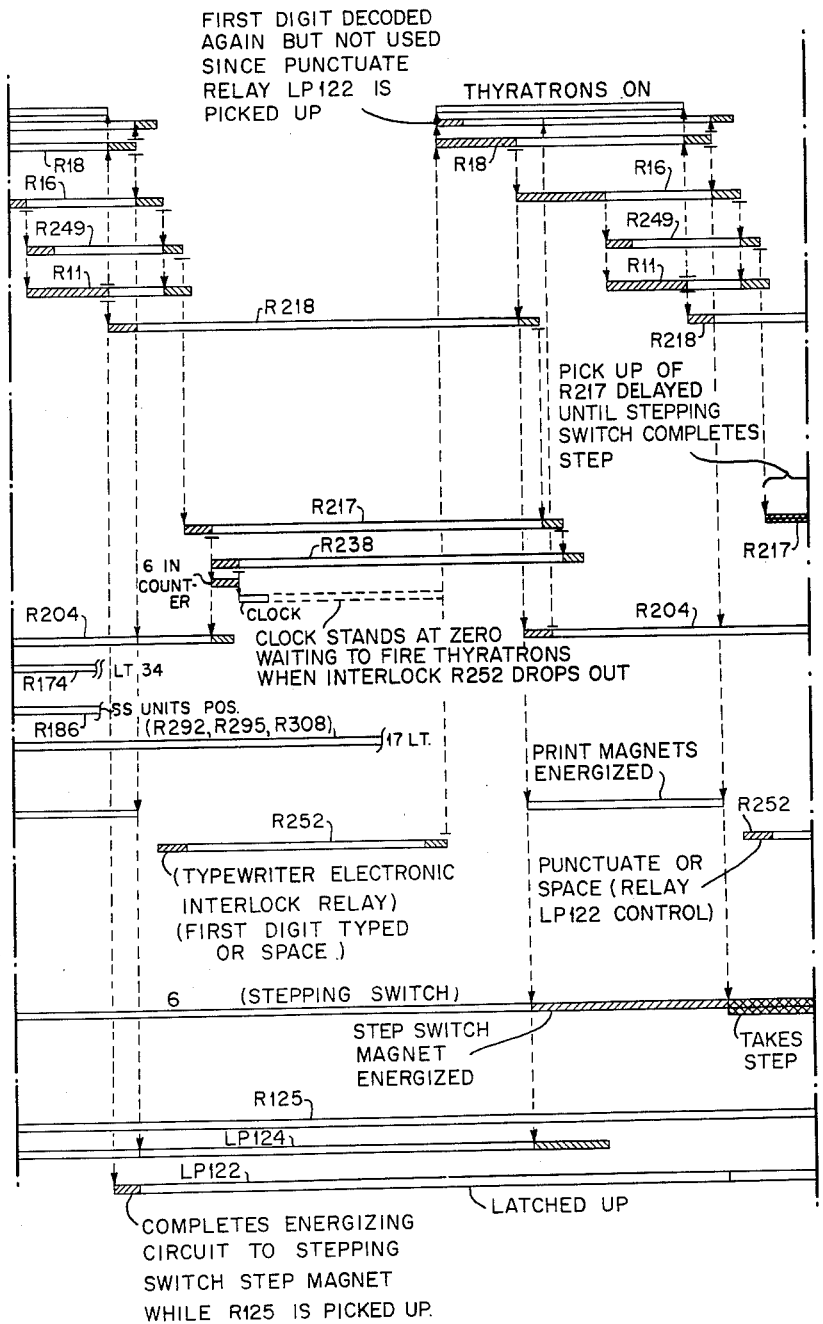
Figure 10D:
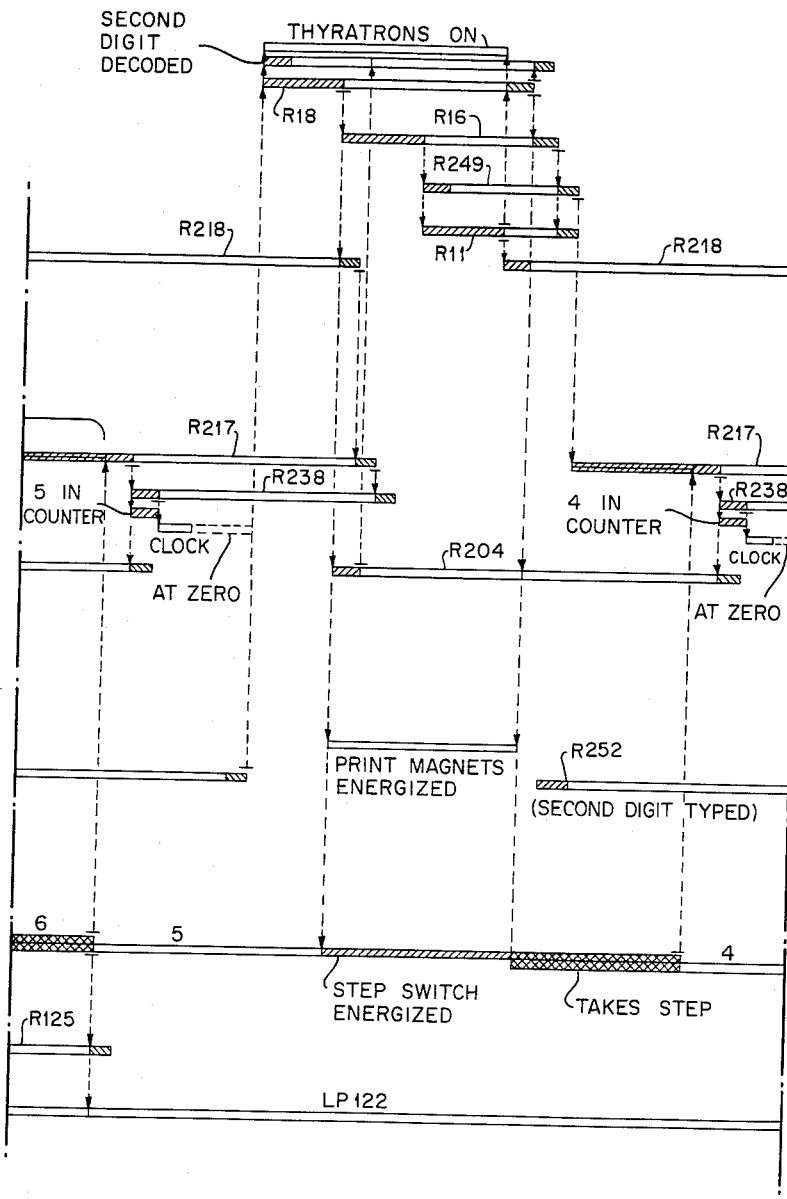
Figure 10E:
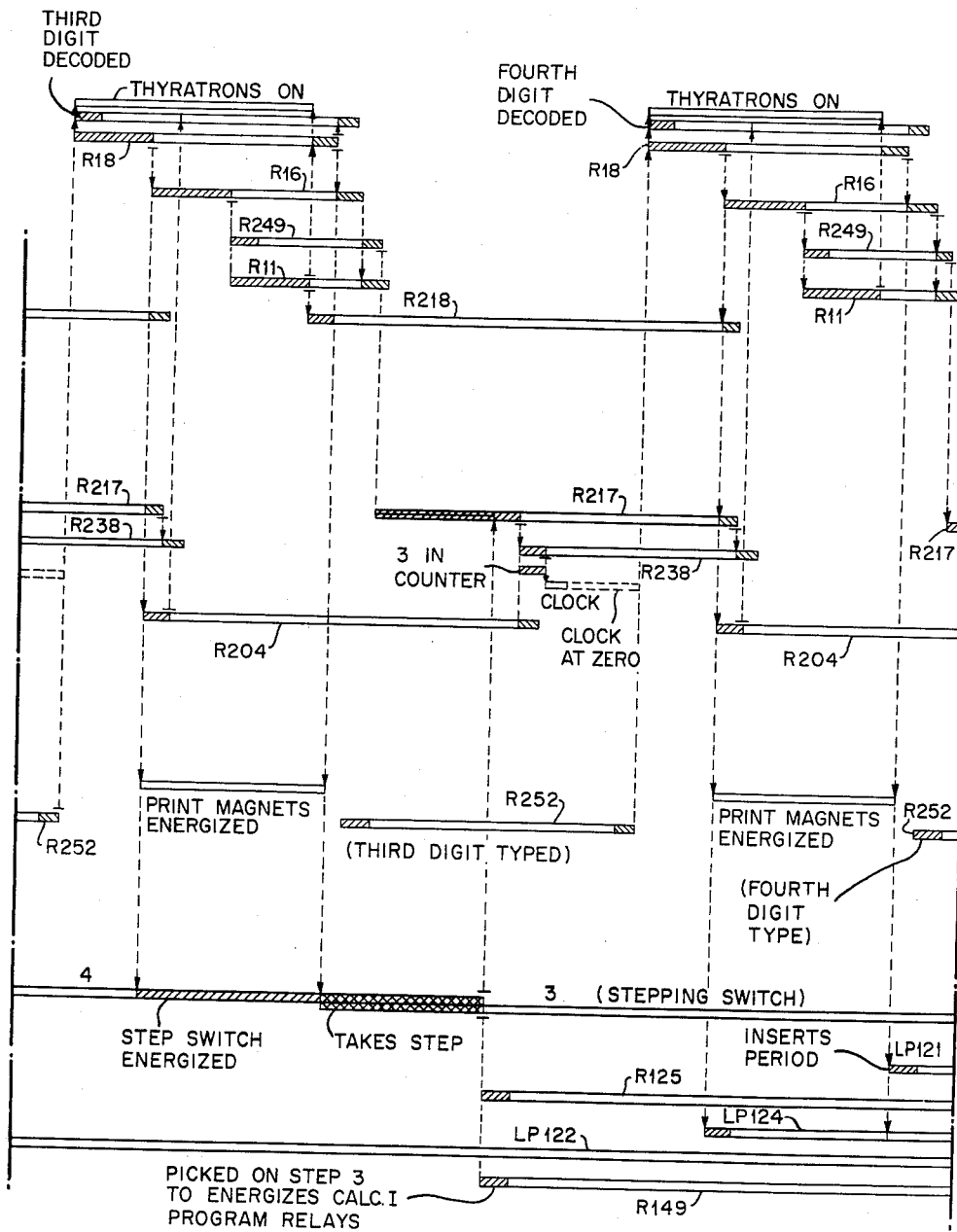
Figure 10F:
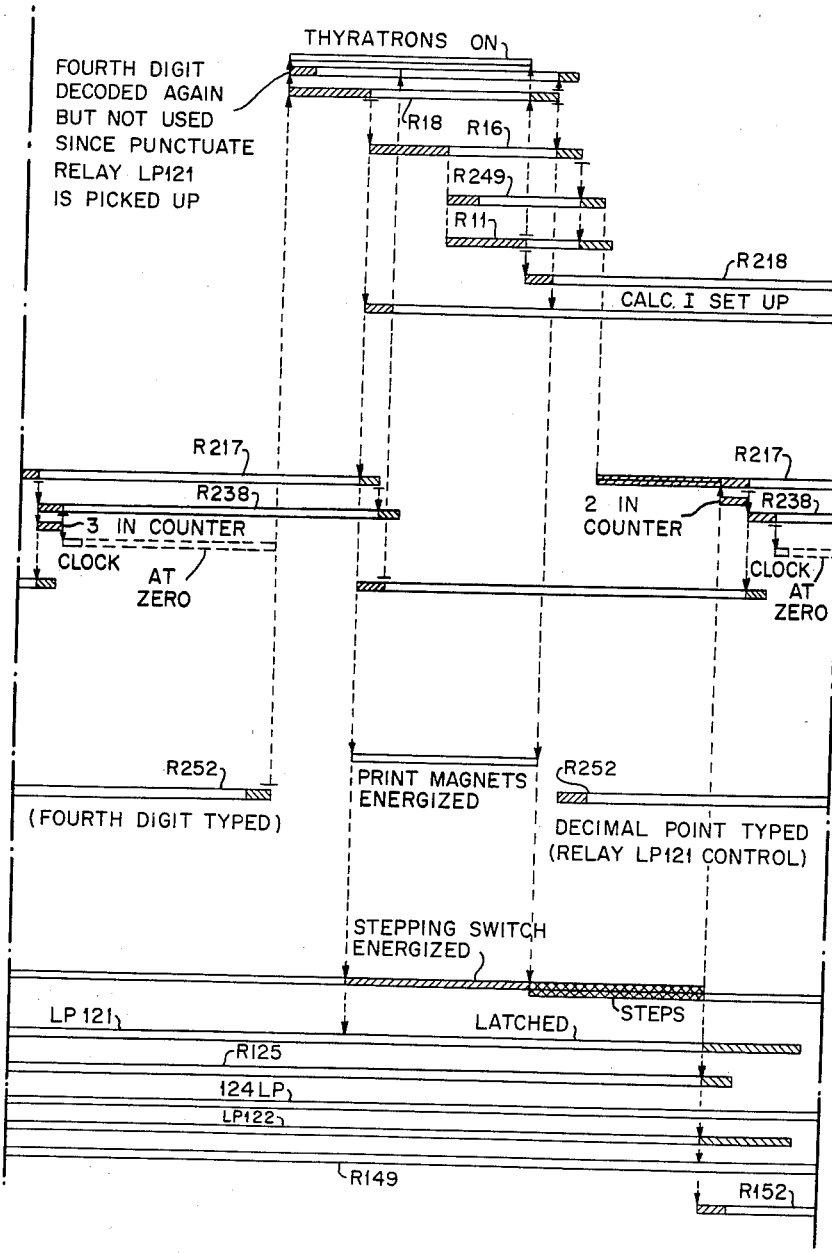
Figure 10G:
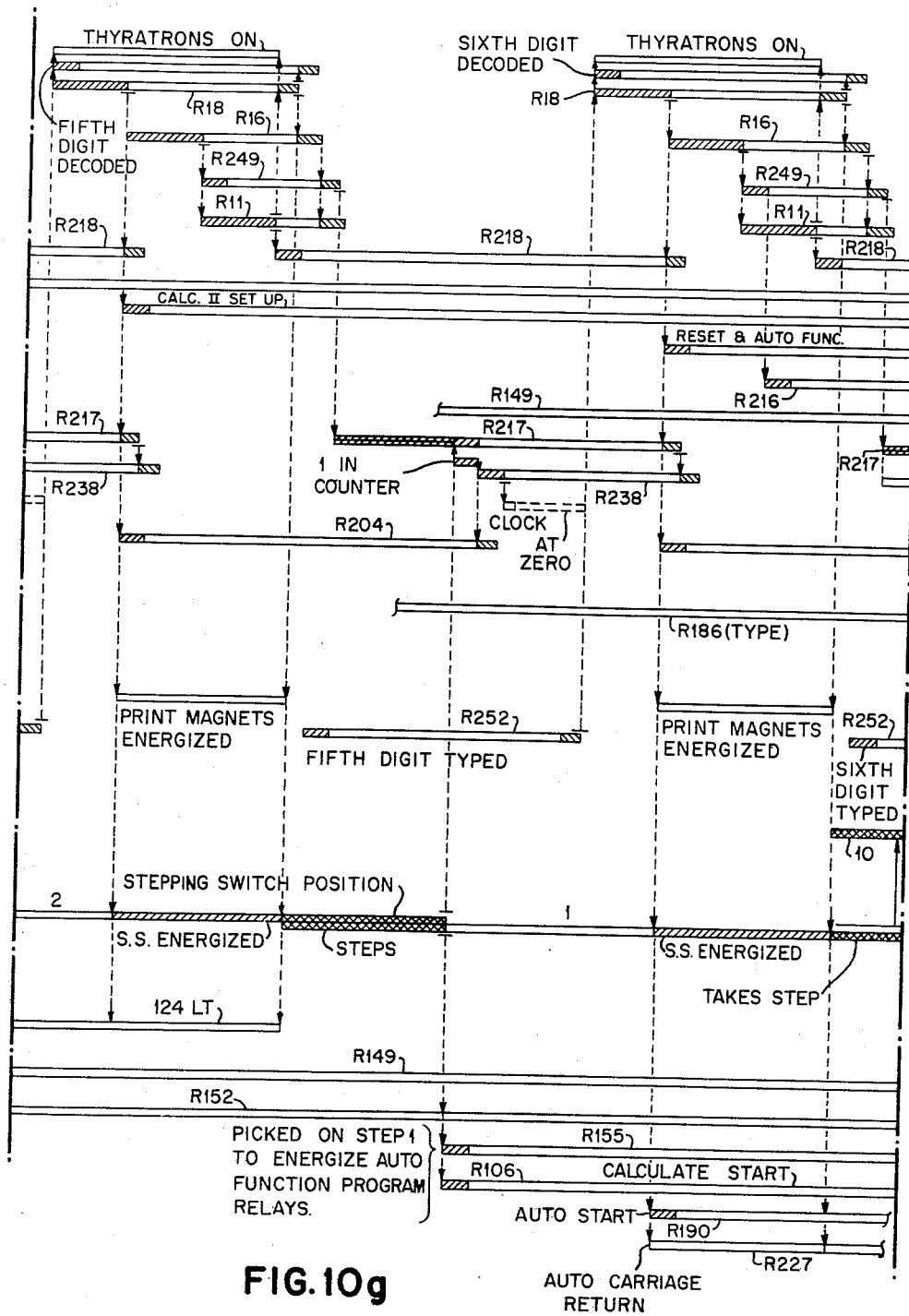
Figure 10H:
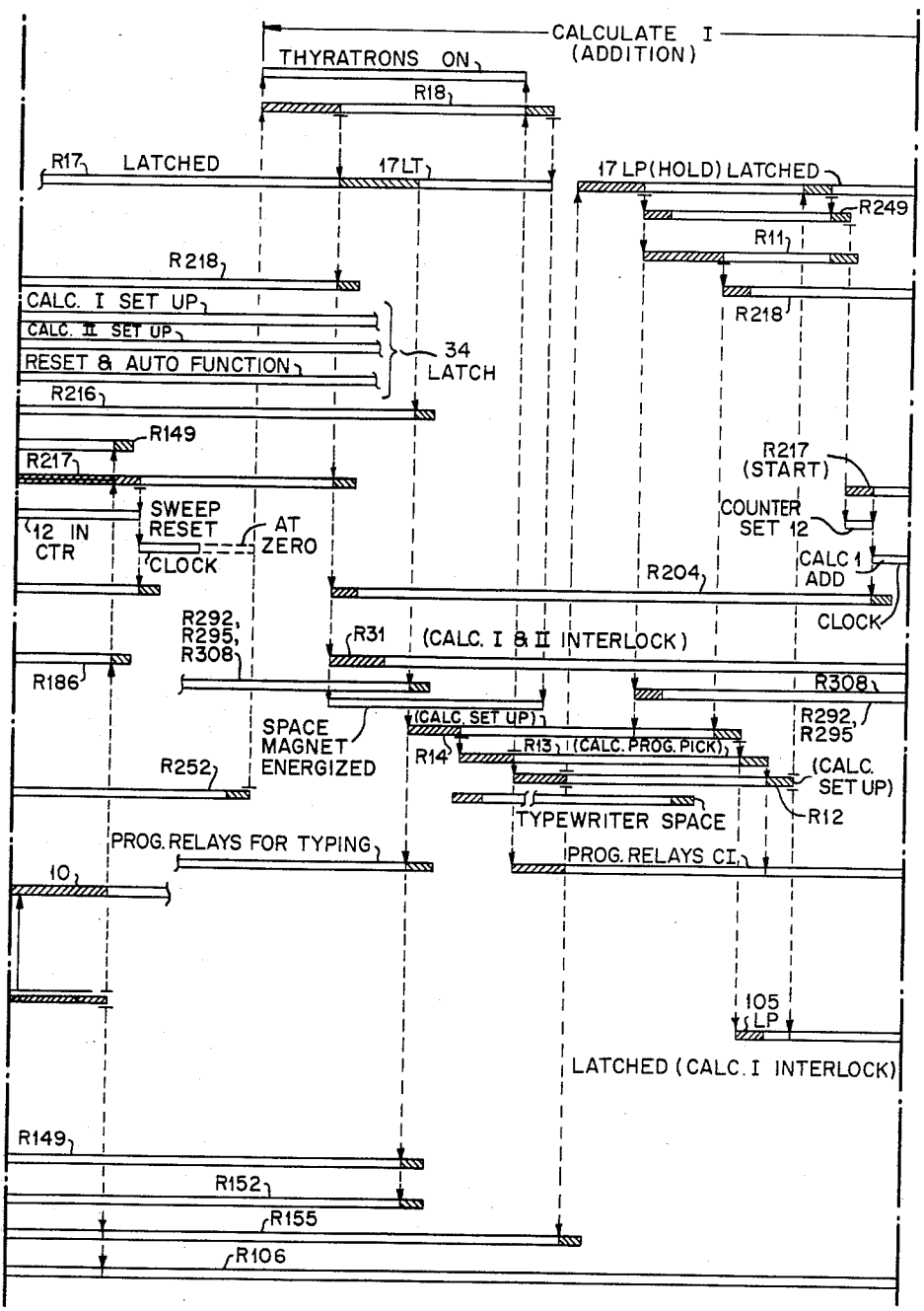
Figure 10I:
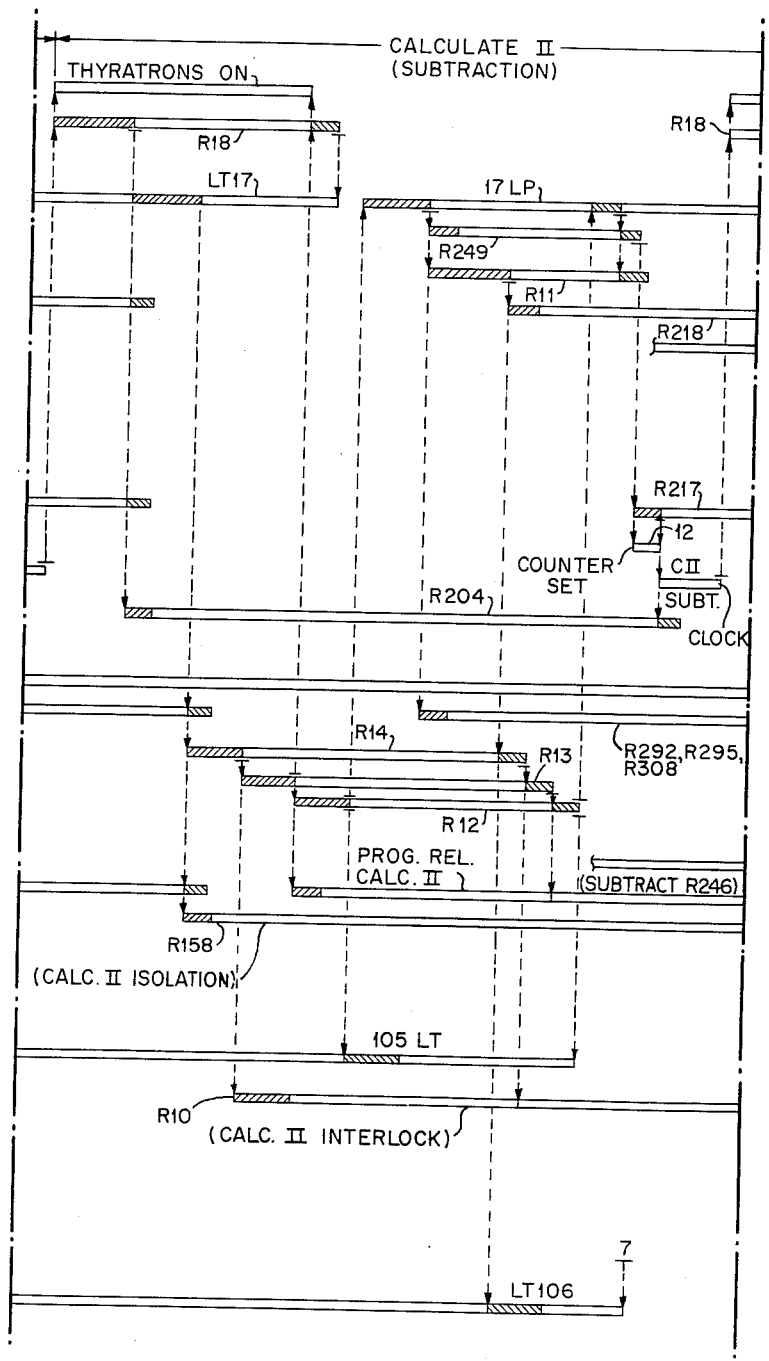
Figure 10J:
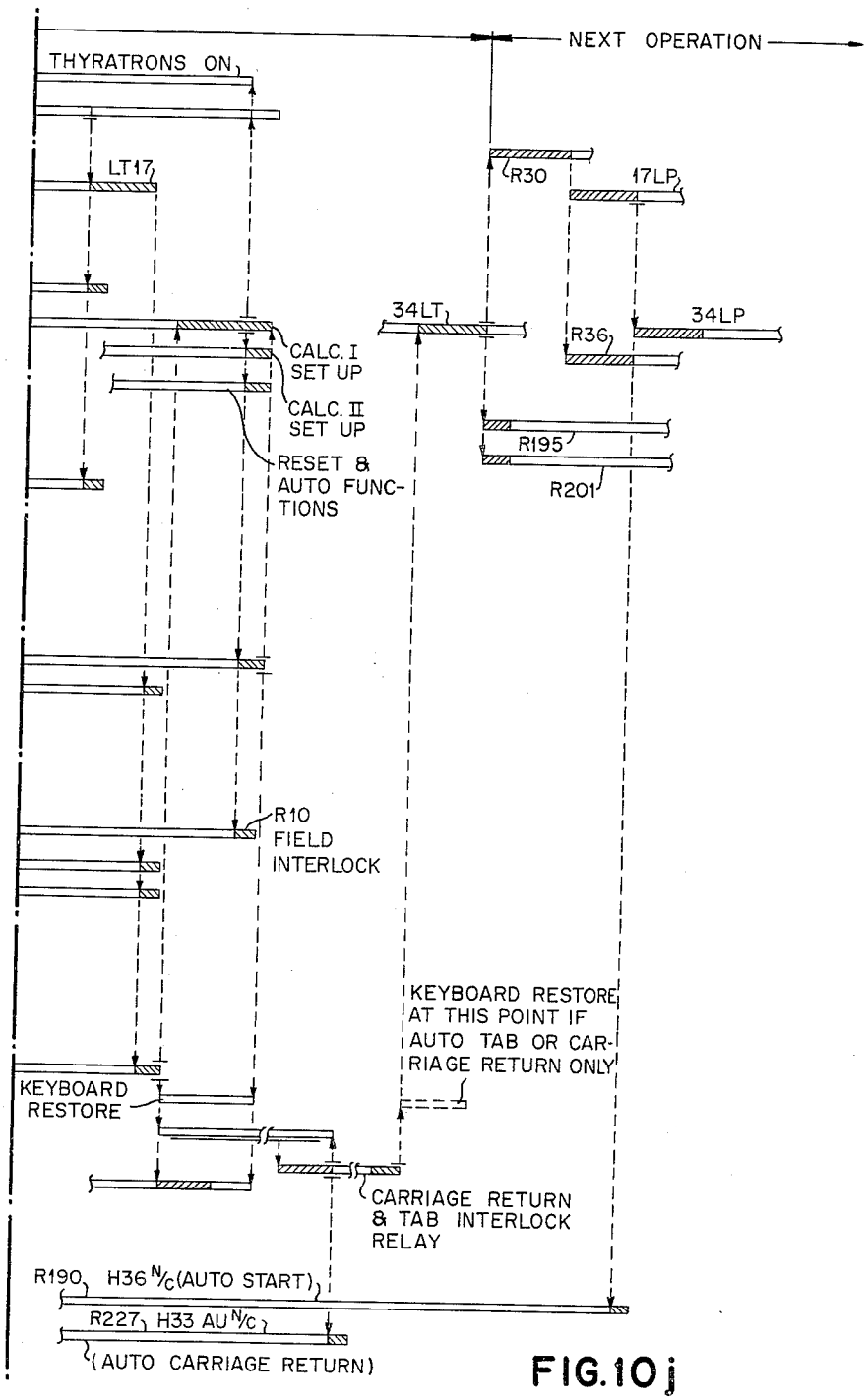
Figures 11, 11A:
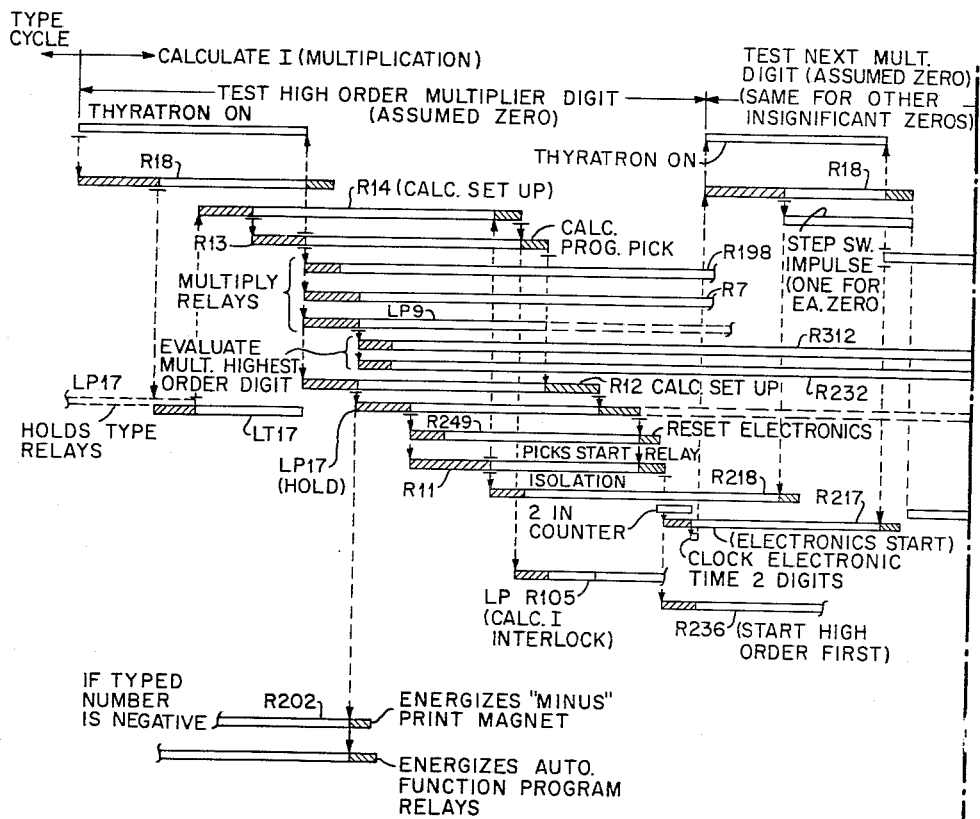

Other objects and advantages of the invention will appear as the detailed description proceeds in light of the drawings forming a part of this application and in which:

FIG. 1 illustrates the program tape employed in the present machine, and FIGS. 1a, 1b and 1c respectively illustrate the manner in which the program tape is used for recording of typing instructions, calculation instructions, and reset and auto function instructions;

FIG. 2 graphically represents certain timing relationships used in the operation of the machine;

FIG. 3 shows in schematic form the more important components employed in the business machine and the flow of information between these components and indicates the control asserted by certain of the components over other components;

FIGS. 4a and 4b, arranged as shown in FIG. 4, show the arrangement of the timing generator and timing signals generator which control the electronic phase of operation of the machine, and FIGS. 5a and 5b, arranged as shown in FIG. 5, graphically represent the generation of timing signals by these units;

FIGS. 6a and 6b, arranged as shown in FIG. 6, represent the arrangement of the accumulator unit;

FIGS. 7a–7g, arranged as shown in FIG. 7, show the construction and arrangement of the storage drive unit, storage unit and counter unit, and FIGS. 8a and 8b, arranged as indicated in FIG. 8, graphically represent certain timing relationships occurring in the operation of these units during a column shift operation;

Figure 9E:
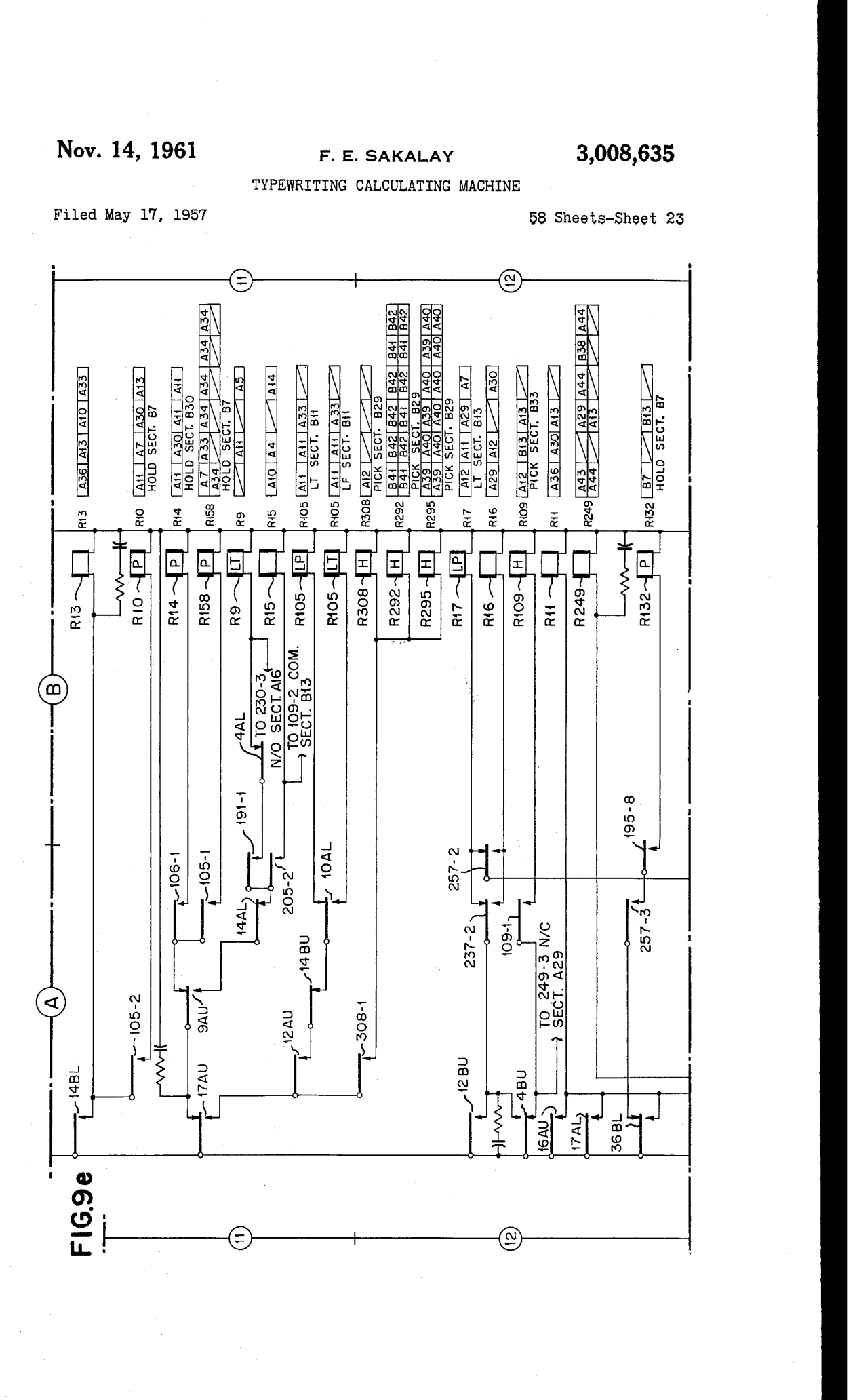
Figure 9L:
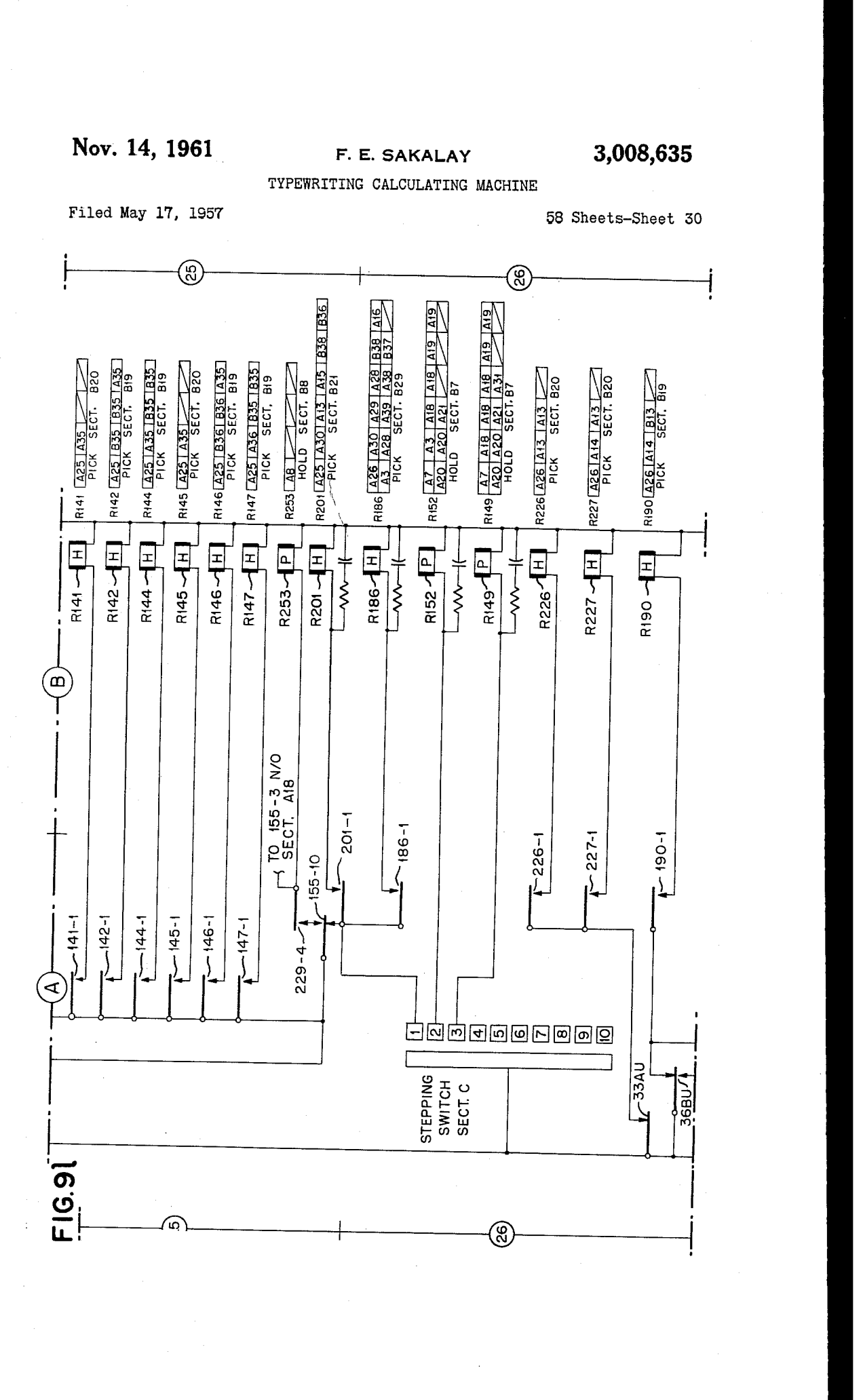

FIGS. 9a–9v, arranged in sequence from 9a to 9v, show the circuit arrangement of a relay system employed in the machine and identify in the tabulation of FIG. 9v the location of each relay; and FIGS. 10a–10j arranged as in FIG. 10 and 11a–11h arranged as in FIG. 11 graphically represent the relay operations prevailing during various specified types of operation of the business machine.

GENERAL ORGANIZATION AND OPERATION

The business machine described herein includes a computer operating in conjunction with and functionally controlled by a typewriter, the latter enabling normal manual typing operations and also serving to type out numeric information both as supplied to the computer by a typist and also that resulting from computations. This enables form preparation by use of numeric information entered into the computer, by use of numeric information resulting from several types of computation, and by information typed onto the form by the typist.

The types of arithmetic computation which may be performed by the computer are addition, subtraction, multiplication, accumulation of several major and minor totals for use as desired, and rounding off by half adjusting and 2-position or 3-position column shifting. Each of these is under program control pre-established for each individual form in preparation and readily changeable with change of the form. Each form is divided into vertical "fields" extending from left to right across the form, and each such field is subject to individual program control and contains a preselected number of character spaces within which a numeric "word" may be typed. A character space is automatically provided between each of successive fields.

A numeric field may contain as many as 10 digits of numeric information (comprising a 10 digit numeric word) or may be selected if desired and under program control to have a reduced value of 6 digits. Dollar and cents punctuation is normally automatically provided, but may be eliminated under program control within each numeric field. Accordingly, the numeric digit requirements of a field together with punctuation and the space automatically provided between fields results in values of field width varying from a minimum of 7 character positions (6 digits without punctuation) to a maximum of 14 character positions (10 digits with punctuation). In practice, there will ordinarily be provided a number of numeric fields at both the left hand and right hand sides of the form and the center of the form will therefore be available for descriptive information to be typed.

Successive words of numeric information typed underneath one another in any given numeric field have their unit digits automatically lined up vertically to produce an even right hand margin for the field. Zeros to the left of the first significant digit of a numeric word are automatically suppressed (not typed) but all zeros following the first significant digit are typed. For example, when a 3 digit numeric word is typed in a 6 digit field without punctuation, the typewriter will automatically space three times (one space for each high order zero) and then type the three digits. When dollar and cents punctuation is not suppressed under program control, the decimal point has the effect of a significant digit so that a numeric field having no digits to be typed is then actually typed with two zeros to the right of the decimal point; without punctuation, the typewriter in this instance would simply automatically space through the entire field.

When a numeric word of negative algebraic value is typed from storage in the computer, a minus algebraic sign is automatically typed in the interfield space following the given field. When a positive numeric word is typed from a storage unit used for major and minor totals, a final total switch in its On position causes a "T" to be typed in the space following the numeric word of the given field; however, a negative numeric word typed under the same conditions causes an asterisk to be typed in the space following the given field.

Manual typing can be performed by the typist at any time the computer is not operating. It is not necessary to program a special field just for manual typing, and any field can be manually typed over without affecting the program. Thus when the computer is not performing an actual computation, the typewriter is available for normal manual typing, and this is always true whether the computer happens to be energized or deenergized at any time. In other words, it is only during those brief intervals when a computer is performing an actual computation that the keys of the typewriter are automatically locked against manual actuation.

All numeric information is manually entered into the computer through a ten-key numeric keyboard having an individual key for zero and each of the digits 1 through 9. This keyboard arrangement preferably is one similar to a standard ten-key adding machine to enable a person skilled in the operation of an adding machine to operate the keyboard of the present arrangement with equal facility. In entering numeric information into the computer, the numeric words are entered serially by digit from the highest order digit to the lowest order digit. Thus the last numeric digit entered is always the units digit. Zeros preceding the highest order first significant digit are not entered, but zeros of lower order are entered. Dollars and cents punctuation, if it is desired, is not manually entered into the computer but is automatically inserted as a numeric word is typed out. The numeric information thus entered into the computer is initially stored in an entry or "buffer" storage unit and may thereafter be transferred to storage in any of seven additional storage units.

All of these storage units are of the ferrite core matrix type having a construction similar to that shown and described in the copending application of Edwin W. Bauer et al., Serial No. 443,284, filed July 14, 1954, now Patent No. 2,889,540, and entitled Magnetic Memory System With Disturbance Cancellation, and the copending application of Richard G. Counihan, Serial No. 440,983, filed July 2, 1954, now Patent No. 2,902,677, and entitled Magnetic Core Current Driver. All have a capacity of ten numeric digits together with the algebraic sign of each digit. This provides a storage capacity, in the arrangement herein described, of eight numeric words although this storage capacity may readily be extended by use of additional storage units and entry selection relays if desired. Storage of a numeric word occurs in the binary-coded decimal form. Four storage units including the buffer storage unit having unlimited access may be used as either the source or the receiver of numeric information and are used principally for computational purposes. As earlier mentioned, all numeric digits manually entered from the ten-key numeric keyboard into the computer go directly to storage in the buffer storage unit; this is the only way of getting a numeric word into buffer storage and entry of a numeric word from some storage unit into the buffer unit cannot be programmed. Thus as each key of the numeric keyboard is manually actuated, the value of the digit is coded in binary form and is entered directly into the accumulator and from there into buffer storage. The remaining four storage units have limited access and are used only to receive numeric information resulting from any computation.

Numeric information entered into the buffer storage unit, or stored in those storage units having unlimited access, is used for computations performed for each successive numeric field under program controls applicable to that field. In this, two successive calculations may be programmed for each numeric field, but in the absence of programming cannot be suppressed and accordingly result in two successive "dummy" additions in each of which a numeric word is taken from buffer storage and after having a zero added to it is returned to storage in the buffer unit. The results of computations may be selected to be typed out in a succeeding numeric field, may at the same time be accumulated in a major or minor total storage unit or both, or may be stored for use in a subsequent programmed calculation within a later numeric field. The computational process is such that a numeric word with a negative algebraic sign is stored in complemented form but is automatically changed to true form when it is typed and a minus sign is automatically typed in the inter-field space following the typed number.

All numeric information is transmitted within the computer serially by digit and serially by binary-code bit; the transmission by serial bit may occur either from high-order to low-order bit or vice versa depending upon the operation performed. Numeric information entered from the numeric keyboard to buffer storage is serial by digit but parallel by binary-code bit. The numeric output from the computer to the typewriter is decoded in transit from binary form to decimal form, and is transmitted serially by digit beginning with the highest order digit. The binary code used throughout the computer is of the 1, 2, 4 and 8 bit type, and each numeric word is transmitted and used in computations in binary-coded decimal form. In certain instances numeric words are taken directly from storage by proceeding from the highest order digit toward the lowest order digit ("high order first"), but most often are taken by proceeding from the lowest order digit to the highest order digit ("low order first"). For example, numeric information typed from storage proceeds by high order first digit selection to ascertain the algebraic sign of the numeric word to be typed, and thereafter a low order first access to storage process is used although the result of that process has the same effect as though high order digit first selection had been employed throughout; addition and subtraction occurs by low order first digit selection; and in multiplication the multiplier is taken by high order first digit selection (passing rapidly over any high order zeros preceding the highest order significant digit) until the first significant digit is sensed and thereafter a low order first access to storage process is employed to select further multiplier digits for use such as in the type-out operation, whereas the multiplicand is taken from storage by low order first digit selection and the partial product and final product is placed into storage by low order first digit selection.

All entry of numeric information from the ten-key numeric keyboard, all typing of computational numeric information, and all computational operations occur numeric field by numeric field under control of a program tape. This tape is divided into eight longitudinal rows of index points defining eight control channels, as illustrated in FIG. 1, and as many lateral columns of index points as there are available typing spaces on the typewriter. This tape is moved longitudinally by a gear driven connection with the typewriter carriage, and moves index-point column by index-point column in either direction with motion of the carriage from typing space to typing space. Thus the position of each index-point column corresponds to an individual typing space column on the form being prepared. As will presently be explained more fully, certain of the index-point columns within each selected numeric field are punch-hole coded for program control process. The tape moves through a tape reader fixedly located on the rear of the typewriter, and the punched holes of each index point row are read by an individual star wheel which upon sensing a punched hole actuates an individual electrical contact to a closed circuit position thus to translate the program specified in an index-point column of the tape into electrical controls. The star wheel and associated contact construction may conveniently be that shown and described in the copending application of Robert E. Edminister et al., Serial No. 473,385, filed December 6, 1954, now Patent No. 2,800,-539, and entitled Program Device. To change a program when changing from the preparation of one type of form to another, all that is required is a change of the program tape and resetting of the typewriter margin and tab stops to correspond to the fields defined by the new tape.

As indicated in FIG. 1, the first column of index points in each numeric field defines the beginning of that field and is devoted to a program relating to typing instructions; the fourth from the last column of index points is devoted to program instructions for the first computation to be performed (usually involving the numeric information entered by the ten-key numeric keyboard in that field); the third from the last column of index points is devoted to program instructions for the second computation to be performed within the field, and the second from the last column of index points is devoted to certain programmed automatic function instructions. The last column of index points is never used and corresponds to the space automatically inserted between numeric fields and which is thus available for typing the minus sign of a negative number or the two types of total indication previously mentioned.

The general mode of operation, briefly considered, takes place in the following sequential order. While the typewriter stands at a character space corresponding to the first column of index points defining a given numeric field, the operator enters a number into the computer by manual actuation of the ten-key numeric keyboard. Having completed this entry, the operator actuates a "motor bar" on the keyboard and the typewriter is thereupon placed in operation and is caused automatically to type out either the numeric information just entered into the computer or numeric information resulting from the computations performed in a preceding numeric field. As this numeric information is typed out, the typewriter carriage moves through the numeric field and the two programmed computations of that field are successively read and stored in relays as is also the program of automatic function instructions at the end of the field. After this field has been typed out and the typewriter has automatically spaced at the end of the field, the computer becomes operative, completes the two successive computations stored in the relays, and thereupon transfers control over the typewriter to the programmed automatic function instructions. These automatic control functions may provide an automatic start into the next numeric field without further operator attention, may provide an automatic tabulation or an automatic carriage return of the typewriter carriage, may accomplish any of several types of clearing or resetting of the core storage units of the computer, or may provide a rounding off of a numeric word in storage preliminary to the use of that word in a subsequent operation.

FIG. 1a illustrates the several types of programmed typing operations which may be specified in the first column of index points of a numeric field. These instructions relate to typing operations, of which the instructions of channels 1 through 5 are used generally in successive numeric fields whereas the instructions of channels 6 and 7 are used for typing final totals only. The eighth channel is always punched in this column to define the beginning of each numeric field. This makes it necessary that the typewriter carriage be located at the beginning of a numeric field before any operation involving the computer can start. The first channel relates to punctuation; automatic insertion of dollars and cents punctuation normally occurs unless it is suppressed by a punch at this index point. A programmed selection of a six or ten digit numeric field width is made by punching or leaving unpunched the second index point of this column. The third, fourth and fifth channels define the information source from which numeric information is taken for typing in the numeric field defined by this column of index points. Buffer storage is used the most during operation of the computer, so that unless a numbered storage group is selected as the information source for typing the information will be typed from buffer storage. The final-total storage channels 6 and 7 are active only when a final-total switch, positioned on the ten-key numeric keyboard, is manually actuated to its On position. As will be explained more fully hereinafter, the storage group selected as the information source from which to type a total will always be reset or cleared after a final total is taken. In an operation where typing of a final total is specified, the two programmed computations of the numeric field within which the total is typed are automatically passed over and therefore do not take place; however, the punctuation channel 1 and field width channel 2 programs remain active.

The two index-point columns which are used in each numeric field of the program tape for computation programming may record numerous computational instructions in the manner illustrated in FIG. 1b. The first two channels define the type of calculation to be performed during each computation. As will presently be explained more fully, there are three time periods during each computation interval; two of these are called for convenience the A-read and B-read times, and the third is called C-store time. As indicated in FIG. 1b, the buffer storage unit or any other one of the seven storage units may be programmed to supply information for computation during A-read time, and the buffer unit or any of the first three storage units may be programmed to supply information for computation during the B-read time. Where information is supplied from a storage unit during A-read time, that storage unit is thereafter cleared of the information which is previously stored (that is, the storage unit is "reset") and the results of computation are subsequently automatically stored in this unit during C-store time.

The nature of the available storage reset and automatic control functions which may be programmed are indicated in FIG. 1c. In channel 1, the storage unit from which information is supplied for typing may be cleared or not as desired. Normally a storage unit will not be reset unless it is reset by specific program instruction. When channel 1 reset is used, the numeric word will be typed out and the storage unit reset to zero before the computations of that numeric field begin. It may be noted in passing that storage units are normally programmed to be reset at the time numeric information is used from them for the last time. Channels 2 and 3 permit reset of storage units from which information is supplied for computational process during B-read time for the first and second computations. Channel 4 controls the automatic starting, without operator attention, of the operations called for by the next succeeding numeric field. This automatic start, however, does not take effect until both computations of the present field are completed. This is true also of the next automatic control to be mentioned. Channel 5 provides for an automatic tabulation to the next tab stop, which may be the beginning of a numeric field or an intermediate point of a portion of the form reserved for typing of information. Channel 6 enables automatic carriage return after some numeric field (usually the last such field) has been typed, and channel 7 may be programmed to provide rounding off by half adjusting and column shifting three times. In using this program, it must be used without half adjust and column-shift-2 programming of a computation in order to effect the third column shift called for by channel 7 of the automatic control functions programming.

It will be apparent from the foregoing that the normal sequence of operations initiated by numeric keyboard entry starts with the keyboard entry, is followed by a typing operation either of the numeric information entered or that resulting from a previous computation, that during this typing opertion the program instructions for two computations are read and stored, that upon conclusion of the typing operation and after the automatic space with which this operation always concludes the two computations are successively performed, and upon completion of the last of the computations the automatic control functions (the programming of which were previously read and stored) are executed. In this sequence, the typing operation is always initaited by a subinterval during which a "negative balanc test" is performed to ascertain the algebraic sign of the numeric word to be typed out, and this is then followed by ten subintervals during which each of the tens digits of the numeric word is actually typed. The typing interval is terminated by a final subinterval during which the carriage is automatically spaced to place it in position to execute the succeeding numeric field. These several subintervals are represented in FIG. 2, and it will be seen that each subinterval includes a relatively long relay operational period followed by a relatively short electronic (computer) operational period. This is shown more clearly in expanded view for the tenth digit typing subinterval. As further shown in FIG. 2, the electronic portion of the subinterval is divided into the A-read, B-read and C-store times above mentioned, each of these in turn is divided into binary 1, 2, 4 and 8 times, and each of the latter in turn is divided into three periods during which successive Set, Read and Write pulses are generated and used to control the operational sequences of the computer.

The purpose in providing the time divisions and subdivisions last described and illustrated in FIG. 2 will be more apparent when it is considered, as previously explained, that transfer of numeric information within the computer occurs serially by digit and serially by digit bit. Thus in a computation by addition, the 1, 2, 4 and 8 bits of the units digit of the first numeric word are taken successively from storage and are added to the successively presented 1, 2, 4 and 8 bits of the units digit of a second numeric word, and the results of this addition are returned serially by bit to storage; the successively translated bits of the tens digit of the first word are then added to the successively translated bits of the tens digit of the second word and the results are placed serially by bit into storage; and each higher order digit of the first and second words are similarly added digit by digit and placed in storage.

*General system arrangement*

The business machine herein described has a general arrangement as represented in block diagram form in FIG. 3. Numeric information is entered into the computer by manual actuation of a ten-key numeric keyboard 3–10 and is transmitted, as indicated by the arrow 3–11, serially by digits (high order first) and parallel by binary code bits into an accumulator 3–12 for temporary storage. The actuation of each such key energizes through a circuit 3–13 a relay system 3–14 which thereupon initiates a sequence of relay operations. Upon completing this sequence, the relay system 3–14 initiates, as indicated by the arrow 3–15, the operation of a timing generator 3–16. The timing pulses generated by the latter are supplied through a circuit 3–17 to a timing signal generator 3–18, which is controlled in operation by the relay system 3–14 as indicated by the arrow 3–15a, and through control circuits 3–19 and 3–20 controls the timed operations of the accumulator 3–12 and a storage drive unit 3–21 additionally controlled by the relay system 3–14 as indicated by the arrow 3–15b.

The numeric digit information temporarily stored in the accumulator 3–12 is thereupon transferred serially by bit (again high order first) through a circuit 3–22 to the storage drive unit 3–21 and from the latter into a buffer storage unit included in a storage structure 3–23. The relay system 3–14, through a circuit 3–24, also sets a numeric 12 in a counter 3–25. The operation of the latter is controlled by timing signals supplied through a circuit 3–26 from the timing signal generator 3–18, and the counter through circuits 3–27 and 3–28 so controls the storage drive unit 3–21 and the accumulator 3–12 that digits of successively lower order successively entered through the numeric keyboard 3–10 become stored in buffer storage in structure 3–23 in proper order.

That is, the first entered digit of highest order is initially stored in the buffer storage unit of storage structure 3–23 in the units storage position, but is shifted to a higher order storage position upon entry of a second digit from the keyboard 3–10. This transfer of digits to higher order storage positions in buffer storage continues until the last digit is entered from the keyboard 3–10.

As the first digit is entered into buffer storage in the storage structure 3–23, the buffer storage unit is automatically cleared of all numeric information which it may previously have stored. It will be apparent from this that if an insufficient number of numeric digits is entered into buffer storage by the operator completely to fill its storage capacity, the higher order unused storage positions of the buffer unit are filled with zeros. Now whenever a word in storage is taken out effectively high order first, as occurs for example in typing the numeric word from storage, the zeros last mentioned are taken out ahead of the first significant digit of the stored word.

As explained above, a numeric word may be taken from storage in the storage structure 3–23 to be automatically typed in a specified numeric field of the form in preparation. This typing operation is program controlled by the program tape 3–29 which through a circuit 3–30 selects program relays in the relay system 3–14. When a typing operation is thus programmed, it may be initiated by an auto-function control of the program tape 3–29 or by manual actuation of a motor bar 3–31 which through a line 3–32 initiates operation of the relay system 3–14. The latter thereupon so controls the storage drive unit 3–21 that the numeric word to be typed is selected from a storage unit of the storage structure 3–23 and is transferred serially by digit (high order first) and serially by bit (high order first) to the accumulator 3–12. The accumulated bits of each such digit are then applied in parallel through a line 3–33 to the relay system 3–14, which thereupon through a line 3–34 controls the typing operation of a typewriter 3–35 to type the selected numeric word.

A computation by addition is accomplished by selecting the augend from the storage structure 3–23 at A-read time and placing it in the accumulator 3–12, and selecting the addend from storage at B-read time and placing it also in the accumulator. The latter thereupon adds these numeric words as indicated by the broken line 3–36, and transmits the sum at C-store time through the circuit 3–22 to the storage drive unit 3–21 which places it in the storage unit of the storage structure 3–23 from which the augend was taken at A-read time. In this, it should be remembered that all digits are transmitted from storage to the accumulator 3–12 serially by binary-code bit, and that the addition process is completed serially by bit and by digit. Transmission of the sum to storage is likewise serially by bit and serially by digit. In the addition process, the counter 3–25 is initially set to store a 12, counts down for each digit addition, and terminates the addition process when additions in twelve possible digit storage positions of the storage units selected have been completed. As mentioned, the augend read out of storage at A-read time receives the sum at C-store time, and the addend which is read out from a second storage unit at B-read time is not only read out to the accumulator as described but is also placed back into storage (serially by bit and serially by digit) as indicated by the broken arrow 3–37 unless a program instruction has specifically required that this storage unit be cleared of previously stored information.

A computation by subtraction is essentially the same as that described for addition except that the second numeric word taken from storage at B-read time is changed by the accumulator to complement form as it is inserted into the accumulator, and this complementing results as is well known in a subtraction of the second numeric word from the first. Here also the results of subtraction are placed at C-store time back into the same storage unit from which the first numeric word was read out at A-read time. The numeric word read out at B-read time from storage is immediately re-stored in the B-read time storage unit, but this occurs without complementing.

Multiplication is performed as an over-and-over addition. The multiplicand is always stored in the buffer storage unit, and the multiplier is stored in some other storage unit. Multiplication is initiated by first transmitting the multiplier from storage high order first to the accumulator. Any high order zeros which precede the highest order significant digit are rapidly passed over and the latter is then evaluated by the relay system 3–14 and its value set in the counter 3–25. In this evaluation process, the counter 3–25 is set initially at 2 and thereafter at 1 and upon counting down each time to zero causes the accumulator (as indicated by the broken line arrow 3–38) to read out to the relay system 3–14 for evaluation the digit standing in the accumulator at that time. When the highest order significant digit of the multiplier is found, a stepping switch in the relay system 3–14 (stepping down from an initial setting of 10, or 6 if a six digit numeric field is programmed) takes control of the multiplier evaluation process and thereafter determines the digit positions in storage to be subsequently evaluated to ascertain the numeric value of each successive lower order digit of the multiplier. During each of these subsequent evaluations of multiplier digits the transfer of multiplier digit information from storage to the accumulator is changed to be of the low order first type, the position in storage of a given multiplier digit to be evaluated is inserted into the counter 3–25, and the multiplier digit is then reached in storage by transferring all lower order digits in turn successively to the accumulator and back to storage accompanied by a column shift upward after each such transfer. The counter counts these successive transfers and when it has counted down to zero, the multiplier digit sought will stand in the accumulator and be evaluated by readout to the relay system 3–14.

Having evaluated the highest order multiplier digit in the manner last described, the counter 3–25 is then set to the multiplier digit value and the multiplicand is taken from the buffer storage unit at each B-read time and added over and over to a partial sum which is taken to the accumulator at A-read time of each additive step and re-stored at C-store time in a program-selected storage unit of the storage structure 3–23. The number of these over-and-over additions corresponds to the number set in the counter which, as mentioned, corresponds to the value of the highest order digit of the multiplier. When this over-and-over addition process is completed, a column shift up of the partial sum (now a partial product) occurs. The next lower order digit of the multiplier is evaluated in the manner previously explained, its value is set into the counter 3–25, and an over-and-over addition and column shift up takes place as before using the partial product as the augend and the multiplicand as the addend at each additive step. This multiplication process continues until completion of the last over-and-over addition, corresponding to the lowest order digit of the multiplier, to leave the product stored in the selected storage unit of the storage structure 3–23. Since the present arrangement is one having a fixed decimal point, a multiplication involving two fractional numbers is followed by programming a subsequent calculation to half adjust and column shift down the product in storage. The effect of this latter operation will now be described.

One of the program operations performed during either the first or second calculation of each numeric field is a half adjust and column-shift-2 operation. Here the numeric word to which the operation applies is taken from storage and translated through the accumulator back into storage, and a numeric 5 is added to it at the third fractional digit from the units digit as the numeric word moves through the accumulator. After the word is returned to storage each time, it is column shifted down in storage. Since there are no digit storage positions provided beyond two decimal places, all digits of lower order than this will be lost as a result of the column shift down operation.

Dollars and cents punctuation, unless suppressed by specific program control, is automatically inserted by the relay system 3–14 as the latter controls the typewriter 3–35 to type out a numeric word.

The relay system 3–14 also receives any program instruction relating to a reduced width of numeric field, which is normally ten digits wide, and selects the lesser field by its control over the other components of the system.

Selection of storage units of the storage structure 3–23 for various purposes under program control is also accomplished by the relay system 3–14, principally by its control over the storage drive unit 3–21. This is true also for resetting storage units when they are to be cleared of information previously stored.

An automatic start operation when programmed is also executed by the relay system 3–14 in its general control over the computer, and auto-tabulation and auto-carriage return program instructions are executed by the relay system 3–14 in its control over the operation of the typewriter 3–35.

*Timing generator and timing signal generator*

The timing generator and the timing signal generator exercise overall timing sequence control during the electronic phase of the computer operation, and their detailed construction and operation will accordingly be described at this time.

It is the purpose of the timing generator to initiate and terminate the operating interval of the computer and during this interval to supply "clock" pulses, of five microsecond duration and ten microsecond repetition rate, to the timing signal generator for use by the latter in generating numerous timing signals.

The timing signal generator generates the A-read, B-read and C-store interval timing pulses which control the periods of readout and storage of numeric information. This generator also generates the 1–2–4–8 bit timing interval pulses during each of the A-read, B-read and C-store intervals, and further generates the Set pulses, Write pulses and Read pulses during each of the 1–2–4–8 bit intervals as previously described in connection with FIGURE 2. The nomenclature given the Read and Write pulses is believed self-evident, but the nomenclature applied to the term "Set pulses" merits consideration. These pulses serve a dual purpose, one being to reset certain electronic components and the other being to "set" a digit value into the accumulator and to "set" a digit standing in the accumulator into storage.

The circuit arrangement of the timing generator, and of that portion of a timing signal generator which relates to the generation of Set, Write and Read pulses, is shown in FIGURE 4a. The remainder of the timing signal generator is shown in FIGURE 4b. FIGURES 4a and 4b should be considered together as a unitary structure as indicated in FIGURE 4.

In the following description of the timing generator and timing signal generator, a number of relays of the relay system are involved and in general only those relay contacts which affect the generator operation are specifically shown in FIGS. 4a and 4b. The detailed circuit arrangement of the complete relay system is shown in FIG. 9 to which reference will be made from time to time in describing not only the present generators but also in describing other components of the computer. Accordingly, the actual details of the realy control and intercontrol, insofar as the relay system is concerned, will only be indicated at this time and inspection of the complete relay system of FIG. 9 will enable the specific details of the relay operation concerned to be ascertained.

The timing generator includes a trigger 4–10 which is reset Off prior to the beginning of the electronic operation. A positive potential is normally applied through a series of resistor 4–11 and shunt connected series resistor 4–12 and condenser 4–13 (these latter elements providing a noise filter network) to the turn-on input circuit of the trigger 4–10. This trigger is turned On when this positive potential is removed from its input circuit by the closing of start relay contacts 217–3, thereby to connect this input circuit to ground through the normally closed "Type" relay contacts 186–9 and the normally closed Multiply Test Cycle relay contacts 232–9. The trigger 4–10 may also be turned On by closure of the Start Test and Type relay contacts 238–1. The trigger 4–10, upon turning On, applies a positive potential through a cathode follower 4–14 to turn On a 100 kilocycle multivibrator 4–15. The latter generates pulses of five microsecond duration and ten microsecond period, and these pulses are applied to a trigger 4–16 which operates in binary fashion alternately to be turned On and Off by successive pulses applied from the multivibrator 4–15. This trigger is also rest Off prior to the initiation of the electronic operation, whereas the multivibrator 4–15 is initially reset On.

Accordingly, when the trigger 4–10 turns On, and applies a positive potential to the multivibrator 4–15 through the cathode follower 4–14, the multivibrator 4–15 begins a cycle of operation and five microseconds later completes a pulse in its output circuit 4–17. The trailing edge of this pulse, decreasing in amplitude, turns the trigger 4–16 On and the resulting increased potential developed in its Off output circuit is translated through a cathode follower 4–18 to an output circuit 4–19. Since the trailing edge of the next pulse generated by the multivibrator 4–15 will again turn the trigger 4–16 Off, it will be apparent that there is developed in the output circuit 4–19 a pulse potential having a period which is one-half that of the multivibrator 4–15. This pulse potential is referred to herein for convenience as an "oscillator-1" potential. The On output circuit of the trigger 4–16 is translated through a cathode follower 4–20 to an output circuit 4–21, and it will be apparent from what has just been said that there is developed in the latter output circuit a potential also of pulse wave form but of opposite polarity to that developed in the output circuit 4–19. The potential of pulse wave form developed in the output circuit 4–21 is hereinafter referred to for convenience as an "oscillator-2" potential.

The potential developed in the On output circuit of the trigger 4–16 is also applied through an inverter 4–23 to an AND gate 4–24, and the On output circuit of the multivibrator 4–15 is likewise applied through an inverter 4–25 to the AND gate 4–24. Thus whenever the multivibrator 4–15 and trigger 4–16 are both On, a positive potential is developed in the output circuit of the AND gate 4–24 and is translated through a cathode follower 4–26 to an output circuit 4–27. Since the generation of this potential is controlled by the multivibrator 4–15 which changes its state at five microsecond intervals, it will be apparent that the multivibrator 4–15 closes the AND gate 4–24 to terminate the potential pulse developed in the output circuit 4–27 five microseconds after this pulse began. Accordingly there is developed in the output circuit 4–27 a potential of pulse wave form having pulses of five microseconds duration and having a period the same as that of the oscillator-1 and oscillator-2 potentials. This potential in the output circuit 4–27 is hereinafter referred to for convenience as an "oscillator-3" potential.

The oscillator-1, oscillator-2 and oscillator-3 potentials last described continue to be generated as long as the trigger 4–10 remains in its On state. This trigger is turned Off through an inverter 4–28 by a potential developed in the output circuit of an AND gate 4–29 by the coincidence of five potentials applied to the latter. Four of these potentials are from the counter of the computer and are all concurrently positive when the counter has counted down to zero as indicated by the Boolian algebraic notations applied to the four input circuits of the AND gate 4–29. The fifth potential applied to this gate are Set pulses and is applied through the normally closed contacts of a Multiply relay 308–4. Thus in the absence of a computation by multiplication, the trigger 4–10 is turned Off by a Set pulse each time that the counter of the computer counts down to zero.

FIG. 5 graphically represents the timing relationships occurring in the timing generator just described beginning with the initiation of the electronic operation by turn On of the trigger 4–10. Curve A of FIG. 5 represents the timing pulses generated by the multivibrator 4–15, curve B the generated oscillator-1 pulses, curve C the generated oscillator-2 pulses, and curve D the generated oscillator-3 pulses. The timing signal generator also includes an inverter 4–32 through which the oscillator-2 pulses are applied to turn Off a trigger 4–33 which is normally reset prior to the initiation of the computer operation. The elevated potential thus developed in the On output circuit of this trigger is translated through a cathode follower 4–34 to an AND gate 4–35 to which is also applied the oscillator-3 potential, and through a cathode follower 4–36, the elevated potential developed in the On output circuit of a binary operated trigger 4–37 which is reset Off prior to the electronic operation. The AND gate 4–35 is accordingly conditioned while both of the triggers 4–33 and 4–37 are Off to translate an oscillator-3 potential pulse to its output circuit, and these potential pulses are translated through a cathode follower 4–38 to an output circuit 4–39 as Set pulses.

Immediately after each such Set pulse, the trigger 4–33 is turned On through an inverter 4–40 by an oscillator-2 pulse translated by an AND gate 4–41 conditioned by the Off state of the trigger 4–37. The next oscillator-2 pulse translated by the inverter 4–32 is now effective to turn the trigger 4–33 Off again and an AND gate 4–42 is thereupon conditioned through the cathode follower 4–34 to translate an oscillator-1 potential pulse through an inverter 4–43 to turn On the trigger 4–37. This change of state of the latter operates through the cathode follower 4–36 to close the AND gate 4–41 and thereby prevent translation of the next oscillator-2 pulse to change the Off state of the trigger 4–33. The next oscillator-1 pulse is also translated by the AND gate 4–42 and the inverter 4–43 to turn the trigger 4–37 Off, whereby the next oscillator-2 pulse is enabled to turn the trigger 4–33 On again. This intercontrolled operation of the triggers 4–33 and 4–37 is made evident in FIG. 5 where curve E represents the potential in the Off output circuit of the trigger 4–33 and curve G the potential in the Off output circuit of the trigger 4–37. FIG. 5 also makes evident the fact that the concurrent Off states of the triggers 4–33 and 4–37 permit the AND gate 4–35 to translate only one out of three oscillator-3 pulses, so that the periodicity of the Set pulses represented by curve H in the output circuit 4–39 is only one-third that of the oscillator-3 pulses. It is important to note in connection with the generation of these Set pulses that the reset of the trigger 4–33 On when the electronic operation begins results in a delay in generating the first Set pulse until the trigger 4–37 has completed a cycle of operation. This delayed generation of the first Set pulse has importance, as will later be explained, during keyboard entry of numeric digits to buffer storage.

The Off output circuit potential of the trigger 4–33 is applied through a cathode follower 4–45 to an AND gate 4–46, and there is applied to the latter through the cathode follower 4–36 the On output circuit potential of the trigger 4–37 together with oscillator-3 potential pulses. Thus when the trigger 4–33 is On and the trigger 4–37 is Off, the AND gate 4–46 translates oscillator-3 pulses as Read pulses through a cathode followed 4–47 and a double inverter 4–48 to an output circuit 4–49. The Read pulses thus generated are graphically shown as curve J of FIG. 5, and it will be apparent that they have the same pulse duration and pulse period as the Set pulses represented by curve H but normally lag the latter in point of time by 20 microseconds. It is again to be noted in this connection that since the trigger 4–33 is reset On at the initiation of the electronic operation a Read pulse is the first pulse generated and precedes the first Set pulse. As just mentioned, this fact is important in connection with the entry of numeric information into buffer storage from the ten-key numeric keyboard as will be pointed out more specifically in connection with the key entry operation.

The On output circuit potential of the trigger 4–33 and the Off output circuit potential of the trigger 4–37, translated through a cathode follower 4–50, is applied to an AND gate 4–51 together with oscillator-3 pulses. Accordingly when the trigger 4–33 is Off and the trigger 4–37 is On, the AND gate 4–51 translates oscillator-3 pulses as Write pulses through a cathode follower 4–52 to an output circuit 4–53. The Write pulses thus generated are graphically represented by curve K of FIG. 5.

While the normal mode of operation of the system herein described is one where numeric information is read from a selected storage unit at A-read time (with concurrent clearing of the storage unit as information is read out) and the results of computation are re-stored during C-store time in the same digit storage positions from which the information was read out, the system inherently tends to operate to provide a column shift operation as between information stored at C-store time and that read at A-read time. Such tendency inherently to provide the column shift operation between read and store is therefore permitted to occur or is deliberately suppressed according to the operation performed at any given time. This inherent column shift characteristic is attained, in a manner to be explained more fully hereinafter, by supplying C-store pulses from the output circuit 4–79 of the timing signal generator through the normally closed contacts 291–5 of the Column-shift Suppress relay 291 to an inverter 4–54. The resulting drop in the output potential of the latter at the initiation of C-store time turns On the trigger 4–33 by "pull-over." Undesired column shifting between A-read and C-store is therefore suppressed merely by energization of the relay 291 to open its contacts 291–5.

A plurality of triggers 4–56—4–59 is used in the generation of A-read, B-read and C-store pulses and also in the generation of the 1-bit, 2-bit, 4-bit and 8-bit timing pulses. At the initiation of the electronic operation, the trigger 4–56 is reset On and the triggers 4–57—4–59 are all reset Off. The Write pulses are translated through a double inverter 4–60 as stepping pulses applied to a stepping circuit 4–61 common to all of the triggers 4–56—4–59. The Off output circuit of each trigger is coupled to the turn On input circuit of the succeeding trigger as shown, and the Off output circuit of the trigger 4–59 is coupled to the turn On input circuit of the trigger 4–56 thereby to provide a closed ring counter arrangement. The first Write pulse generated after the initiation of electronic operation accordingly turns the trigger 4–56 Off, but does not affect the state of the triggers 4–57—4–59 which are initially reset Off. The resulting drop of potential developed in the Off output circuit of the trigger 4–56 is applied to the trigger 4–57 to turn the latter On, and each succeeding stepping pulse applied to the circuit 4–61 operates with the same effect to cause these triggers to turn On and Off alternately and successively. The Off output circuits of the triggers 4–56—4–59 are coupled through respective cathode followers 4–62—4–65 to the respective binary-1 timing output circuit 4–66, the binary-2 timing output circuit 4–67, the binary-4 timing output circuit 4–68, and the binary-8 timing output circuit 4–69. Thus as graphically represented in FIG. 5 by curves L, M, N and P, each Write pulse causes the generation in succession of the binary-1, binary-2, binary-4 and binary-8 timing pulses.

The timing pulses last mentioned are generated during each of the A-read, B-read and C-store times. To this end, the Off output circuit potential of the trigger 4–59 is applied through a double inverter 4–70 as stepping pulses to a closed ring counter comprised by triggers 4–71, 4–72, and 4–73. The trigger 4–71 is reset On and the triggers 4–72 and 4–73 Off prior to the initiation of the electronic operation. These triggers are alternately and successively turned On and Off in the same manner as the triggers 4–56—4–59, but this change of state of each of the triggers 4–71—4–73 occurs only at the end of each binary-8 timing pulse. The Off output circuit of the latter triggers is applied through respective cathode followers 4–74—4–76 to the respective A-read output circuit 4–77, the B-read output circuit 4–78, and the C-store output circuit 4–79. Thus it will be clear that each A-read time, graphically represented by curve Q of FIG. 5, includes the four binary bit timing pulses and this is true also for each B-read time represented in FIG. 5 by curve R and each C-store time represented in FIG. 5 by curve S.

*Accumulator construction and operation*

The accumulator arrangement is shown in FIGS. 6a and 6b which should be considered together as a unitary structure as indicated in FIG. 6. The accumulator employs a binary-1 trigger 6–10, a binary-2 trigger 6–11, a binary-4 trigger 6–12 and a binary-8 trigger 6–13, each of which operates in binary fashion by alternately turning On and Off in response to successive pulses applied to its common input circuit. The On output circuit of the triggers 6–10—6–12 are coupled to the binary input circuit of the succeeding trigger through respective cathode followers 6–14—6–16, respective OR units 6–17—6–19, cathode followers 6–20 and 6–21 (there being no corresponding cathode follower in the output circuit of the OR unit 6–19), and respective inverters 6–22—6–24 as shown. The On output circuit of the binary-8 trigger 6–13 is coupled through a cathode follower 6–25 and an AND gate 6–26, to which B-read pulses are applied from the output circuit 4–78 of the timing signal generator, and an inverter 6–27 to the binary input circuit of a binary operating carry trigger 6–28.

The accumulator triggers 6–10—6–13 are each of conventional trigger construction including two vacuum tubes having the anode of each tube coupled to the control grid of the other tube. While not shown for simplicity in FIG. 6b, these triggers are each set to an individual On or Off state during entry of numeric information from the numeric ten-key keyboard. This is accomplished by key lever actuated contacts (shown in FIG. 9) which interrupt the control grid circuit of a selected tube of each accumulator trigger, thereby assuring that the appropriate one of the trigger tubes is rendered conductive and the other non-conductive as required to insert the numeric digit into the accumulator triggers. Except for keyboard entry of numeric information into the accumulator triggers, they are normally all reset Off by the Set pulse of binary-1 time of A-read time. Thus as shown in FIG. 6b an AND gate 6–31 is conditioned by A-read pulses applied to it from the output circuit 4–77, binary-1 timing pulses applied from the output circuit 4–66, and Set pulses from the output circuit 4–39 of the timing signal generator. The translated Set pulse is further translated through a cathode follower 6–32 and is applied to the input circuits of four inverters 6–33—6–36 having output circuits coupled to the Off output circuit of the respective triggers 6–10—6–13. Each Set pulse then translated by the AND gate 6–31 so controls the inverters 6–33—6–36 as to turn all of the accumulator triggers 6–10—6–13 Off by "pull-over."

The manner in which numeric information is inserted into the accumulator during readout of numeric information from a selected storage unit will now be considered. All of the numeric storage units including the buffer storage unit have a common information readout circuit as is conventional in core matrix structures of a type herein employed. This common output circuit is represented in FIG. 6a by a winding 6–37 coupled to the input circuit of an amplifier 6–38. An information bit pulse read out from core storage has negative pulse polarity in the output circuit of the amplifier 6–38 and is applied through an inverter 6–39 to an AND gate 6–40. The output circuit of an inverter 6–41 is also coupled to the AND gate 6–40, and the input circuit of the latter is coupled to a buffer reset or clear control circuit which includes the normally closed contacts 247–1 of a Buffer Reset relay 247 included in the output circuit of an inverter 6–42 having an input circuit coupled to the output circuit of an AND gate 6–43. The latter is coupled to the On output circuits of the binary-2, binary-4 and binary-8 triggers of the counter hereinafter to be described, and accordingly the counter when set to "1" conditions the AND gate 6–43 to apply a positive potential to the inverter 6–42. If the Buffer Reset relay contacts 247–1 are closed at this time, the decreased potential developed at this time in the output circuit of the inverter 6–42 is applied to the input circuit of the inverter 6–41 with resultant elevation in the output circuit potential of the latter to condition the AND gate 6–40 to translate an information bit pulse applied to it through the inverter 6–39 and the amplifier 6–38 from the storage readout circuit 6–37. It should be noted in this connection that if the counter is set to any number other than a "1," the inverter 6–42 applies a positive potential through the reset relay contacts 247–1 to the inverter 6–41 with the result that the AND gate 6–40 has a negative potential applied from the latter unit and remains closed to all information bits applied to it from the inverter 6–39. Whenever an information bit pulse is translated by the AND gate 6–40, it is applied through an inverter 6–44 to turn On (by pull-over) a write trigger 6–45.

For reasons which will presently be explained more fully in connection with the operation of the storage drive unit, it is important to bear in mind in connection with the operation of the system herein described that all operations wherein numeric information is written into storage in a selected storage unit is accomplished not by transferring information directly from the accumulator into storage but rather by the process of resetting or inhibiting the reset of a bit storage core element of the selected storage unit. In other words, when information is read out of a bit storage core element, the act of reading a stored 1-bit out leaves that bit storage element storing a zero bit. Immediately after the stored bit is read out of the element, an attempt is automatically made to re-store a 1-bit in the element by a Write pulse. If the effect of the Write pulse is inhibited, the bit storage element is left storing the zero which it stored after readout; failure to inhibit the Write pulse permits it to store a binary-1 bit back into the bit storage element. It is important to keep this mode of storing information clearly in mind in order to understand the concise information storage operation.

Returning now to the write trigger 6–45, it will only be explained at this time that when an inhibit circuit 6–46 has a positive potential impressed upon it through a cathode follower 6–47 from the On output circuit of the trigger 6–45 whenever the latter is turned Off, any storage of information in a given storage unit is prevented by inhibiting the effect of a Write pulse as this pulse attempts to re-store a binary-1 in a storage element from which information was just previously read out. Conversely, a negative potential impressed on the inhibit circuit 6–46 by the On state of the trigger 6–45 prevents the inhibiting operation last mentioned so that the Write pulse restores information in the storage element from which information was just previously read out. The precise manner in which this occurs will become more evident hereinafter during description of the storage drive unit of FIG. 7. Accordingly, if it be assumed that the AND gate 6–40 is conditioned (as when the counter is set to "1" or the Buffer Reset relay contacts 247–1 are open) to translate an information bit read out by a Read pulse from a given bit storage element of a selected storage unit, this translated pulse is effective to turn On the trigger 6–45 and thereby impress a negative potential on the inhibit circuit 6–46 to permit the immediately following Write pulse to re-store the information bit back into the storage element from which it was just read out. It will be apparent that information may therefore be read out from the storage unit and the same information be immediately "regenerated" or placed back into storage in that unit. This permits information to be used from storage without destroying the information in storage until such time as a storage unit is deliberately reset or cleared under program control to remove from it all information previously stored.

It should be mentioned in passing that the regeneration or re-storing of information in a storage unit by the operation just described is strictly applicable only to that information which is read out of storage during B-read time and this is the normal mode of operation prevailing during B-read time. Readout of information from storage during A-read time is always accompanied, in a manner presently to be described, by an automatic inhibiting of any re-storage or regeneration of the read out information into the storage elements from which the information is read. This is deliberately done in order that the results of a computation may be re-stored in these storage elements during C-store time accomplished in a manner presently to be explained. With the foregoing in mind, it will be apparent that readout of information from a given storage unit by use of the B-read pulse potential is normally accompanied by automatic regeneration or re-storing of that information back into the selected storage unit, or may result in program controlled clearing of information from that unit during information readout. In contrast, readout of information by the use of A-read potential pulses is always accompanied by an automatic clearing of the storage unit from which information is read and normally is followed by an automatic storing of information into this storage unit by the use of the C-store potential pulses.

The write trigger 6–45, in thus controlling the inhibit circuit 6–46 either to inhibit or not inhibit the effect of the Write pulses depending upon whether the write trigger 6–45 is respectively turned On or turned Off, not only controls the regeneration or re-storing of information read out of storage as above described but additionally serves to effect storage of information from the buffer triggers during C-store time. To this end, the Off output circuits of the buffer triggers 6–10—6–13 are coupled through respective cathode followers 6–50—6–53 to respective AND gates 6–55—6–58 which are all coupled through individual cathode followers 6–59—6–62 to a common AND gate 6–63. The latter also has applied to it C-store pulses from the output circuit 4–79 and Set pulses from the output circuit 4–39 of the timing signal generator. The AND gates 6–55—6–58 have respective binary-1 bit, binary-2 bit, binary-4 bit and binary-8 bit pulses applied to them as indicated from the timing signal generator, so that each of these gates is effective to translate the individual binary timing bit applied to it if its associated one of the accumulator triggers 6–10—6–13 is On. For example, if the accumulator trigger 6–10 is On during C-store time, and the AND gate 6–55 translates a binary-1 bit pulse through the cathode follower 6–59 to the AND gate 6–63 which is thereby conditioned to translate a Set pulse through an inverter 6–64 to turn On the write trigger 6–45. This places a negative potential on inhibit circuit 6–46 and causes a Write pulse to store a binary-1 information bit in a particular storage element of a selected storage unit (normally the storage element from which information was just previously read out at A-read time). In similar manner, the accumulator trigger 6–11 if On will cause the AND gate 6–56 to translate a binary-2 timing pulse to the gate 6–63 and the latter thereupon translates the next Set pulse to turn On the trigger 6–45 and again effect storage of an information bit. The same operation prevails for the accumulator triggers 6–12 and 6–13 in effecting storage of binary-4 and binary-8 information bits in a digit storage position of a selected storage unit. It is in this manner that information standing in the accumulator triggers at C-store time is transferred, through operation of the write trigger 6–45, into storage in a selected storage unit.

The write trigger 6–45 performs the additional function of transferring to the accumulator numeric information read out from a selected storage unit. During this type of operation, the Buffer Reset relay contacts 247–1 must be open (information read out at B-read time being automatically regenerated or re-stored as previously explained unless prevented by a programmed clear operation later to be considered). Information bit pulses read out of the selected storage unit are accordingly translated by the AND gate 6–40 and turn On the write trigger 6–45 as explained above. The elevated potential thereupon developed in the Off output circuit of the trigger 6–45 is translated through a cathode follower 6–67 an AND gate 6–68 and an AND gate 6–69. This potential conditions the AND gate 6–69 to translate A-read potential pulses to an OR unit 6–70 and conditions the AND gate 6–68 to translate B-read pulses through the normally closed contacts 246–2 of a Subtract relay 246 to the OR unit 6–70.

The resulting positive potential developed in the output circuit of the OR unit 6–70 is translated through a double inverter 6–71 to an AND gate 6–72 to which Write pulses are also applied through a double inverter 6–73. Thus the On state of the write trigger 6–45 resulting from readout of an information bit from storage conditions the AND gate 6–72 to translate a Write pulse, and this translated pulse is applied through a cathode follower 6–74 to a plurality of AND gates 6–75—6–78. These gates receive binary-1, binary-2, binary-4 and binary-8 timing pulses from the timing signal generator as indicated. The AND gate 6–75 translates a binary-1 timing pulse through an OR unit 6–79 and an inverter 6–80 to the binary trigger 6–10, while the binary-2, binary-4 and binary-8 timing pulses translated by the respective AND gates 6–76—6–78 are translated through their respective associated OR units 6–17—6–19 to their respective accumulator triggers 6–11—6–13.

In this, it will be recalled that numeric digit information in storage is stored in the binary-1, binary-2, binary-4 and binary-8 code form as earlier explained, and that this information is read by Read pulses from storage by successive binary bit order so that each such successive bit readout is enabled to turn On the trigger 6–45 coincidentally with an associated Read pulse which causes the information bit to be read out of storage. The trigger 6–45, in being thus turned On, conditions all of the AND gates 6–75—6–78 to translate the binary bit timing pulses individually applied to them from the timing signal generator. Only one of these gates, however, has a binary timing bit applied to it at any given time, and this is the particular bit generated during the interval in which the information bit was read out of storage by the Read pulse. The translated timing bit is applied to the associated accumulator trigger to change its On or Off state, thereby to effect insertion of the information bit into the accumulator.

Whenever the trigger 6–45 is thus turned On by an information bit read out of storage by a Read pulse, the trigger is turned Off by an immediately following Write pulse applied to the trigger from the output circuit 4–53 of the timing signal generator. Due to the fact that Read and Write pulses are generated during each of the successive binary-1, binary-2, binary-4 and binary-8 time intervals, there is the result that each of the binary-1, binary-2, binary-4 and binary-8 information bits read from storage are effective to turn On the trigger 6–45 and thereby condition a corresponding one of the gates 6–75—6–78 to translate a binary-1, binary-2, binary-4 or binary-8 timing pulse to its associated accumulator trigger 6–10—6–13, thereby entering each read out numeric digit into the accumulator.

In connection with this transfer of digit information from storage into the accumulator by operation of the write trigger 6–45, it will be appreciated that such information transfer may occur by readout from a first selected storage unit during A-read time and readout of a second storage unit during B-read time. The information read out from storage during A-read time is translated by the AND gate 6–69 (conditioned by A-read pulses) whereas the information read out from storage during B-read time is translated by the AND gate 6–68 (conditioned by B-read pulses). The numeric digit information read out during A-read time is accordingly inserted serially by bit into the accumulator triggers where it is temporarily stored, and the numeric digit information read out from storage at B-read time is likewise inserted serially by bit into the accumulator triggers and is thus added to the first digit information proceeding bit by bit starting with the binary-1 information bit and ending with the binary-8 information bit. The result of this addition is translated during C-store time back into storage (by the previously described action of the AND gate 6–63, inverter 6–64 and write trigger 6–45). Should this add operation cause a carry-out of the binary-8 accumulator trigger 6–13, the carry is stored during B-read time (AND gate 6–26) in the carry trigger 6–28 which turns On to indicate the carry. The carry trigger 6–28 is initially reset Off and thereafter is turned Off at the beginning of binary-2 time of the A-read interval by a Set pulse applied to an AND gate 6–82 through the contacts 308–2 of an Add-Subtract relay 308 energized during either an add or subtract programmed operation. The Set pulse thus translated by the AND gate 6–82 is further translated through an inverter 6–83 to turn Off the carry trigger 6–28 by pull-over. Whenever the carry trigger is turned Off by action of the AND gate 6–82, the resulting elevated potential developed in the On output circuit of the carry trigger is translated through a cathode follower 6–84, the OR unit 6–79 and the inverter 6–80 to change the On or Off state of the binary-1 accumulator trigger 6–10 (normally turned Off by a Set pulse at the immediately preceding 1-digit time of A-read time through AND gate 6–31 and inverters 6–33—6–36) to store the carry in the accumulator trigger 6–10 preliminary to the first step in the succeeding digit addition.

It was previously explained that numeric storage of information is by binary coding of numeric digits stored in decimal form. The accumulator thus performs decimal additions and subtractions of numeric digits of corresponding order, and the results of each digit addition and subtraction are placed back into storage at C-store time in the corresponding order in storage. However, since the accumulator is capable of adding to a total count of 15, the decimal form of the numeric information requires that the accumulator be suitably corrected to convert it effectively to an accumulator of the decimal form. Accordingly, the relay contacts 308–2 of the Add-Subtract relay 308 are transferred during each addition and subtraction operation to supply Set pulses from the output circuit 4–39 of the timing signal generator to AND gates 6–85 and 6–86. The AND gate 6–85 is conditioned by a B-read potential pulse and a binary-1 timing pulse to translate the Set pulse last mentioned, and this translated pulse is supplied to the accumulator binary-2 trigger 6–11. The AND gate 6–86 is similarly energized with the B-read timing pulse but binary-2 timing pulse so that it translates a Set pulse at this time to the accumulator binary-4 trigger 6–12. There is thus inserted into the accumulator a "corrective 6" which effectively converts the accumulator to decimal form. For example, a numeric 9 standing in a decimal accumulator would fill the latter to its maximum capacity, whereas a 9 standing in the present accumulator after addition thereto of the corrective 6 also fills the present accumulator to its maximum capacity. This corrective step has no immediate effect unless the accumulator stores a number larger than 9, in which event the corrective 6 causes a carry-out to turn On the carry trigger 6–28. Thus a 10 standing in the accumulator at the time of insertion of the corrective 6 results in turn On of the carry trigger 6–28 and storing of zeros in all of the triggers of the accumulator. It will be apparent that the corrective 6 insertion has the essential purpose of testing to ascertain whether a decimal accumulator would have carried out had the same numeric information been inserted in it.

A further correction is now made in those instances where the number standing in the accumulator at the time of insertion of the corrective 6 does not result in a carry-out. To this end, the On output circuit of the carry trigger 6–28 is coupled through a cathode followed 6–87 to an AND gate 6–100 and an AND gate 6–101. There is applied to the AND gate 6–100 the Set pulses translated through the transferred contacts 308–2 of the Add-Subtract relay 308 and also C-store pulses and binary-1 time pulses. This gate accordingly translates a Set pulse during the C-store interval and binary-1 time if the gate is conditioned to do so by the Off state of the carry trigger 6–28 due to failure of a carry-out by insertion of the corrective 6. The translated Set pulse of this gate is inserted through the OR unit 6–17 into the accumulator binary-2 trigger 6–11. The AND gate 6–101 similarly receives the Set pulses, and is conditioned by C-store pulses and binary-2 timing pulses. The Off state of the carry trigger 6–28 therefore causes this gate to translate at binary-2 time of C-store time a Set pulse which is inserted through the OR unit 6–19 into the accumulator binary-8 trigger 6–13. The Off state of the carry trigger 6–28 accordingly causes a corrective 10 to be inserted into the accumulator, and this has the effect of causing the latter to store the numeral which it stored prior to the corrective 6 and corrective 10 operations. It should be noted that the combined insertions of the corrective 6 and corrective 10 into the accumulator will always cause a carry-out, but that this does not cause turn On of the carry trigger 6–28 unless the carry is due solely to the corrective 6 insertion. This is for the reason that a carry-out occurring only by reason of the corrective 10 insertion occurs at C-store time but the AND gate 6–26 is conditioned to translate the carry-out, and thereby effect turn On of the carry trigger 6–28, only during B-read time when the corrective 6 is entered. It is in this manner that the accumulator is converted to one effectively of decimal form.

The accumulator performs a subtract operation in much the same manner as the addition operation above described, but with the difference that during a subtract operation there is a transfer of the contacts 246–2 (FIG. 6a) by energization of the subtract relay 246. The transferred relay contacts 246–2 now connect the output circuit of an AND gate 6–28 to the OR unit 6–70, this AND gate being conditioned by B-read pulses applied to it from the timing signal generator. Now whenever the write trigger 6–45 remains in its Off state during B-read time, by virtue of the absence of an information bit from storage when the latter is read by a Read pulse, the resulting elevated potential in the On output circuit of the write trigger 6–45 is translated through the cathode follower 6-47 and the AND gate 6-88 to condition AND gates 6-75—6-78 to translate to the accumulator triggers a binary timing pulse corresponding to the binary timing interval in which the last mentioned Read pulse occurred. Conversely, if an information bit pulse is read out of storage by a Read pulse and turns On the trigger 6-45, this state of the trigger closes the AND gate 6-88 and maintains the AND gates 6-75—6-78 also closed. It will be apparent that the substitution of the AND gate 6-88 (by virtue of the transfer of the relay contacts 246-2) has the effect during B-read time of complementing all numeric information read from storage into the accumulator. As is well known, the information thus entered into the accumulator in complemented form subtracts from the value of the numeric information placed in the accumulator during A-read time. The result of subtraction is placed back into storage by use of the AND gate 6-63, inverter 6-64 and write trigger 6-45 in the same manner as explained above for an addition operation.

There are two further differences in the subtract operation as contrasted with the addition operation. For a subtract operation the carry trigger is reset On before the calculation starts (subtract relay contacts 246-4, FIG. 9, Sec. 44) and this causes an initial "1" to be inserted into the accumulator when the carry trigger is then turned Off by a Set pulse translated by the AND gate 6-82 during the binary-2 interval of A-read time. Secondly, the relay contacts 246-3 and 246-5 (FIG 6b) of the Add-Subtract relay 246 are now closed for the subtract operation, and this deenergizes both of the AND gates 6-85 and 6-86 to prevent the corrective 6 insertion during this operation. The corrective 10 operation, previously described in connection with the addition operation, continues as before. It is important to note in this regard that, due to the complemented form of the numeric information placed in the accumulator during B-read time, the corrective 10 operation during subtract always results in a carry-out of the accumulator but this carry-out is not effective to turn on the carry trigger 6-28 since it occurs during C-store time when the AND gate 6-26 is not responsive to it.

Whenever a number of larger magnitude is subtracted during B-read time from a positive number of smaller magnitude placed in the accumulator during A-read time, the subtractive process results in a number with a negative algebraic sign. The accumulator returns the result of subtraction to storage in this instance in complement form, and the negative algebraic sign of the number in storage is indicated by the fact that a 9 is automatically inserted into storage in all digit positions of higher order than the highest order significant digit of the complement result of the subtraction. It was earlier explained that at the initiation of readout of a number in storage for typing, the first operation that occurs is always a negative balance test. It is the purpose of this test to ascertain whether the number to be read out has a positive or negative algebraic sign as indicated by the fact that a zero or a numeric 9 digit is present in storage in the 11th digit storage position of the storage unit from which the number is to be read. If the number is found by this negative balance test to have a positive algebraic sign, the number is simply moved during B-read time from storage into the accumulator without more as in addition. However if the test indicates that the number in storage has a negative algebraic sign, the subtract relay 246 is energized for complementing the number as it is read from storage into the accumulator and it is then translated from the latter in true form through the relay system to type-out by the typewriter.

When a number is read out of storage into the accumulator to be ultimately typed according to the operation last described, the potentials of the output circuits of the accumulator triggers 6-10—6-13 are applied through the respective cathode followers 6-50—6-53 to a plurality of respective AND gates 6-89—6-92. All of these AND gates are conditioned in common through a cathode follower 6-93 from an AND gate 6-94 having five input circuits. Four of these input circuits are coupled to the ON output circuits of the binary-1, binary-2, binary-4 and binary-8 triggers of the counter, presently to be described, so that the concurrent energization of these four input circuits indicates that the counter has counted down to zero. The fifth input circuit of the AND gate 6-94 is coupled through the normally open contacts 252-1 of an interlock relay 252 to a source of negative potential. The interlock relay 252 provides an interlock between the mechanical actuation of the typewriter mechanism and the electronic and relay systems of the computer. In particular, the interlock relay 252 is energized during the interval when a type lever or the carriage of the typewriter is in motion, and during this interval the closed contacts 252-1 of this relay maintain the AND gate 6-94 closed by applying a negative potential to the fifth one of its input circuits. Thus when a type lever or the carriage of the typewriter has come to rest after a typing or spacing operation and the interlock relay contacts 252-1 open, the AND gate 6-94 is thereupon enabled to be conditioned by the zero count of the counter to translate a positive potential through the cathode follower 6-93 to all of the AND gates 6-89—6-92.

When this occurs, these AND gates are responsive to the On state of their associated accumulator triggers to apply a positive potential to a control electrode of individual ones of a plurality of bit decoding thyratrons 6-95—6-98 and a control thyratron 6-99. A positive potential when thus applied to the control electrode of any one of the thyratrons causes it to become conductive, whereupon the decoding thyratrons 6-95—6-98 energize decoding relays 175, 177, 178 and 180 (shown in the relay system of FIG. 9) which in turn directly energize by selective control the print magnets of the typewriter to effect a typing operation. The control thyratron 6-99 is always rendered conductive each time the counter counts down to zero, and this thyratron is effective to energize a control relay 18 (FIG. 9) which thereupon effects initiation of each new relay operating cycle with the latter in turn initiating each new cycle of electronic operation.

Rounding off a number in storage involves a half adjust and either a 2-column or 3-column shift down to remove the lowest order digits from the number in storage. The half adjust operation is accomplished by the accumulator under control of an AND gate 6-103 which conditions an AND gate 6-104 and an AND gate 6-105 to effect insertion of a numeric 5 into the accumulator. There is applied to the AND gate 6-103 the potential of the Off output circuit of the binary-8 trigger of the counter presently to be described, the potential of the On output circuit of the binary-4 trigger of the counter, the output potential in the Off output circuit of the binary-2 trigger of the counter, either a positive potential if the column-shift-2 relay contacts 213-2 are transferred or otherwise the On output potential of the binary-1 trigger of the counter, and either a positive potential if the column-shift-3 contacts 214-2 are transferred or the potential of the Off output circuit of the binary-1 trigger of the counter. Thus if the relay contacts 213-2 transfer for a column-shift-2 operation, an output potential is developed by the AND gate 6-103 when the counter has counted down to 11. This always occurs during the first calculation interval (effecting a column-1 shift down and half adjust operation) when the counter is initially set to 12 and counts down in respective digit cycles. When a column-shift-3 operation is programmed, and the relay contacts 214-2 transfer, two column-shift-1 operations in succession occur before an output potential is developed by the AND gate 6-103 when the counter has counted down to 10. A relay contact 203-4 is always picked up during the second calculation interval and applies a negative potential bias to close the AND gate 6–103 regardless of which of the relay contacts 213–2 or 214–2 are transferred and thus eliminate the half adjust operation during the second calculation to be performed.

Thus the AND gate 6–103 determines whether the half adjust operation is to occur after the first or second column shift down step, and it controls the AND gates 6–104 and 6–105 to insert a 5 into the accumulator during B-read time by translation of a Set pulse through the AND gate 6–104 to the binary-1 trigger 6–10 during the binary-8 time interval and the translation of a Set pulse by the AND gate 6–105 to the binary-4 trigger 6–12 during the binary-4 time interval. The insertion of this half adjust 5 causes the half adjust operation to be made on the last digit to be column shifted down by the next succeeding column shift operation occurring in the second calculation interval.

*Storage drive unit, counter and storage structure*

The storage drive unit, counter, and storage structure has an arrangement shown in FIGS. 7a–7g which should be considered together as a unitary structure as indicated in FIG. 7.

Each storage unit is of the matrix form as earlier mentioned and entry into the unit to read out or store an information bit is accomplished by appropriate energization of what may be conveniently considered X and Y coordinate conductors. Thus the storage drive unit includes an X and a Y coordinate generator which energize two submatrix driver core structures effectively providing a commutator mode of operation to gain access into a storage unit.

The submatrix driver core structure which energizes the X conductors of all storage units is shown in FIG. 7b as comprising cores X1–X12, while the submatrix driver core structure which energizes the Y conductors of one or more selected storage units is shown in FIG. 7e as comprising cores Y1–Y12. These two submatrix driver core structures are energized somewhat differently, and their energizing generators will accordingly be considered in turn starting with that for the X submatrix driver core structure.

The X driver core generator includes three triggers 7–10, 7–11 and 7–12 which are intercoupled as a closed ring counter and are supplied with advance or stepping pulses, represented by curve T of FIG. 5, translated by an AND gate 7–13, these stepping through a double inverter 7–14 and an inverter 7–15. The X coordinate driving generator additionally includes four triggers 7–16—7–19 likewise interconnected as a closed ring counter and supplied with advance or stepping pulses from the inverter 7–15. These advance or stepping pulses are comprised by oscillator-2 pulses translated by the AND gate 7–13 during the electronic operating interval while a positive potential is applied to the latter through a cathode follower 7–20 from the Off output circuit of a start-stop control trigger 7–21. The trigger 7–21 is reset On during the electronic reset interval which occurs just prior to the completion of the relay interval. The trigger 7–21 may also be turned On by a Read pulse translated through the normally closed contacts 291–6 of a column shift inhibit relay 291 and an inverter 7–22, and is turned Off by a Write pulse translated by AND gate 7–23 and an inverter 7–24 during the eighth digit time of C-store time when the AND gate 7–23 is open. The start-stop trigger control characteristic is represented by curve U of FIG. 5. The trigger 7–21 may also be turned On by reset pulses translated through the inverter 7–22 when the column shift inhibit relay 291 is energized to transfer its contacts 291–6.

Passing over for the moment the operation of the triggers 7–10—7–12 and 7–16—7–19 under control of stepping pulses translated by the inverter 7–15, it may be pointed out that the potentials developed in the On output circuits of the triggers 7–10—7–12 are translated through respective cathode followers 7–27—7–29 to respective AND gates 7–30—7–32. In similar manner, the output potentials developed in the Off output circuits of the triggers 7–16—7–19 are translated through respective cathode followers 7–33—7–36 to respective AND gates 7–37—7–40. Read pulses are applied through a cathode follower 7–41 to all of the AND gates last mentioned. At any given time, two of the triggers 7–10—7–12 are turned Off and thus condition their associated AND gates 7–30—7–32 to translate the Read pulse through respective OR units 7–44—7–46 and respective cathode followers 7–47—7–49 to respective core driver power amplifier stages 7–50—7–52. The core driver unit 7–50 energizes series connected Write windings of the submatrix driver cores X1, X10, X7 and X4 arranged in the order named and as shown in the drawings; the core driver unit 7–51 energizes the serially connected Write windings of the driver cores X5, X2, X11 and X8; and the core driver unit 7–52 energizes the serially connected Write windings of driver cores X9, X6, X3 and X12.

At any given time, only one of the Y triggers 7–16—7–19 is on, and accordingly only the associated one of the AND gates 7–37—7–40 translates the applied Read pulse through a respective cathode follower 7–53—7–56 to a respective core driver power amplifier 7–57—7–60. The core driver unit 7–57 energizes the serially connected Write windings of the driver cores X9, X5 and X1; the core driver unit 7–58 energizes the serially connected Write windings of the driver cores X6, X2 and X10; the core driver unit 7–59 energizes the serially connected Write windings of the driver cores X3, X11 and X7; and the core driver unit 7–60 energizes the serially connected Write windings of the driver cores X12, X8 and X4.

The manner and effect of the X driver core energizations by the core driver units 7–50—7–52 and 7–57—7–60 will be subsequently explained.

The Y driver cores of the second submatrix structure are energized in a somewhat different manner than that described with respect to the X driver cores. The Read pulses translated by the cathode follower 7–41 are applied to a plurality of AND gates 7–63—7–68 of which the AND gates 7–66 and 7–68 are conditioned by A-read pulses applied to them from the timing signal generator, the AND gates 7–64 and 7–67 are conditioned by B-read pulses applied to them, and the AND gates 7–63 and 7–65 are conditioned by C-store pulses applied to these gates. Accordingly, at any given time two of the gates 7–63—7–68 are conditioned to translate the applied Read pulse, and these translated pulses are applied through an OR unit 7–69 associated with the gates 7–63 and 7–64, an OR unit 7–70 associated with the AND gates 7–65 and 7–66, and an OR unit 7–71 associated with the AND gates 7–67 and 7–68. The OR units 7–69—7–71 are coupled through respective cathode followers 7–72—7–74 to respective core driver power amplifier stages 7–75—7–77. A Read pulse translated through the OR unit 7–69 to the core driver unit 7–75 causes the latter to energize the serially connected Write windings of the driver cores Y1, Y2, Y3 and Y4 arranged in the order named and as shown in the drawing: A Read pulse translated by the OR unit 7–70 to the core driver unit 7–76 causes the latter to energize the serially connected Write windings of the driver cores Y5, Y6, Y7 and Y8; and a Read pulse translated by the OR unit 7–71 to the core drive unit 7–77 causes the latter to energize the serially connected Write windings of the driver cores Y9, Y10, Y11 and Y12.

The Read pulses translated by the cathode follower 7–41 are likewise applied to four AND gates 7–79—7–82 having output circuits coupled through respective cathode followers 7–83—7–86 to respective core driver power amplifier stages 7–87—7–90. The AND gate 7–79 is conditioned to translate the Read pulse during binary-1 time, the AND gate 7–80 is conditioned to translate the Read pulse during binary-2 time, the AND gate 7–81 is conditioned to translate the Read pulse during binary-4 time, and the AND gate 7–82 is conditioned to translate the Read pulse during binary-8 time. The Read pulse translated to the core driver unit 7–87 causes the latter to energize the serially connected Read windings of the driver cores Y1, Y5 and Y9; the Read pulse translated to the core driver unit 7–88 causes this unit to energize the serially connected Read windings of the driver cores Y2, Y6 and Y10; the Read pulse translated to the core driver unit 7–89 causes the latter to energize the serially connected Read windings of the driver cores Y3, Y7 and Y11; and the Read pulse translated to the core driver unit 7–90 causes this unit to energize the serially connected Read windings of the driver cores Y4, Y8 and Y12.

The buffer storage unit and storage unit No. 1, representative of the additional six storage units employed in the present computer, are shown in FIG. 7a. As shown in FIGS. 7a and 7b the individual output circuits of the driver cores X1–X12 are connected through the contacts 295–1—295–12 of a relay 295 to the X conductors common to the buffer storage unit and all of the remaining storage units as indicated. The switch 295 when deenergized connects the X1–X12 driver core output circuits in order to the X conductors of the storage units, whereas the energized condition of the relay 295 reverses the order of these connections to the X conductors of the storage units.

As shown in FIGS. 7d and 7e, the output circuits of the Y1–Y4 and Y9–Y12 driver cores are connected through the contacts 292–1—292–4 and 292–9—292–12 of a relay 292 to common A-read and C-store line conductors 7–93, whereas the output circuits of the driver cores Y5–Y8 are connected through the contacts 292–5—292–8 of the relay 292 to B-read line conductors 7–94. As in the case of the relay 295 previously mentioned, the relay 292 as between its energized and deenergized states reverses the connections of the output circuits of the cores Y1–Y12 to their associated line conductors 7–93 and 7–94 as shown. The A-read and C-store line conductors 7–93 are connected to the Y energizing lines of the buffer storage unit through normally closed contacts 310–2—310–5 and may also be either connected to ground by relay transfer contacts 312–1—312–4 or alternatively be connected to the Y energizing conductors of any selected one of the storage units such as to the storage unit No. 1 as by energization of a relay 322 to close its contacts 322–2—322–5. The A-read and C-store lines 7–93 may also be connected to ground upon energization of a relay 289 to close its contacts 289–2—289–5 as shown. The B-read line conductors 7–94 are normally connected to ground through the transfer contacts 291–1—291–4 of a relay 291. Upon energization of this relay to transfer its contacts, these line conductors are connected to the Y energizing lines of the buffer storage unit through normally closed contacts 309–2—309–5 of a relay 309 and in addition are connected through the normally closed contacts 323–1—323–4 of a relay 323 to normally open contacts of each of seven storage selection relays of which only that for the storage unit No. 1 is shown in FIG. 7d and comprises the normally open contacts 333–2—333–5 of a relay 333.

It is the purpose of the relay 292 associated with the output circuits of the Y1–Y12 driver cores to interchange the order with which these conductors are connected to the Y energizing circuits of the selected storage units through the lines 7–93 and 7–94 and selective energizations of the storage selection relays such as the relays 309, 310, 322, 323 and 333. The function of the relay 291 is to either ground the B-read conductors 7–94 when no information is to be read out of a storage unit during B-read time or otherwise to connect these lines through one or more selection relays to a selected storage unit from which information is to be read during B-read time. The purpose of the several relays associated with the A-read and C-store lines 7–93 likewise is to either ground these lines when information is to be read from storage only during B-read time, or otherwise to permit these lines to be connected to a selected storage unit by appropriate energization of storage unit selection relays.

The commutating action effected by the X and Y driver cores, and by which entry into each storage unit is determined, will now be considered with reference first to the operation of the X core submatrix. The Write winding and Read windings on each of the X driver cores are connected to produce equal opposing magnetic fields so that concurrent Read and Write pulses of current applied to the windings of any core produce no change of magnetic flux in the core. Accordingly this condition does not create any current pulse in the output winding of the core. It was earlier mentioned that at the outset of the electronic operation the triggers 7–10 and 7–16 are both reset On and the triggers 7–11, 7–12 and 7–17—7–19 are all reset Off. The trigger 7–10 being On closes the AND gate 7–30 so that no Read pulse is translated by this gate to the core driver unit 7–50, and accordingly none of the X1, X4, X7 or X10 cores receive a current pulse in their Write windings. On the other hand, the triggers 7–11 and 7–12 being turned Off condition their output AND gates 7–31 and 7–32 to translate a Read pulse to the core driver units 7–51 and 7–52 so that all of the remaining X cores are energized with Write pulse currents flowing through their Write windings. The trigger 7–16, being reset On, conditions its output AND gate 7–37 to translate a Read pulse to the core driver unit 7–57 thereby to energize the Read windings of the cores X1, X5 and X9. Since the cores X5 and X9 also are energized with a Write current pulse as just mentioned, the Read pulse of the core driver unit 7–57 is able to produce a change of magnetic flux only in the core X1 which has no Write pulse concurrently applied to it. This change of magnetic flux in the core X1 produces an output drive current pulse.

Since three oscillator-2 pulses occur between successive Read pulses, as graphically shown in FIG. 5, the triggers 7–10—7–12 will be stepped three times between Read pulses, and accordingly the trigger 7–10 will again be On at the time the next Read pulse occurs. The three oscillator-2 pulses concurrently step the triggers 7–16—7–19 so that the trigger 7–19 is now On when the next Read pulse occurs, and a driving current pulse is accordingly developed in the output circuit of the core X4. In the same fashion, a driving pulse is developed in the output winding of the core X7 by the next Read pulse, and a driving pulse is developed in the output winding of a core X10 by the succeeding Read pulse. This successive development of driving pulses in the output windings of the cores X1, X4, X7 and X10 by successive Read pulses continues through each of the A-read, B-read and C-store times (except in the special case of keyboard entry to buffer storage explained hereinafter).

During the production of the driving pulses last mentioned, a similar operation is taking place in connection with the development of driving pulses in the output windings of the Y driver cores. There is the difference with the Y cores, however, that an output driving pulse is developed in the output winding of cores Y1–Y4 in sequence during A-read time. Similar output driving pulses are developed in the output windings of cores Y5–Y8 in sequence during B-read time, and in cores Y9–Y12 during C-store time. All of these driving pulses are likewise produced by successive Read pulses applied to the AND gates 7–63—7–68 and 7–79—7–82. During A-read time, only the gates 7–66 and 7–68 are opened by A-read pulses applied thereto from the timing signal generator, and accordingly only these gates translate a Read pulse to their associated core driver units 7–76 and 7–77 to supply Write pulse currents to the Write windings of all of the driver cores Y5–Y12. Note here again, as in the case of the X cores, that no Write pulses are applied to the Write windings of cores Y1–Y4 during A-read time. Thus a binary-1 timing pulse timing pulse applied to the AND gate 7–79 is translated to the core driver unit 7–87 to effect the development of a driving pulse in the output winding of core Y1; a binary-2 timing pulse applied to the AND gate 7–80 causes a Read pulse to effect development of a driving pulse by the core Y2; a binary-4 timing pulse applied to the AND gate 7–81 causes the Y3 core to develop a driving pulse; and a binary-8 timing pulse applied to the AND gate 7–82 causes a Read pulse to develop an output driving pulse by the core Y4. A B-read pulse is next applied to the AND gates 7–67 and 7–64, and this causes the cores Y5–Y8 to develop output driving pulses during the Read pulse occurring in each of the successive binary-1-2-4-8 timing pulses. A C-store pulse applied to the AND gates 7–65 and 7–63 causes cores Y9–Y12 to develop output driving pulses during each of binary-1-2-4-8 times.

Consider now the manner with which these X core and Y core driving pulses effect readout of information from storage units. It was explained that at the outset of electronic time the cores X1 and Y1 generated driving pulses, and it will be seen by inspection that the conductors which carry these driving pulses intersect in the buffer storage unit at the point A1. No storage core is provided at this point which corresponds to the binary-8 information bit of the 11th numeric word storage position of the buffer storage unit. The reason for providing this "hole" in buffer storage, and other similar "holes" presently to be considered, will be explained hereinafter in relation to the keyboard entry of information into buffer storage. The next Read pulse causes a driving pulse to be generated in the output circuits of the cores X4 and Y2, and the conductors which carry these driving pulses intersect in the buffer unit at a point A2 which also is provided with no storage core. The third Read pulse causes the cores X7 and Y3 to generate driving pulses, and the conductors which carry these pulses intersect in the buffer storage unit at point A3 also devoid of a storage core. The fourth Read pulse causes the cores X10 and Y4 to develop driving pulses, and the conductors which carry these pulses intersect in the buffer unit at point A4 which also is devoid of a core storage element. These points A1, A2, A3 and A4 of the buffer storage unit comprise the binary-8-4-2-1 information bit positions of what would be a numeric word storage position in the buffer unit except for the fact that no storage cores are provided at these positions.

The entry into buffer storage last described occurs during A-read time, and during the following B-read time entry occurs into the same positions of another storage unit selected by programmed relay control. Thus if the storage unit No. 1 is the one so selected, readout of information during B-read time would occur by concurrent X and Y core driving pulses applied to intersection points B1, B2, B3 and B4 of this unit which in this case are provided with storage cores (the 12th numeric word storage position in all storage units other than the buffer storage unit are devoid of storage core elements). The storage cores or elements of the buffer storage unit and of each of the other storage units are of the type characterized by high magnetic retentivity and an essentially square hysteresis loop. Concurrent X and Y core driving pulses applied to such core produce magnetic fields which are in aiding relation to each other so that a combined magnetic field is thus developed in the core sufficient to drive the core into and beyond the saturation region of its hysteresis loop. For the readout operation presently described, the polarity of this magnetic field is conventionally referred to as of "negative" value and leaves the core retaining what is conventionally considered the storage of zero information. This matter of magnetically saturating a core element requires the concurrent presence of both the X and Y driving pulses, and neither pulse alone is of sufficient amplitude to change the state of magnetic retentivity of the core.

During the succeeding C-store time, the X1 and Y9 driving cores produce driving pulses which intersect in the buffer storage unit again at point A1, and it can be readily shown that the succeeding driving pulses of the X and Y driver cores intersect in the buffer storage unit successively at points A2, A3 and A4. These driving pulses have no effect, however, since the information at these points has already been read out of storage during A-read time.

The leading edge of the Write pulse which occurs during the binary-8 time of C-store time turns Off the trigger 7–21, FIG. 7c, and this closes the AND gate 7–13 to oscillator-2 pulses so that the triggers 7–10—7–12 and 7–16—7–19 are not stepped until the trigger 7–21 is again turned On. If the column shift relay 291–6 is de-energized, the trigger 7–21 is turned On by the leading edge of the next Read pulse, and it can be shown that this has the result that entry into the storage units occurs exactly the same as above described. However, if it be now assumed that the column shift relay is energized to transfer its contacts 291–6, the trigger 7–21 is now turned On by the leading edge of a Set pulse translated through the inverter 7–22. Inspection of FIG. 5 will show that this prevents the translation of one oscillator-2 pulse by the AND gate 7–13. This has the effect of so shifting the timing of the Read pulses with respect to the related On and Off states of the triggers 7–10—7–12 and 7–16—7–19 that the trigger 7–12 is now Off and the trigger 7–19 is now On when the next Read pulse is applied to the cathode follower 7–41 so that the X12 core and Y1 core develop output driving pulses. The conductors which carry these driving pulses now intersect in the buffer storage unit at point 2A1 which corresponds to the binary-8 information bit storage of the 10th numeric word storage position of the buffer. The succeeding Read pulse causes the driver cores X3 and Y2 to develop output driving pulses so that entry into the buffer storage unit is now at point 2A2, the next Read pulse causes entry into the buffer storage unit at point 2A3, and the fourth Read pulse causes entry into the buffer storage unit at point 2A4. This causes readout from buffer storage of any binary-8, binary-4, binary-2 and binary-1 information bits of a word stored in the 10th numeric word storage position of the buffer.

The succeeding B-read time will cause readout of the binary-8, binary-4, binary-2 and binary-1 information bits of the numeric word stored in the 10th storage position of another selected storage unit such as the storage unit No. 1. During C-store time, entry is again into points 2A1, 2A2, 2A3 and 2A4 of the buffer storage unit but as before has no significance.

Several notable facts are evident from the foregoing description of information readout from storage units. One of these is that the information is read out "high order first" by virtue of the fact that not only are the binary information bits read out in order starting with the binary-8 information bit and ending with the binary-1 information bit, but also the numeric words are read out starting with the high order storage position 11 and continuing successively to lower order numeric word storage positions in the storage units. Secondly it is to be noted that during B-read time the same information bits are read out in the same order and from the same numeric word storage position of a selected storage unit (i.e. the storage unit No. 1) as occurred during A-read time from the buffer storage unit. Lastly, it is to be noted that the buffer storage unit is entered at C-store time at precisely the same information bit storage points as occurred during A-read time, and while this has no significance insofar as readout is concerned it does have significance during the information storage operation presently to be considered. While this readout operation has been described with relation to the buffer storage unit and the assumed selection of the first storage unit, it is to be understood that the same mode of readout operation applies to any two selected storage units.

The high order first type of information readout last described is occasioned by the deenergized states of the relays 292 and 295. These relays are always energized together, and in their energized state cause readout of information from selected storage units "low order first." This means that readout starts with the first numeric word storage position of the storage unit and progresses to higher order word storage positions, and also the numeric word is read out in the order of its binary-1, binary-2, binary-4 and binary-8 information bits. The numeric word storage positions for each of the storage units shown in FIG. 7a are indicated by Roman numerals applied to the binary-1 information bit storage elements and binary-8 information bit storage elements of each storage unit, the numeric order increasing from numeric storage position 1 to numeric storage position 12. It will be understood that the binary-2 and binary-4 information bit storage elements corresponding to each numeric word storage position occur in staggered relation through the storage unit as indicated for the storage elements located at the points B1, B2, B3 and B4 for the 11th storage position of the storage unit No. 1.

The manner of placing or writing numeric information into storage will now be considered. It will be recalled that at the outset of the electronic operation the driver cores X1 and Y1 are the first to produce output driving pulses from the first Read pulse generated by the timing signal generator. The latter immediately thereafter generates a Write pulse, and this Write pulse is used in such manner, presently to be explained in detail, as to cause the driver cores X1 and Y1 to develop output driving pulses of opposite polarity (conveniently called "Write" pulses) to those produced by the preceding Read pulse. Passing over for the moment the specific manner in which these Write pulses are developed, it will be apparent that the conductors which carry the Write pulses intersect at the same point in a storage unit that was just read out by the preceding Read pulse and which left the core storage element at that point storing a zero. The X and Y Write pulses combine to produce in the storage core element at this point a saturating magnetic field of opposite polarity to that produced by the Read pulses. Thus where a previous Read pulse caused the core storage element to be driven to negative saturation and thereby store a zero, the Write pulses drive the core element to positive saturation and thereby cause it to store a "1." This is true unless there is a concurrent pulse through an inhibiting winding common to all of the core elements, in which event the magnetic field produced by the inhibit pulse is approximately equal to and opposes the magnetic field produced by the combined Write pulses, so that the net change of magnetic flux in the core element is insufficiently large to modify its retained negative saturation and this leaves the core element storing a zero. Thus after readout of information from a storage core element, leaving it storing a zero, the Write driving pulses either re-store a "1" in this storage element, if there is no concurrent inhibit pulse, or leave it storing a zero if the inhibit winding is caused to carry an inhibit pulse coincident in time with the Write pulses.

The Write driving pulses are produced by translating a Write pulse from the timing signal generator through a cathode follower 7–95, a double inverter 7–96, and a cathode follower 7–97 to all of the OR units 7–44—7–46 and 7–69—7–71. The Write pulse concurrently translated by all of these OR units causes the core driver units 7–50—7–52 and 7–75—7–77 likewise to produce and supply a Write pulse through the Write windings of all of the X and Y driver cores. Only the particular X and Y cores which developed Read drive pulses from the immediately preceding Read pulse stand at this time in the negative saturation region of their systeresis characteristic, whereas all of the other cores stand retaining a magnetic field corresponding to positive saturation. Thus while Write pulses are supplied to the Write windings of all of the X and Y driver cores, Write output driver pulses are produced only from the particular X and Y core which produced the immediately preceding Read drive pulses and the remaining cores produce no output pulses. It will thus be seen that the selection of X and Y cores from which Read driving pulses are produced in the manner previously described causes automatic selection of these same cores from which to produce Write driving pulses from the immediately succeeding Write pulse of the timing signal generator.

It will be helpful at this point to consider in greater detail the actual manner of storing information in a storage unit. The Write pulse translated by the cathode follower 7–97 is also applied to an AND gate 7–98. This gate is always conditioned to translate the applied Write pulses during A-read time by reason of the fact that A-read pulses are applied from the timing signal generator through an OR unit 7–99 to the AND gate 7–98. The Write pulses thus translated during A-read time are further translated through a cathode follower 7–100 to a power amplifier core driver unit 7–101 which responds to each Write pulse to energize an inhibit winding 7–102 (common to the core storage elements of all of the storage units) through an impedance matching core transformer structure 7–103. It will be apparent from this that during A-read time when information is read out of a selected storage unit under control of Read pulses as described above, the Write pulse which immediately follows each Read pulse produces Write driving pulses in the X and Y commutator drive cores and these in turn tend to change the negative magnetic saturation (zero storage) in which the core storage element was left after readout to a positive magnetic saturation and thus cause it to store a "1." However, the same Write pulse which does this is also translated during A-read time through the AND gate 7–98 to produce an inhibit pulse in the inhibit winding 7–102. The magnetic field produced by this inhibit pulse opposes the magnetic field produced by the Write driving pulses in the core storage element last mentioned and thus prevents this Write field from having sufficient magnetic strength to change the saturation conditions of the core element, thus to leave the latter in its readout saturation condition storing a zero. It will be apparent from this that all readout of information during A-read time leaves all information bit storage elements of a given digit storage position of the storage unit cleared of information previously stored. This digit storage position is therefore available for storage of the results of a computation performed by the accumulator and returned to the digit storage position during C-store time. In other words, the act of inhibiting the Write pulses during A-read time results in the readout of a digit from a digit storage position of a selected storage unit and the return to this same digit position at C-store time of digit information resulting from computation.

The inhibit action effected by translation of Write pulses through the AND gate 7–98 may also take place during B-read time if the contacts 253–2 of a B-read reset relay 253 are caused to close under program control and if the contacts 198–8 of a multiply relay 198 are not opened (as during a multiplication operation). In such event, B-read pulses are applied from the timing signal generator through the OR unit 7–99 to the AND gate 7–98 by which to condition the latter to translate Write pulses, and the resulting inhibit action thus effected during B-read time resets or clears each digit storage position by leaving the latter storing a zero after information readout. This same action occurs during a multiplication operation when the relay contacts 198–8 are open but relay contacts 191–4 close under program control to reset the storage unit from which the multiplier is read out.

With the foregoing types of inhibit operation in mind, it is believed that it will now be more apparent how information is transferred during C-store time from the accumulator to the storage unit used at A-read time or how information is regenerated back or restored during B-read time into a selected storage unit essentially concurrently with the readout of that information to the accumulator. As a matter of fact, the system operation is such that unless otherwise program controlled, all information read out of a selected storage unit during B-read time is always regenerated or re-stored in such storage unit.

Returning briefly to a further consideration of FIG. 6a, and considering first the matter of regeneration or restoring of information read out during B-read time from a selected storage unit, if a given binary bit of information read out from storage is a "1" it causes the write trigger 6–45 to turn On as previously explained, and this places a negative potential on the inhibit line 6–46. As shown in FIG. 7c, this inhibit line is coupled through the OR unit 7–99 to the AND gate 7–98 and a negative potential impressed on the inhibit line 6–46 closes the AND gate 7–98 to the translation of Write pulses to the core driver unit 7–101. Thus the immediately succeeding Write pulse produces Write driving pulses in appropriate ones of the X and Y driver cores, and this causes a "1" to be written back (the inhibit winding 7–102 being deenergized) into that information bit core storage element from which the "1" bit was just read to effect turn On of the write trigger. The trailing edge of this same Write pulse turns Off the write trigger 6–45 and leaves the latter conditioned to be again turned On if the immediately succeeding information bit read out is also a "1." On the other hand, if the immediately succeeding information bit is a zero, the write trigger 6–45 remains Off and this places a positive potential on the inhibit circuit 6–46 which upon translation through the OR unit 7–99 conditions the AND gate 7–98 to translate the immediately following Write pulse. This Write pulse therefore produces an inhibit pulse in the inhibit winding 7–102, and the effect of the driving Write pulses applied to the corresponding information bit storage element from which the readout just occurred is inhibited leaving this element storing a zero. It is clear from this that the regeneration or re-storing of information is such that "1's" read out from a storage element are immediately placed back in the storage element and the readout of zeros from a storage element leaves the latter storing a zero, thereby leaving the storage unit storing the same information which it stored before readout occurred.

The same essential type of operation prevails during a transfer of information from the accumulator to storage in a selected storage unit. Thus assuming by way of example that the accumulator of FIG. 6b has its triggers 6–10 and 6–12 turned On to store a binary-1 and a binary-4 and its triggers 6–11 and 6–13 turned Off to store zeros, the AND gates 6–55 and 6–63 are opened at binary-1 time of C-store time to translate a Set pulse through the inverter 6–64 and turn On the write trigger 6–45. This again places a negative potential on the inhibit circuit 6–46 which closes the AND gate 7–98 (FIG. 7c) and thus prevents an inhibit operation whereby the Write driving pulses produced in the output circuits of the appropriate X and Y driver cores cause storage of a "1" in the binary-1 core storage element of the appropriate digit storage position of the selected storage unit. At binary-2 time, the accumulator trigger 6–11 is Off so that the AND gate 6–56 is closed and this keeps the AND gate 6–63 also closed. No Set pulse is therefore translated to turn On the trigger 6–45, and the resulting positive potential impressed on the inhibit circuit 6–46 produces an inhibit action which leaves the zero resulting from readout stored in the binary-2 storage element of this digit storage position of the storage unit. At binary-4 time, the On state of the accumulator trigger 6–12 causes turn On of the write trigger 6–45 and the inhibit action is suppressed to store a "1" in the binary-4 storage element of the given digit storage position. At binary-8 time, the Off state of the accumulator trigger 6–13 maintains the AND gates 6–58 and 6–63 closed so that the write trigger 6–45 remains Off and the inhibit action causes a zero to remain stored in the binary-8 storage element of the given digit storage position. Accordingly the binary number stored in the accumulator triggers at C-store time is placed into storage in a given digit storage position not by direct transfer of information from the accumulator to the storage unit but rather by inhibiting or failing to inhibit the action of the Write driving pulses as the latter uniformly attempt to write a "1" into storage.

Before leaving the FIG. 7 storage drive arrangement, the operation prevailing during entry of numeric information from the ten-key keyboard into buffer storage will be explained. This operation is one wherein entry of numeric information begins from the highest order digit and continues by successive digits to the lowest order digit. Considering briefly at this point only the end results of the operation, the first or highest order digit is placed into buffer storage in the units digit position and is automatically column shifted into the next higher order storage position upon entry from a keyboard of the next lower order digit. This operation continues digit by digit to leave the last numeric digit entered from the keyboard stored in the units digit position in buffer storage and with all previously entered digits stored in higher order digit storage positions, any even higher order unfilled digit storage positions storing only zeros. The precise manner by which this operation occurs will now be considered in more detail.

When the first digit is entered into the accumulator from the numeric keyboard, all of the accumulator triggers are concurrently set On or Off together according to the binary value of the numeric digit entered. As will presently be explained, read-out from the accumulator always proceeds from the binary-1 trigger 6–10 to the binary-8 trigger 6–13 and the binary bits thus read out are placed in buffer storage in the binary order 8, 4, 2, 1. For these reasons the binary-1 bit from the numeric keyboard is placed in the binary-8 trigger, the numeric binary-2 bit is placed in the binary-4 trigger, the numeric binary-4 bit is placed in the binary-2 trigger, and the numeric binary-8 bit is placed in the binary-1 trigger. It was previously explained in connection with the timing signal generator that upon initiation of the electronic operation a Read pulse is the first pulse generated. This has the importance that the accumulator triggers are not immediately reset by a Set pulse, which normally occurs at first digit time of A-read time by action of the accumulator AND gate 6–31 and inverters 6–33—6–36. Thus when this first Write pulse occurs, the entered numeric digit stands in the accumulator triggers. The relay contact positions shown in FIGS. 7a and 7d are those prevailing during keyboard entry of information, and it will be seen that entry of information into storage occurs high order first and that the relay contacts 291–1—291–4 connect the B-read lines 7–94 to ground. Thus during B-read time no information is read into the accumulator. During A-read time, readout of information occurred from intersection points A1, A2, A3 and A4 as previously explained, but no information readout actually occurs since there are no core storage elements at these points of the buffer unit.

At the outset of C-store time, a C-store pulse is applied through the normally closed contacts 291–5 (FIG. 4a) of the column shift relay 295 (deenergized at this time) and an inverter 4–54 to turn On the trigger 4–33. FIG. 8 graphically represents the timing relationships prevailing during keyboard entry, and curve E' of this figure represents the On-Off periods of the trigger 4–33. It will be evident from curve E' that the latter trigger is normally turned Off at the initiation of C-store time as usual, but when it is turned On again as last described it has the effect to prolonging the On interval of the trigger 4–37

(curve G') since the latter is On at this time and is turned Off by the first oscillator-1 pulse only after the trigger 4-33 has turned Off. As a result, the generation of the immediately following Set pulse, Read pulse and Write pulses (curves H', J' and K') is delayed by 20 microseconds, the binary-1 timing pulse (curve L') is prolonged also by 20 microseconds, and the Read pulse now occurs after the triggers 7-10—7-12 and 7-16—7-19 (FIG. 7c) of the storage driver unit have taken an additional step beyond the normal three steps which they take between Write pulses. In thus taking four steps, the first Read pulse of C-store time reads out of the X2-Y9 intersection point of the buffer unit (which is the binary-8 bit storage element of the 12th digit storage position) and leaves the storage element at this point storing a zero. Any information read out by this Read pulse is discarded since the AND gate 6-40 (FIG. 6a) to the write trigger 6-45 is closed at this time due to the closed contacts of the reset relay 247 and the fact that the counter has not yet counted down to a "1" to open the AND gate 6-43.

Therefore when the first Write pulse of C-store time occurs, the last mentioned storage element is available either to be reset to store a "1" or to be left storing a zero according to the On-Off state of the accumulator binary-1 trigger 6-10 and in conformity with the writing operation previously described. In other words and bearing in mind as previously explained that the numeric 1-2-4 and 8 bits are key-board entered into the respective 8-4-2-1 triggers of the accumulator, if the accumulator binary-1 trigger 6-10 stores a "1" by reason of the presence of a binary-8 bit in the numeric digit entry from the numeric keyboard, the write trigger 6-45 is turned On and this permits the Write pulse in resetting the X2 and Y9 driver cores (just previously used for the generation of Read driver pulses) to be reset and thereby generate output Write pulses which write a "1" (because inhibition is suppressed due to the On state of the write trigger 6-45) into the binary-8 storage core element of the 12th digit storage position of the buffer. Thus it should be carefully noted that each Read pulse occurring during C-store time of the first digit entry now is given the new function of clearing a binary storage element of a word storage position in the buffer unit and thereby conditioning this storage element to have a "1" inserted into storage in it by the immediately succeeding Write pulse under control of the binary coded digit standing in the accumulator from keyboard entry. The action of the second Read pulse and second Write pulse in C-store time is to effect storage of a binary-4 information bit in the binary-4 storage element of the 12th digit storage position of the buffer, the third Read pulse and third Write pulse effect storage in the binary-2 information bit position of the 12th storage position, and the fourth Read and Write pulses effect storage of the binary-1 information bit in the 12th storage position.

The fourth Write pulse occurring in C-store time also turns the start-stop trigger 7-21 (FIG. 7c) Off and thereby closes the AND gate 7-13 to translation of further oscillator-2 stepping pulses. The trigger 7-21 is not again turned On (curve U') until the generation of the next Read pulse, and as indicated in FIG. 8 this has the result that two oscillator-2 stepping pulses (indicated in broken lines in curve T') are suppressed by the AND gate 7-13 before it again opens. By virtue of this, and as further indicated in FIG. 8, the Read pulse which turns On the trigger 7-21 (and thereby initiates resumption of the commutation action of the X and Y driver cores) occurs at the initiation of A-read time and effects readout of information from the buffer unit at the X12-Y1 point which it will be seen from inspection is the binary-8 information bit storage element of the 10th digit storage position of the buffer. Thus it will be seen that during the succeeding A-read, B-read and C-store intervals the 10th digit storage position of the buffer unit is cleared of information and, the accumulator having been reset by a Set pulse generated at the outset of binary-1 time of A-read time and translated through the AND gate 6-31 (FIG. 6b) so that the accumulator triggers now store only zeros, no information is entered into the 11th digit storage position of the buffer unit when the automatic column shift which prevails at the outset of C-store time occurs since there are only zeros stored in the buffer triggers and only these zeros can be written into storage by the Write pulses developed during C-store time. This leaves the numeric digit entered from keyboard entry stored in the 12th digit storage position of the buffer unit, would have inserted zeros into storage in the 11th digit storage position except for the fact that there are no storage elements in this digit storage position of the buffer unit, and leaves the 10th digit storage position storing only zeros.

There is no further entry of numeric information from the numeric keyboard into the accumulator during the remainder of this electronic cycle of operation, the accumulator triggers accordingly continue to store only zeros, and the double column shift operation previously described therefore continues successively to clear each lower order digit storage position of the buffer unit and to store zeros in the higher order digit storage positions. At the initiation of the 12th such operation, it will be seen that the digit previously stored in the 12th digit storage position of the buffer unit is read out to the accumula during A-read time, nothing is inserted into the accumulator during B-read time (the B-read lines 7-94 being grounded as earlier mentioned), and the column shift operation previously described then being effective to re-store this first digit from the accumulator into the first digit storage position of the buffer unit. Accordingly the first digit inserted into storage from keyboard entry is ultimately stored in the lowest order digit storage position of the buffer unit.

This completes the first relay and electronic cycle, and entry of the second numeric digit from keyboard entry into storage occurs in the manner described with respect to the first numeric digit with one notable exception. For reasons of simplicity in describing the transfer of the first numeric digit from keyboard entry into ultimate buffer storage, one aspect of the effect of readout of any information which may have been previously stored in the buffer unit was passed over. Thus where the buffer unit may have contained previously stored information, such information will be read out in normal manner during A-read time. Successive binary information bits read out from each digit storage position of the buffer are accordingly translated by the amplifier 6-38 (FIG. 6a) and the inverter 6-39 to the AND gate 6-40 and normally would have resulted in information-bit control of the write trigger 6-45. However, during the entry of the first (but only the first) digit from keyboard entry into buffer storage, a buffer clear reset relay 247 (FIG. 6a) is deenergized and this maintains the AND gate 6-40 closed as previously explained until the counter has counted down to "1." Thus with respect to any information read out from buffer storage as the counter counts down from its initial setting of "12" to a setting of "1," the AND gate 6-40 is closed so that such information is effectively discarded. However when the counter has counted down to "1," the AND gate 6-43 now opens the AND gate 6-40 through the inverters 6-41 and 6-42 so that the first digit entered from keyboard and initially stored in the 12th digit storage position of the buffer is now read out from that storage position during A-read time, is effective to control operation of the write trigger 6-45, and thus is read into storage in the accumulator triggers. It is thereafter transferred from the accumulator during C-store time into the first digit storage position of the buffer as previously explained. During the second and all subsequent entries of digits from the keyboard into storage in the buffer unit, the buffer stands cleared by virtue of the first digit entry and the buffer clear reset relay 247 is accordingly energized to open its contacts 247–1. The AND gate 6–40 is thereafter conditioned to translate all information read out of buffer storage during A-read time, and this information accordingly controls the operation of the write trigger 6–45 in normal manner. The second digit entered from the numeric keyboard into buffer storage is again stored initially in the 12th digit storage position of the buffer unit, and the resulting double column shift operation prevailing during the remainder of the electronic cycle and as previously described effects a column shift up of all information in storage. The zeros stored in the higher order digit storage positions of the buffer have no effect during the column shift operation, but the first entered digit previously stored in the lowest order digit storage position of the buffer is now column shifted into the next higher digit storage position and the second numeric digit entered from keyboard entry (and now stored in the 12th digit storage position) is column shifted into storage in the first digit storage position. In this manner all previously stored digits from keyboard entry are column shifted to higher order digit storage positions in the buffer storage unit as each new numeric digit is inserted by keyboard entry into storage, and the last entered digit is therefore always stored in the lowest order digit position in buffer storage.

The manner of entering digits into storage in the buffer unit as described above results in automatic right hand justification of the units digit position for any given field of the form in preparation. This storage relationship is preserved as the information in buffer storage is transferred to other storage units during later calculations.

Readout of information from storage for typing always occurs during B-read time and with the relay 289 (FIG. 7d) energized to ground the A-read and C-store lines 7–93. In the initial readout to type operation, the relays 292 and 295 are again deenergized so that readout of information occurs in high order first fashion. Thus zeros stored in those higher order digit storage positions above the highest order first significant digit cause only a spacing operation of the typewriter upon readout of each such storage position. This maintains identity between the lowest order digit storage position and the character print position of the typewriter just preceding the interfield space automatically provided. In the readout to type mode of operation, the column shift inhibit relay 291 is energized so that only a normal column shift operation prevails and the double column shift operation described in connection with the insertion of information into storage from keyboard entry is eliminated. Whereas the normal column shift operation prevailing is from a lower order digit position in storage toward a higher order digit position whenever information is taken from storage low order first, the column shift is from a higher order digit storage position toward a lower order position when information is taken from storage high order first as in the initial steps of type from storage. One further aspect of the type from storage operation should be mentioned. Since information is transferred from storage high order first, the transfer of successive digits from storage is not only from the higher order to the lower order digits, but also from the binary-8 information bit of each digit successively to the binary-4, binary-2 and binary-1 information bits of that digit. Accordingly to effect correct decoding of each such digit as it is transferred from storage, relay 174 (shown in FIG. 9) is energized to reverse the normal connections of the decoding thyratrons 6–95—6–98 (FIG. 6b) to the decoding relays 175, 177, 178 and 180 (FIG. 9) with which they are associated and by which the decoded value of a digit controls numeric key lever selection in the typewriter.

While the A-read and C-store lines 7–93 are grounded during the type from storage as earlier mentioned, this does not prevent regeneration or placing back into storage of information read out. The grounding of these lines only means that no information is read into the accumulator during A-read time and no information from the accumulator is transferred to storage during C-store time (AND gate 6–63 of FIG. 6b). Information read during B-read time into the accumulator, from which it is received for typing, always controls the write trigger 6–45 of FIG. 6a in the absence of a specific program clear instruction and thereby effects regeneration of this information back into storage by control of the inhibit AND gate 7–98 (FIG. 7c) in the manner above described. Such regeneration of information read during B-read time is the normal operation prevailing, and if not desired requires the programmed energization of the reset-B relay 253 shown in FIG. 7c by which to reset or clear the storage unit from which information is read out during B-read time. Aside from the features just discussed as being of particular interest to a consideration of the storage drive system, a description of the remainder of the type from storage operation will be deferred until the relay system and its aspects of operation are described.

Turning now to a consideration of the construction and operation of the counter, it has a circuit arrangement shown in FIG. 7f and the relay and stepping switch control by which it is initially selectively set at each operating step is shown in FIG. 7g. The counter is used either to count 12 successive digit periods or to count a preselected number of successive electronic cycles of operation depending upon the particular nature of the electronic operation to be performed. The counter is of the count down type, and upon counting to zero effects termination of the electronic operation and initiation of the succeeding relay operation required to accomplish the next phase of the programmed computer operation.

Referring more particularly to FIG. 7f, the counter includes a plurality of binary operated triggers 7–104—7–107 coupled in tandem from the trigger 7–104 to the trigger 7–107 as shown. The Off and On output circuits of these triggers are coupled through cathode followers 7–108—7–114 to respective output circuits 7–115—7–121 for utilization of the counter operation. The Off and On output circuits of the triggers 7–104—7–107 also have coupled to them pullover inverters 7–124—7–131 as shown, and the latter are individually controlled by input potentials supplied to them from respective OR units 7–132—7–139. It is through these OR units that the counter is initially preset to store a particular number establishing the desired number of digits or electronic cycles to be counted.

A "12" digit count is stored in the counter by energizing the OR units 7–132, 7–134, 7–137, and 7–139 to turn On the counter triggers 7–106 and 7–107 and turn Off the triggers 7–104 and 7–105. To this end, the OR units last mentioned are energized through the normally closed contacts 232–3 of a relay 232, the normally closed contacts 203–3 of a relay 203, the normally closed contacts 8BL of a relay 8, either the normally closed contacts 201–5 of a relay 201 or the normally open contacts 216–2 of a relay 216, either the normally open contacts 210–211 of a relay 210 or the normally closed contacts 249–5 of a relay 249 and the normally open contacts 218–2 of a relay 218, and the normally closed contacts 217–1 of a relay 217. A "2" count is stored in the counter during a multiplication operation and by which to count successive electronic cycles. This is accomplished by energizing the OR unit 7–135 to turn On the trigger 7–105 and concurrently energizing the OR units 7–132, 7–136 and 7–138 to turn Off the triggers 7–104, 7–106 and 7–107. To this end these OR units are energized through various normally closed and normally open contacts (as shown in FIG. 7g) of relays energized, as hereinafter described, to accomplish test and evaluation of the highest order digit of the multiplier as the initial step of a multiplication operation. If the last mentioned test and evaluation should show that the highest order multiplier digit is zero, the successive test and evaluation electronic cycles automatically continue until the highest order significant digit of the multiplier is found. This test and evaluation proceeds one electronic cycle at a time, and for this purpose appropriate ones of the relays are energized to complete an energizing circuit from a source of positive potential to the OR unit 7–133 to turn On the trigger 7–104 and to effect concurrent energization of the OR units 7–134, 7–136 and 7–138 to turn Off the triggers 7–105—7–107.

As earlier mentioned, multiplication is accomplished by successive steps of over-and-over addition each controlled by the numeric value of a particular multiplier digit. The value of each multiplier digit is accordingly determined and stored in the counter which thereupon controls the number of electronic cycles of each over-and-over addition to be performed in deriving the partial product of that multiplier step. To this end, each multiplier digit is evaluated in turn by transferring it through the accumulator to the evaluation thyratrons which it was earlier mentioned control the evaluation relays 175, 177, 178 and 180. The fifth transfer contacts of these relays are connected as shown in FIG. 7g to individual ones of the OR units 7–132—7–139 so that various of the counter triggers 7–104—7–107 are set On and the remainder set Off according to the energization of the relays last mentioned in their evaluation of the given multiplier digit. This setting of the counter then controls the number of over-and-over additions to be performed for the given multiplier digit.

The counter is also used in selecting the next lower order multiplier digit to be evaluated after the first significant multiplier digit has been found. To this end, the stepping switch sections D, E, F and G have the segments of each so interconnected with each other and to individual ones of the OR units 7–132—7–139 that the counter has set into it a number expressed in binary form and corresponding to the particular step of the stepping switch at any time. This method of setting the counter is also used during type out by which to select the next highest order digit to be typed. Accordingly, the elongated energizing segments of the stepping switch sections last mentioned are energized in common as shown either through the contacts 186–10 of a relay 186 (energized during the type-out interval) or the contacts 232–10 of a relay 232 (energized from the outset of the multiplier test operation) and also the contacts 237–3 of a relay 237 (energized upon sensing the first significant digit of the multiplier), and the normally open contacts 217–5 of the electronic start relay 217 and the normally closed contacts 238–2 of the buffer clear reset relay 238.

It will be evident from the foregoing description of the counter that it is often set to count a predetermined number of digit periods or a predetermined number of electronic cycles. The count of digit periods is effected by translating C-store pulses through an inverter 142 (FIG. 7f), a cathode follower 143, the normally closed contacts 248–1 of a cycle–digit count relay 248, and an inverter 144 to the binary input circuit of the counter binary-1 trigger 7–104. The lagging edge of each C-store pulse thus changes the On-Off state of the latter trigger and thereby effects a digit count. Electronic cycle counts are accomplished by applying the On output circuit potentials of the triggers 7–11 and 7–12 and the Off output circuit potential of the trigger 7–16 to an AND gate 145 together with binary-8 timing pulses. The trigger 7–10 is Off and the trigger 7–16 is concurrently On only just prior to the completion of each electronic cycle, so that they condition the AND gate 145 to translate a binary-8 timing pulse through a cathode follower 146 and the transferred contacts 243–1 (transferred to count electronic cycles) and the inverter 144 to the binary-1 counter trigger 7–104 thereby to effect a count of electronic cycles.

*Relay system*

The electrical circuit arrangement of the relay system is shown in FIGS. 9a–9v which are to be considered together as a unitary structure with these figures arranged consecutively in the order from FIG. 9a to FIG. 9v. Certain phases of the relay operation have already been indicated in the foregoing description of various components of the computer. The more important aspects of the relay system operation and relay sequences of operation, effected during each successive relay cycle of each of the various types of calculation, will be considered in detail hereinafter. For the present, the relays of the relay system will be considered only by broad functional categories. The drawings showing the relay system include consecutive section identifications extending from section 3 through section 46, and indications of the positionings of the relay contacts of each relay are indicated with reference to these sections and to an "A" left hand or "B" right hand portion of each section. The present categorizing of relay functions will also proceed by reference to various relay sections.

The relays included in sections 3 through 15 may be broadly categorized as those which are energized to establish a principal type of computation to be performed and those relays which control the sequence by which relays are energized during the relay cycle of operation needed to accomplish the selected type of computation. These sections also include hold relays which maintain certain groups of relays energized throughout the entire operation to be performed.

Sections 16 and 17 show the typewriter print magnets and the various relay contacts which control their energization during a type-out operation.

Sections 18 through 21 show the program selection relays and the manner of energizing them through the contacts of the tape reader which reads the program tape.

Sections 22 through 25 relate essentially to the energization of various hold windings of the relays.

Section 26 shows the stepping switch section C and its control of the controlled energization, during typing, of the relays selected for successive programmed calculations.

Section 27 shows the stepping switch section B and its control over relays which provide automatic insertion of dollar and cents punctuation.

Section 28 shows the stepping switch section A which is involved in the programmed selection of a six digit field as contrasted with the normal ten digit field selection when the lesser field selection is not programmed.

Sections 29 through 31 relate to certain functional control relays involved in various phases of the several computer operations.

Sections 32 through 35 relate to the storage selection relays and their programmed selection.

Section 36 is the portion of the relay system which is energized by the control thyratron of the accumulator.

Section 37 shows the evaluation relays which are connected to the evaluating bit thyratrons of the accumulator.

Section 38 shows the manner with which the counter has various counts set into it, and this is also shown and has previously been considered with reference to FIG. 7g.

Sections 39 and 40 show the relay connections of the X driver cores to the relay 295 contacts which are shown and have been above discussed in connection with FIG. 7a.

Sections 41 through 43 show the relay contact arrangements by which the Y driver cores are connected to the buffer storage unit and each of storage units 1 through 7.

Section 44 shows the electronic reset control circuit by which the various triggers of the electronic system are reset prior to initiation of the electronic operation.

Sections 45 and 46 chart the position of the pickup winding and hold winding of each of the relays in the relay system.

The more important aspects of operation of the relay system will now be considered with reference to FIGS. 10a–10j and FIGS. 11a–11h each of which are arranged as shown respectively in FIGS. 10 and 11. FIGS. 10a–10j comprise a relay timing chart illustrating the relay operations involved during keyboard entry of numeric information into storage, the relay operation involved in typing informcation out of storage, and the relay sequences during two illustrative computation operations of which the first is a calculation by addition and a second a subtract calculation. FIGS. 11a–11h comprise a relay timing chart illustrating the sequence of relay operations involved in a multiplication operation and those involved in a column shift and half adjust operation.

Considering first the manner of keyboard entry of numeric information into storage and referring to the relay timing chart of FIG. 10a, manual actuation of any numeric key effects pickup of a numeric digit entry relay 189 and an electronic reset relay 220. This numeric key actuation also sets the numeric value of the digit to be entered into the accumulator. The relay 220 upon picking up picks up a relay 210, which is a hold relay to hold the reset state to which the various triggers of the electronics system are reset, and this relay upon picking up drops out the relay 220 and sets a "12" in the counter to enable the latter to make a 12 digit count during the electronic operation. The relay 220 upon dropping out establishes a circuit through which the electronic start relay 217 is picked up, and the pickup of this relay initiates the electronic operation (identified by the term "clock" throughout this timing chart and that of FIG. 11). At the end of the electronic operation, the control thyratron 6-99 of the accumulator is fired, and this energizes a relay LP247 which it was earlier mentioned effects in its de-energized state the clearing of previously stored information from the buffer storage unit. The control thyratron also energizes a keyboard restore magnet, which unlocks the numeric keyboard and permits a further manual actuation to insert the next digit into storage. Keyboard entry of successive digits into storage includes successive relay sequences identical to that described with the exception that the buffer clear relay 247 is not again picked up but remains latched up until the end of the second calculation interval.

FIGS. 10a–10h show the more important relay operations and sequences involved in typing out information from storage. This operation is initiated by manual actuation of the motor bar on the numeric keyboard to pick up a motor bar relay 30, a negative balance test cycle relay 195, and a type and negative balance test cycle relay 201. The relay 30 upon picking up in turn picks up a relay 17LP which holds all of the "Type" function relays, a field length relay 36, a programmed field length relay 207, and a field interlock and type program relay set-up relay 110. As indicated in FIG. 10a, the field length relays 36 and 207 upon picking up pick the program relays used for the typing operation, and it is assumed that these relays select a six digit field so that the stepping switch automatically steps itself (FIG. 9, sec. 28) from its 10th position to its sixth position. The relay 17 picks up the electronic reset relay 249, a relay 11 used to sequence the pick up of an electronic start relay presently to be considered, and a hold relay 34 which holds all functional relays picked up to perform the relay sequential operations. The relay 34 upon picking up drops out the motor bar relay 30 and picks up the relay 291 which grounds the B-read lines and also prevents a column shift up operation. The relay 30 upon dropping out de-energizes the relay LP17, but not all of the contacts of the latter drop out since a number remain latched in picked-up position until a latch trip is later energized to unlatch these contacts. The relay 11 picks up an isolation relay 218 which completes certain sequencing energization circuits. When the stepping switch has completed its automatic positioning at its sixth step position, it picks up a relay 125 which enables automatic insertion of dollars and cents punctuation and also causes the stepping switch to omit one stepping operation that it would normally take at the conclusion of the following cycle of relay operation. The stepping switch also drops out the field length relay 36 which in turn drops out the electronic reset relay 249 and the relay 11. The relay 36 also drops out the programmed field length relay 207. The reset relay 249 upon dropping out picks up the electronics start relay 217 and also sets a "1" in the counter.

Entry into a selected storage unit is by high order first at this time starting with the 11th digit storage position as previously explained, and the information stored in this position will have zero numeric value if the sign of the numeric word to be type out has positive algebraic value or will have a numeric 9 value if the algebraic sign is negative. The relay 217 upon picking up starts the electronic operation, at the end of which time the accumulator thyratrons are fired both to initiate the next cycle of relay operation and also to evaluate the sign digit just read out from the 11th digit storage position. While not shown, readout of a negative sign at this time would energize a negative sign relay 202 which would effect typing of a minus sign at the end of the typing of the numeric word and in the space provided between the field within which this word was typed and the succeeding field of the form in preparation.

The next cycle of relay operation starts with pick up of the relay 18 by the accumulator control thyratron when it fires, and this relay in turn picks up a relay 16 (having contacts which parallel the non-latched contacts of relay 17), a relay 204 which upon picking up deenergizes the accumulator thyratrons and the decoding relays controlled by them, relays 292, 295 and 308 which pick up to cause information to be read from storage low order first, and a relay 174 which connects the bit thyratrons of the accumulator to the decoding relays in the correct order to insure decoding of information coming from storage low order first. When the relay 16 picks up, it in turn picks up the electronic reset relay 249, the relay 11 (which ultimately picks up the electronic start relay), and a relay 186 which defines the operation to be performed at this time as a "type" operation. The relay 18 is dropped out by pick up of the relay 11 and in turn drops out the relay 16. The relay 11 picks up the isolation relay 218, relay 16 drops out relay 249, relay 11, and the negative balance test relay 195. The relay 249 now picks up the electronics start relay 217 which in turn picks up an electronics start delay relay 238 used in a typing operation only because of the need for more delay time to enable the relatively slow stepping switch to complete its stepping operation. The relay 217 also inserts a "6" into the counter, and when the relay 238 picks up to start the electronic operation, digits are read out from and returned to storage successively in turn starting with the lowest order digit and proceeding to higher order digits until such time as the counter has counted to zero, thus indicating that the sixth or highest order digit (stored in the assumed sixth digit field) has been read from storage into the accumulator. The counter having counted to zero at this time terminates the electronic operation and fires the thyratrons of the accumulator to evaluate the digit just read out.

The new sequence of relay operation thereupon initiated proceeds as before, with the difference that the relay 18 upon picking up causes the evaluation relays to control the typewriter print magnets whereby a selected type bar or the "space" magnet is actuated. If the evaluation of the digit shows that it is the first significant digit sensed, the relay 18 effects energization of a numeric key lever of the typewriter and picks up a first significant digit relay 184. If the first digit read out has zero value, the typewriter is merely spaced. At the same time, the relay 18 energizes a relay LP124 which controls the automatic insertion of dollars and cents punctuation. If the digit just read out is the first significant digit and hence a type lever of the typewriter is set in motion, or if the first digit is not significant and the typewriter is merely spaced, the initial movement of the type lever or typewriter carriage energizes a relay 252 which provides an interlock between the electronic system and typewriter operation by which to insure that the type lever has returned to rest or the carriage has ceased moving to deenergize the relay 252 before the next relay cycle is initiated. The relay 11 upon picking up now drops out the relay 18 which thereup picks up a relay LP122. The latter completes the energizing circuit to the stepping switch step magnet as long as the relay 125 is picked up and further functions to space the carriage or provide automatic insertion of commas after the first significant digit is sensed. The relay 11 also energizes the isolation relay 218 as before. The relay 18 on dropping out drops out the decoding relays, deenergizes the relay 16, and also effects deenergization of the relay 124 but the latter is of the type having its contacts latched in closed position. The relay 16 upon dropping out deenergizes the relays 249 and 11 as before, and the relay 249 drops out to pick up the electronics start relay 217 and in turn the electronics start delay relay 238 while again effecting insertion of a "6" into the counter. When the relay 238 now initiates the electronic operation as before, the sixth highest order digit is again read from storage into the accumulator and is evaluated by the firing of the thyratrons as soon as the relay 252 has dropped out. This evaluation of the sixth highest order digit is, however, not used since the control over the operation of the typewriter is now transferred to the punctuation relay LP122 which will effect the insertion of a comma if the relay 184 has picked up to signify that the sixth highest order digit is significant or otherwise will merely effect a spacing operation of the typewriter.

As shown in FIG. 10c, the relay 18 now energizes the stepping switch magnet, but the stepping switch is of the spring-loaded pawl actuation type and does not actually step until its magnet is deenergized at the time relay 18 drops out. An interlock contact on the stepping switch now prevents energization of the start relay 217, as indicated in FIGS. 10c and 10d, until the stepping switch has completed stepping to its fifth position. Now when the relay 217 is energized, a "5" is inserted in the counter so that the fifth highest order digit is now inserted from storage into the accumulator at the time the counter has counted down to zero and fires the accumulator thyratrons to evaluate this digit. During this print-out cycle, the evaluated digit is typed and a "4" is inserted in the counter to select the next lower order digit for decoding.

This operation continues as indicated in FIGS. 10d and 10e until just prior to the evaluation of the third from the lowest order digit, at which time the stepping switch has stepped to its third step position and picks up the relay 125 again (to eliminate one actuation of the stepping switch) and a relay 149 which energizes the CALC I program relays. After the third from the lowest order digit is evaluated, the relay 18 upon picking up picks up the punctuate relay 124 and thereafter a relay 121 is picked up to insert a period (decimal point) after this evaluated digit is typed. As indicated in FIG. 10f, the last digit evaluated is again evaluated after pick up of the relay 121 but its evaluation is without significance since control of the typewriter is transferred to the latter relay for purpose of typing the period. As the period is typed, the stepping switch steps to its second step and picks up a relay 152 which energizes the CALC II relays, and the next to the lowest order digit is read out of storage, evaluated and typed as shown in FIG. 10g. The stepping switch then steps to its first position, picks up a relay 155 to energize the automatic functional program relays and a relay 106 which will initiate the calculation operations following the next digit type-out operation, and the lowest order digit is read from storage, evaluated and typed. Just prior to the actual typing operation and energization of the type interlock relay 252, the stepping switch again steps and is thereupon returned to its tenth step position. Upon completion of the step, the stepping switch deenergizes the "Type" relay 186 to indicate the end of the typing operation and the initiation of the first calulation interval.

The relay 18 upon picking up now picks up a calculation interlock relay 31 and energizes the typewriter to effect a spacing operation if the negative sign relay 202 is not energized at this time (otherwise the latter relay will control the typewriter to effect printing of a minus sign and will space the typewriter at the same time). The relay 18 also energizes a latch trip magnet of the relay 17 to drop out all of the contacts of the latter which were previously latched in picked-up position. These contacts thereupon pick up a CALC set-up relay 14 and drop out the low order first relays 292, 295 and 308, the type program relays, CALC I program selection relay 149 and the CALC II program selection relay 152.

When the CALC set-up relay 14 picks up, it picks up a CALC program selection relay 13 which in turn picks up the program relays for the first calculation operation and energizes the CALC I set-up relay 12. The latter relay drops out the automatic function program energization relay 155 as shown in FIG. 10h and again picks up the hold relay 17. A relay sequence thereupon results to drop out the CALC set-up relays 12, 13 and 14 as indicated and to pick up the low order first relays 292, 295 and 308 and a CALC I interlock relay 105 which establishes the operation as a first calculation assumed by way of example to be one of addition. Thereafter a "12" is inserted in the counter and the electronic operation effects addition of a maximum of ten pairs of digits successively inserted into the accumulator from two seelcted storage units. When the counter now counts to zero and fires the thyratrons, the first calculation interval is thereby terminated and the second calculation initiated. This operation, assumed to be a subtraction, proceeds with drop out of the program I relays and pick up of the CALC II isolation relay 158 and CALC II interlock relay 10. Again the relays 292, 295 and 308 are picked up to provide low order first readout from storage, the complementing relay 246 is picked up as the programmed subtract relay, a "12" is inserted into the counter, and the resulting electronic operation subtracts a maximum of ten digits read out from two selected storage units and places the result of the subtraction back into one of these units. When the counter now counts to zero to terminate the second calculation interval, all of the relays which are picked up at this time are sequentially dropped in the manner shown in FIG. 10j whereupon the computer stands ready for numeric keyboard entry of further information into storage to constitute a new field of the form being prepared or otherwise to proceed in response to a programmed automatic function.

Figure 11B:
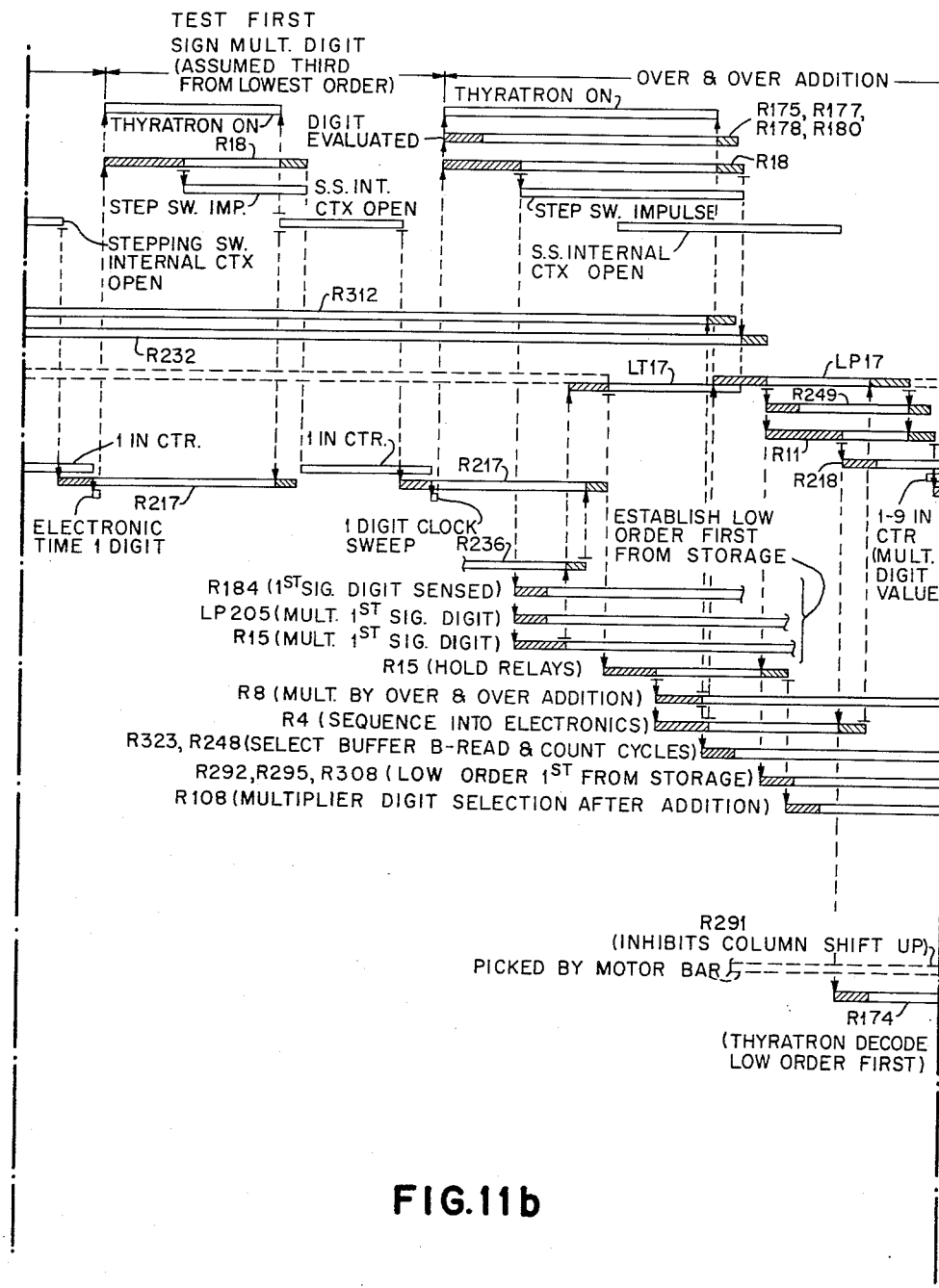
Figure 11C:
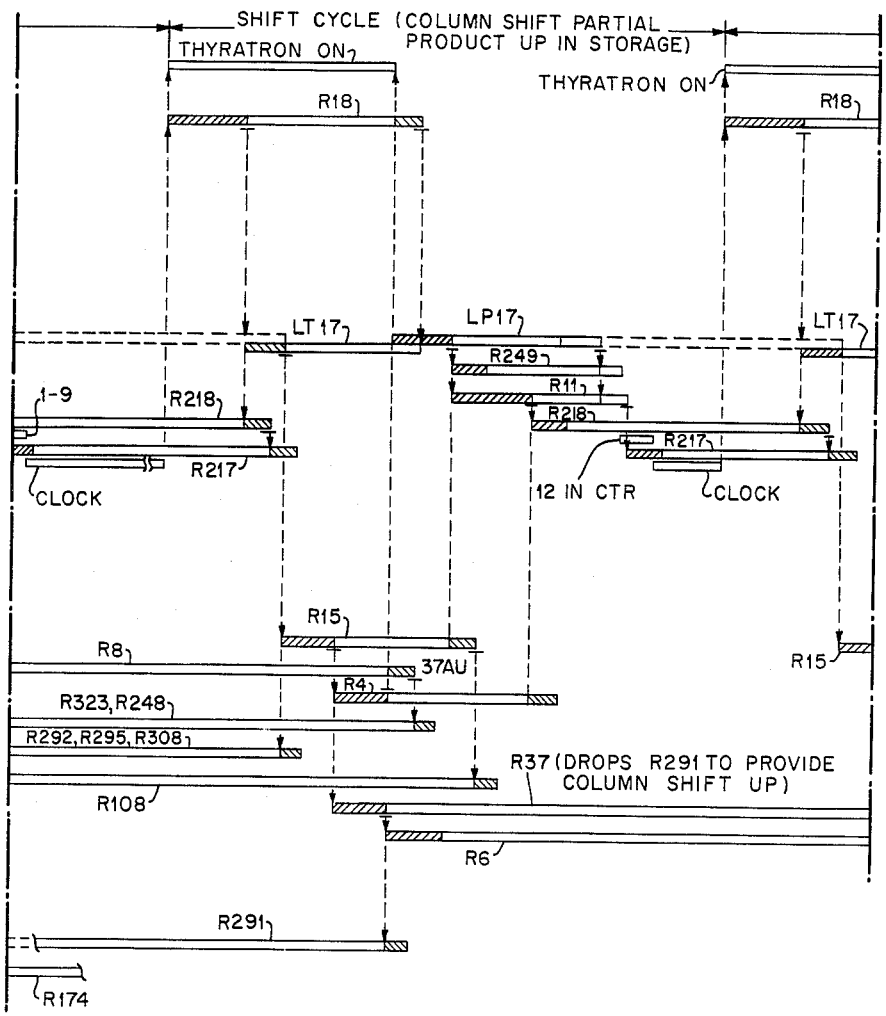

Consider now the two calculation intervals represented in FIG. 11 where the relay operations involved in a multiplication and column shift and half adjust operation are considered. For simplicity, the timing of the decoding relays and the relay 204 which deenergizes them is not shown in FIG. 11 but is the same as shown and described with relation to FIG. 10. FIG. 11a shows the relay cycle which initiates a multiplication operation again by pick up of relay 18. When this relay picks up and drops out the latched contacts of the "Type" hold relay 17, one of the contacts of the latter is a transfer contact and upon returning to a normally closed position picks up the calculation set-up relay 14. The latter picks up calculation program pick-up relay 13 which in turn picks up multiply relays 198, 7 and 9 together defining the operation to be performed as one of multiplication. By way of contrast, in the subtract operation last described, the relay 13 picked up subtract relay 246 at the outset of the calculation interval, and in the addition operation previously described in connection with FIG. 10h no program relays were picked by the relay 13 and the computer was therefore permitted to operate with its inherent characteristic of providing an addition. The relay sequence which occurs at this time is basically similar to the sequences earlier described, with the exception that the first step of a multiplication operation is to effect a test and evaluation of the highest order multiplier digit which is read during B-read time from a selected storage unit other than the buffer storage unit which stores the multiplicand. Since entry into the multiplier storage unit is by the high order first mode (the relays 292, 295 and 308 remaining deenergized) and starts with the 11th digit storage position, a "2" is set into the counter to provide two cycles of electronic operation whereby the 11th digit storage position is read out but not used and the following inherent column shift operation then causes readout of the 10th digit storage position during the second electronic cycle. This reads the 10th digit from storage for evaluation, and it is here assumed by way of example that this digit and subsequent digits above the third from the lowest order digit have zero value. Accordingly the relay sequence is of abridged form as indicated in FIGS. 11a and 11b until the first significant multiplier digit is read from storage to effect pick up of the first significant digit relays 184, 205 and 5. The relay 5 thereupon trips the latched contacts of the relay 17 which upon dropping out picks up the relay 15 to start the usual relay sequence heretofore described and indicated in FIG. 11b. Each time that the relay sequence is repeated for each higher order insignificant zero, the stepping switch is stepped from its 10th position toward its first step position. The illustrative relay operation here shown assumes, as indicated in FIG. 11b, that the first significant digit is the third from the lowest order digit. Thus when the first significant digit is sensed, the stepping switch is positioned on its third step. The value of the first significant digit just evaluated is now stored in the counter, and during the ensuing electronic time controls the number of over-and-over addition cycles dictated by the multiplier digit value. Readout of storage during addition is of the low order first type by pick up of the relays 292, 295 and 308. When this over-and-over addition is completed and the counter has stepped to zero to fire the thyratrons of the accumulator, a "12" is now placed in the counter, readout of storage is changed to high order first by drop out of the relays 292, 295 and 308, and the counter is caused to count digits whereby the partial product resulting from this first over-and-over addition is now column shifted up in storage. The actual column shift operation is effected by the pick up of relay 108 prior to the over-and-over addition, relay 108 in turn enabling pick up by relay 15 of relay 37 which drops the column-shift inhibit relay 291 as shown in FIG. 11c.

Figure 11D:
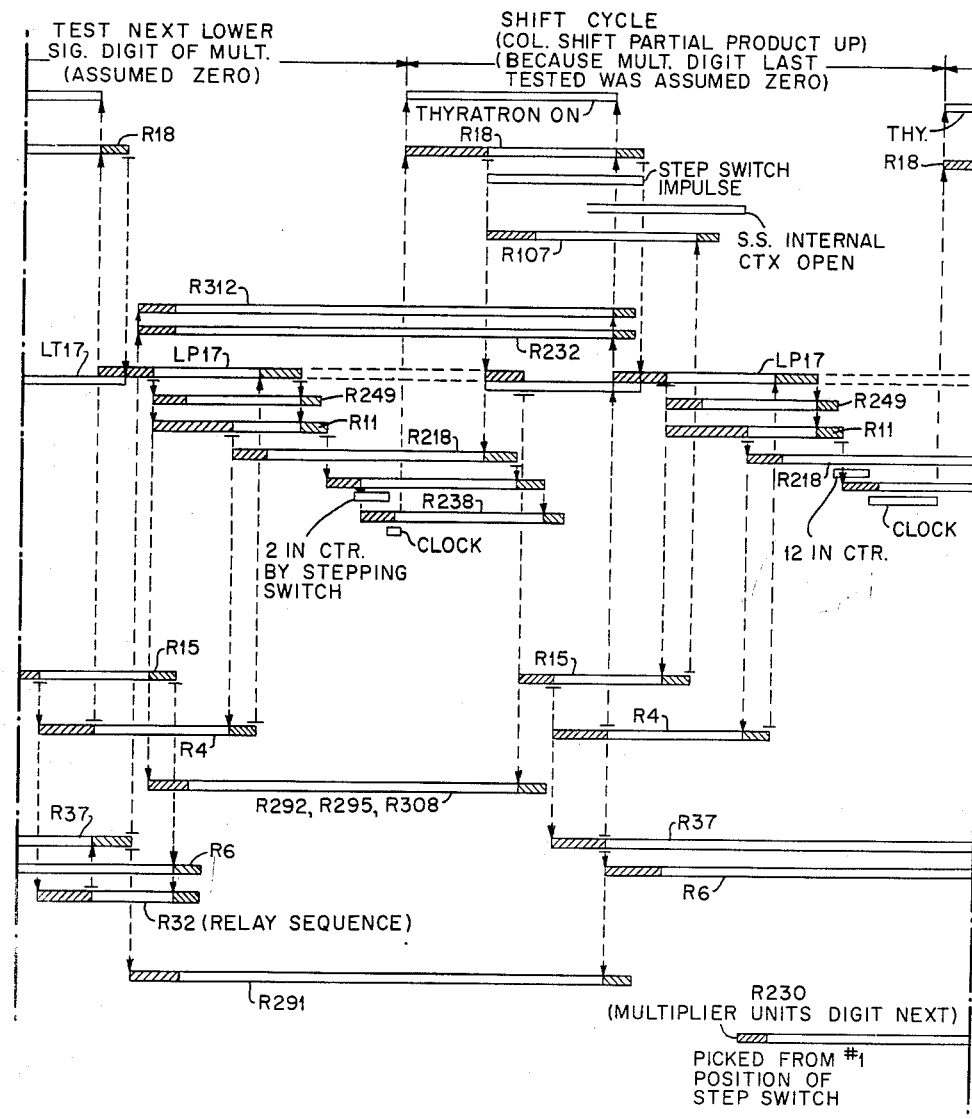
Figure 11E:
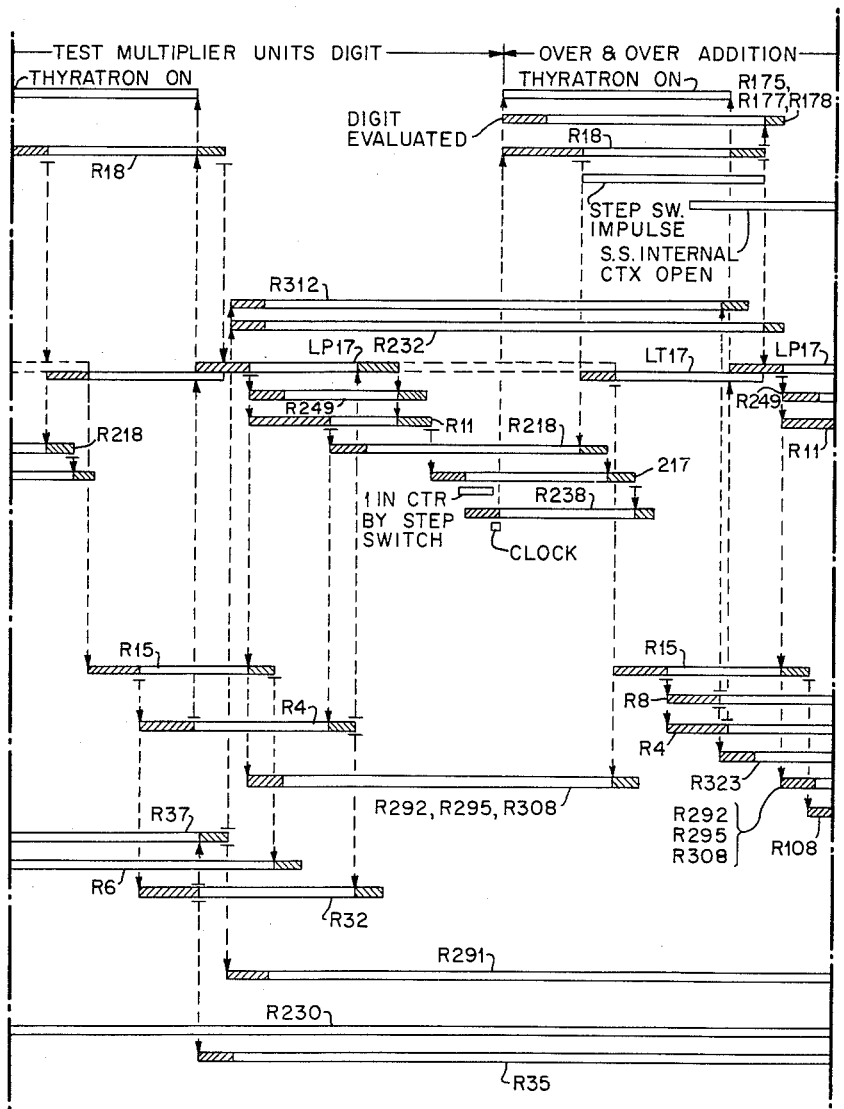
Figure 11F:
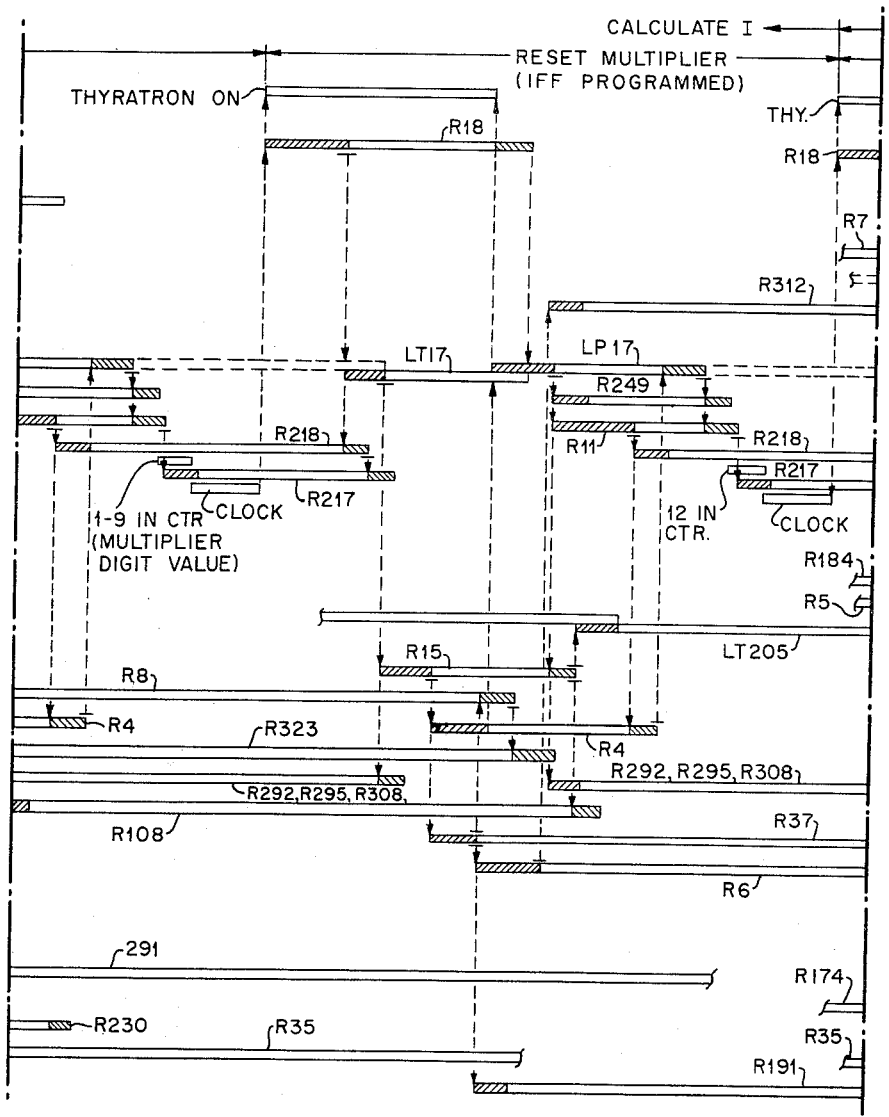

After the column shift up operation last described, the counter upon counting to zero fires the thyratrons again and the next highest order multiplied digit is transferred from storage to the accumulator for evaluation. As shown in FIG. 11d, this transfer from storage of the multiplier digit is now accomplished by the stepping switch placing a "2" in the counter and by maintaining the cycle-digit count relay 248 deenergized by which to effect a digit count. Thus after two digit periods, the next higher order multiplier digit stands in the accumulator and is evaluated when the counter counts to zero. It is assumed that this digit has zero value, as indicated in FIG. 11d so that the following relay cycle of operation effects a column shift up of the partial product in storage by the sequence of relay energizations shown in FIG. 11d. The next relay cycle is shown in FIG. 11e and accomplishes an evaluation of the last (lowest order) multiplier digit, and for this evaluation the stepping switch places a "1" in the counter so that there is only one electronic cycle within which the digit is read to the accumulator for evaluation when the counter counts to zero. In FIGS. 11e and 11f this digit is assumed to have a value other than zero so that the cycle of over-and-over addition occurs by insertion of the multiplier digit value into the counter and pick up of the relay 248 to count electronic cycles. At the completion of this over-and-over addition, the final product stands in storage in the selected storage unit and FIG. 11f assumes that the storage unit which stores the multiplier is now to be cleared.

This is accomplished, as indicated in FIG. 11f, by inserting a "12" into the counter and by energizing the reset multiplier relay 191 (the reset B-read storage relay 253 having previously been picked up under program control). It will be noted from FIG. 11e that a relay 35 is picked up in response to pick up of the relay 230 by the first step of the stepping switch, and the relay 35 upon picking up prevents energization of any relays which would cause a column shift; the relay 35 also places energization on the circuits controlled by the reset multiplier relay which was previously picked up during reading of the program instruction for the multiplication operation. It will further be noted as shown in FIG. 11f that the low order first relays 292, 295 and 308 are picked up so that readout of the multiplier digits from storage proceeds by low order first with the result that the 12th digit storage position of a storage unit is read out last and this storage position, as earlier explained, is provided with no core storage elements. Accordingly it is not possible to read any information out of storage during a 12th digit interval, the accumulator triggers are all then left turned OFF, and the bit thyratrons of the accumulator are never made conductive at the end of the reset multiplier operation.

The relay 248 remains deenergized and the counter now counts digit periods, so that upon now reading the multiplier digits out of storage during B-read time regeneration of the multiplier digits back into storage is inhibited and this storage unit is therefore cleared of information after the counter has counted through 12 digit cycles and counts to zero to terminate the electronic operation and initiate the next cycle of relay operation. This clearing of the multiplier digit from storage is not a necessary step during a multiplication operation but, as previously indicated, follows the usual practice of clearing a storage unit after the numeric word stored thereby has been used for the last time.

Figure 11G:
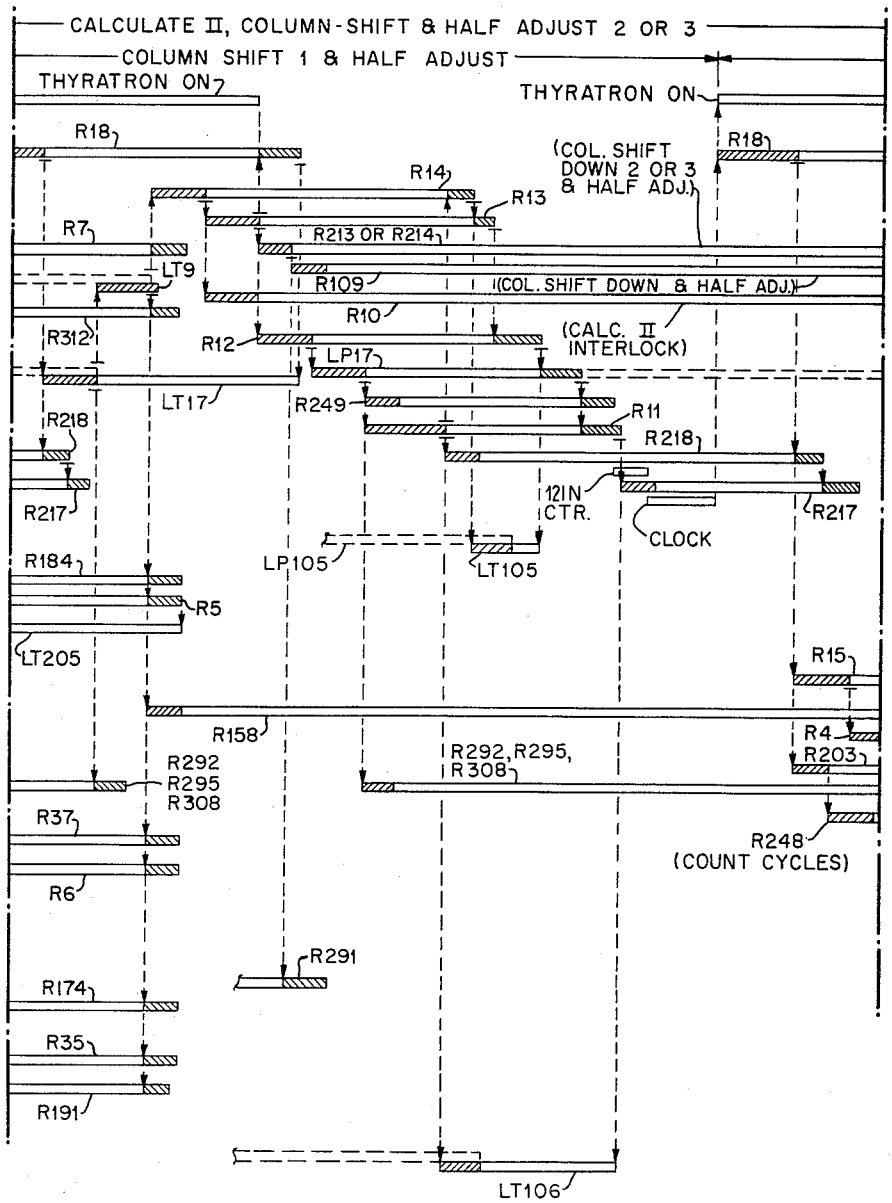
Figure 11H:
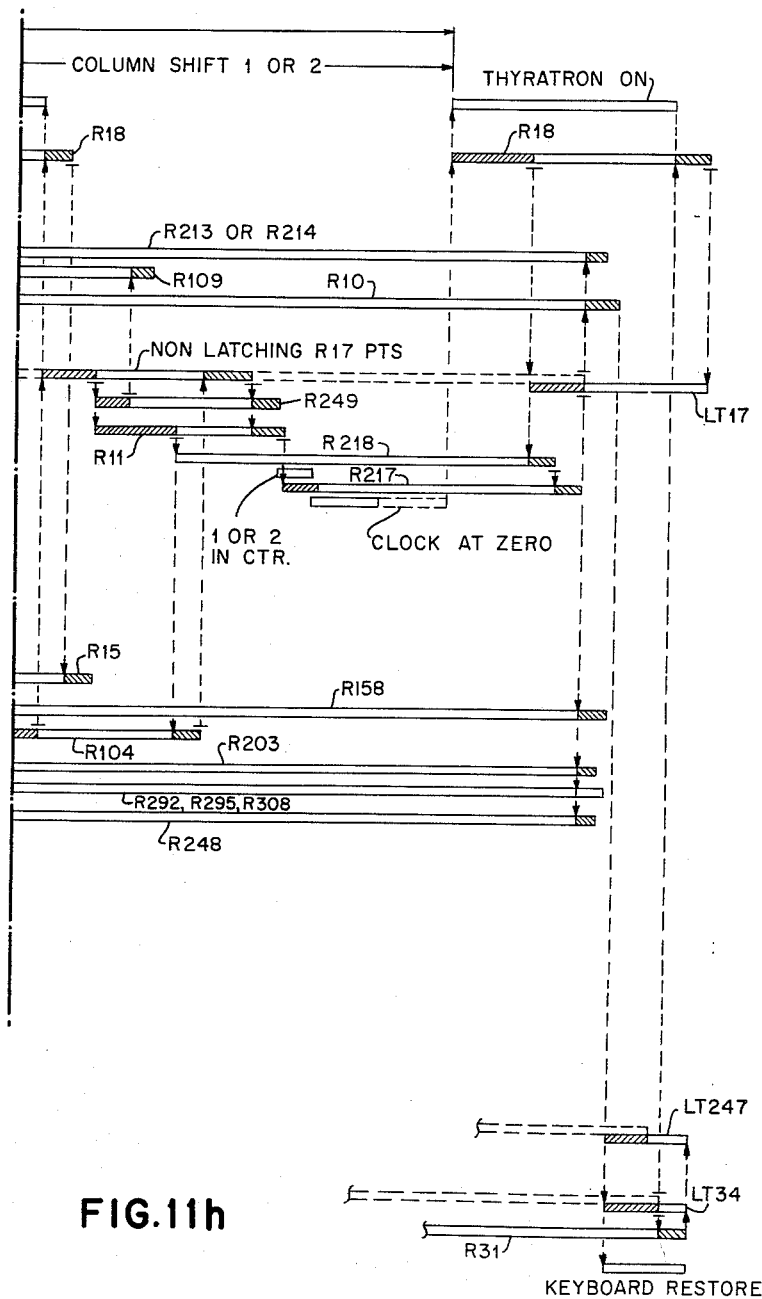

The multiplication operation of the first calculation interval having been now completed, the second calculation interval begins. The relay sequences shown in FIGS. 11g and 11h are those based upon the assumption that the second calculation to be performed is a half adjust and column shift down 2 or 3 to remove all but two fractional digits of the product computed during the first calculation interval. As indicated in FIG. 11g, a relay 213 is picked up to provide a two column shift down operation or a relay 214 is picked up where a three column shift down operation is desired. The pick up of either of these relays drops out the column shift inhibit relay 291. A relay 10 picks up to identify the present operation as that of CALC II. A "12" is now inserted in the counter, and relay 248 remains deenergized so that the counter counts digit periods. Relays 292, 295 and 308 are picked up to provide low order first entry into storage, so that the normal column shift operation prevailing is of the column shift down type. Accordingly during the ensuing electronic operation digits are transferred from storage into the accumulator at A-read time, no information is inserted in the accumulator during B-read time since the relay 291 remains deenergized to connect the B-read lines 7–94 (FIG. 7d) to ground, and each digit is then read back at C-store time into a column shifted down one digit position in storage. Depending upon whether relay 213 or 214 has been picked up, the half adjust insertion into the accumulator occurs when the counter has counted down to either the 11th or the 10th count as explained above in connection with the accumulator operation (FIG. 6). In connection with the time at which this half adjust insertion is made, it should be borne in mind that the counter has a "12" count in it when the lowest order digit is shifted from the first to the 12th digit storage position, the counter has an "11" count in it when the next higher order digit is column shifted to the first or lowest order digit storage position, and the counter has a "10" count when the next higher digit is column shifted into the next to the lowest order digit storage position.

When the half adjust and column shift operation last described has been completed, and the counter has counted down to zero, the control thyratron of the accumulator is again fired to initiate the second relay cycle of the second calculation interval. This time the counter is set to a "1" or a "2" depending upon which of the relays 213 or 214 is picked up (see FIG. 7g) and the relay 248 is picked up to cause the counter to count cycles. Now each time that the electronic operation continues through 12 digit periods there results a column shift down operation so that there is a single column shift down if a "1" has been set in the counter or two column shifts down if a "2" has been inserted in the counter. When the counter has again counted to zero, the control thyratron of the accumulator is again fired and the pick up of relay 18 this time unlatches the closed contacts of the relay 17 which thereupon drop out the relay 213 or 214 and relay 10 and the latter in turn energizes the latch trip of relays 247 and 34 and unlocks the typewriter keyboard as indicated in FIG. 11h to indicate completion of the electronic operation and enable continuation of the operation by the operator.

The foregoing description of the relay system operation encompasses the aspects of keyboard entry of numeric information to storage, the type out of the numeric information from storage, and the several types of computation which may be programmed including addition, subtraction, multiplication, column shifting down, and rounding off by half adjust and column shifting down either twice or three times.

While specific forms of the invention have been described for purposes of illustration, it is contemplated that numerous changes may be made without departing from the spirit of the invention.

What is claimed is:

1. A business machine comprising, means including a document transporting reciprocal carriage for printing lines of plural numeric words, means for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation, translating means operative during a translation interval to effect preselectable types of controlled translation serially by binary bits and serially by digits of all numeric words from storage in said storage means to said printing means and to and from storage in said storage means, and means controlled by said field definitive means and responsive solely to each said definitive control thereof for controlling the initiation of each translation operation of said translating means with respect to the numeric word field corresponding to said each definitive control.

2. A business machine comprising, means including a document transporting reciprocal carriage for printing lines of plural numeric words, means for storing binary-coded plural words of numeric information translated thereto serially by binary bits and serially by digits, field definitive means movable with said carriage for providing at each of plural preselected carriage positions a control definitive of the highest order digit position of a numeric field of a document in preparation and a control definitive of a selectable controlled entry into any of plural word storage positions of said storage means to receive therefrom for printing a selected word in storage, manually actuable means for initiating translation serially by binary bits and serially by digits of all words of numeric information from storage in said storage means to said printing means and to and from storage in said storage means to control each printing and storage of a numeric word in relation to an individual one of said numeric word fields and in conformity with said storage entry control, and means for utilizing said field definitive control to condition said manually actuable means to be responsive to manual actuation only at each of said preselected carriage positions.

3. A business machine comprising, means including a document transporting reciprocal carriage for printing lines of plural numeric words, means for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation, manually actuable means for initiating translation serially by binary bits and serially by digits of all words of numeric information from storage in said storage means to said printing means and to and from storage in said storage means to control each printing and storage of numeric words in relation to an individual one of said numeric word fields, and means for utilizing said field definitive control to condition said manually actuable means to be responsive to manual actuation only at each of said preselected carriage positions.

4. A business machine comprising, means including a document transporting reciprocal carriage for printing lines of plural numeric words, means for storing binary-coded words of numeric information translated thereto serially by binary bits and serially by digits, field definitive means movable with said carriage for providing a definitive control at each of plural preselected carriage positions each defining the hghest order digit position of a numeric word field of a document in preparation, first manually actuable means for selecting and effecting translation serially by binary-bits and serially by digit to storage in said storage means of successive numeric words, second manually actuable means for initiating translation from storage serially by binary-bits and serially by digit of a selected word in storage for printing by said printing means, and means for utilizing said field definitive control to condition said second manually actuable means to be responsive to manual actuations only at each of said preselected carriage positions.

5. A business machine comprising, means including a document transporting reciprocal carriage for printing lines of plural numeric words, means for storing binary-coded words of numeric information translated thereto serially by binary bits and serially by digits, means movable with said carriage and providing in relation to each of preselected carriage positions pre-recorded programmed operational instructions including at least one field instruction defining the highest order digit position a numeric field of a document in preparation and at least one instruction denfiing a selection of a storage position of said storage means from which to receive for printing a selected numeric word in storage, translating means responsive to said operational and storage selection instructions to effect during a translation interval preselectable types of program controlled translation serially by binary bit and serially by digit of numeric words from storage in said storage means to said printing means and to and from storage in said storage means, and means responsive to said field origin instruction for controlling the initiation of each translation operation of said translating means with respect to the numeric word field corresponding to said each definitive control.

6. A business machine comprising, means including a document transporting reciprocal carriage for printing lines of plural numeric words, means for storing binary-coded words of numeric information translated thereto serially by binary bits and serially by digits, a program tape movable in both directions with movement of said carriage and including rows of index points aligned in columns thereof each corresponding to an individual print position of said printing means, means responsive to index point recordings in a preselected row thereof for providing at each of preselected carriage positions a first control definitive of the highest order digit position of a numeric field of a document in preparation and responsive to other index point recordings in columns thereof corresponding to said preselected carriage positions for providing a second control defining selectable entry into any of plural word storage positions of said storage means to receive therefrom for printing a selected word in storage, translating means operative during a translation interval to effect preselectable types of controlled translation serially by binary bit and serially by digit of numeric words to and from storage in said storage means, and means controlled in response to said first definitive control for controlling the initiation of each operation of said translating means with respect to the numeric word field corresponding to each said first definitive control.

7. A business machine comprising, means including a document transporting reciprocal carriage for printing lines of plural numeric words, means for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting in relation to each said preselected carriage positions at least one programmed operation, translating means operative during a translation interval to effect each said programmed operation by translation serially by binary bit and serially by digit of numeric words from storage in said storage means to said printing means and to and from storage in said storage means, and means having an operation initiated in response to said definitive control for initiating each translation operation of said translating means with respect to the numeric word field corresponding to said each definitive control.

8. A business machine comprising, means including a document transporting reciprocal carriage for printing lines of plural numeric words, field definitive means movable with said carriage for providing a definitive control at each of plural preselected carriage positions each defining the highest order digit position of a numeric word field of a document in preparation, electronic computer means having a computational interval during which successive corresponding order digits of numeric words are translated thereby in computational operations thereof, relay means having a relay sequencing interval for establishing selectable types of computational operation and for establishing and thereafter initiating each major computational step to be performed during each said computational interval by said computer means, and means intercontrolling said computational means and relay means and actuated in response to said definitive control corresponding to any given numeric word field for initiating each computational operation to be performed for that field and the first major computational step thereof by a relay sequencing interval and to execute said first computational step by an immediately following electronic computational interval and for thereafter alternating said intervals in succession as necessary to the completion for said given field of subsequent major computational steps of operation by said computational means.

9. A business machine comprising, means including a document transporting reciprocal carriage for printing lines of plural numeric words, means for storing binary-coded words of numeric information translated thereto serially by binary bits and serially by digits, field definitive means movable with said carriage for preselecting at least one programmed printing operation and for providing a definitive control at each of plural preselected carriage positions each defining the highest order digit position of a numeric word field of a document in preparation, translating means operative during a translation interval to effect said printing operation by translation of numeric words from storage in said storage means serially by binary bit and serially by digit to said printing means and thereby effect printing in each said numeric field of selectable words from storage in said storage means, and means having an operation initiated in response to said definitive control for initiating each translation operation of said translating means with respect to the numeric word field corresponding to said each definitive control.

10. A business machine comprising, means including a document transporting reciprocal carriage for printing lines of plural numeric words, means for storing binary-coded words of numeric information translated thereto serially by binary bits and serially by digits, a multi-channel tape movable with said carriage and having one channel defining a definitive control at each of plural preselected carriage positions each defining the highest order digit position of a numeric word field of a document in preparation and having other channels preselecting in fixed spacial relation to said each carriage position at least one programmed operation to be performed, translating means operative during a translation interval to effect each said programmed operation by translation serially by binary bits and serially by digits of all numeric words from storage in said storage means to said printing means and to and from storage in said storage means, and means having an operation initiated in response to said definitive control for initiating each translation operation of said translating means with respect to the numeric word field corresponding to said each definitive control.

11. A business machine comprising, means including a document transporting reciprocal carriage for printing lines of plural numeric words, electronic computer means having a computational interval during which successive corresponding order digits of numeric binary-coded words are translated thereby serially by binary bits in computational operations thereof, a multi-channel tape reciprocal with said carriage and having one channel defining a definitive control at each of plural preselected carriage positions each defining the highest order digit position of a numeric word field of a document in preparation and having other channels preselecting at other carriage positions bearing a fixed spacial relation to said each carriage position at least one programmed computation to be performed, relay means having a relay sequencing interval and responsive to said programmed operation for establishing the programmed computational operation and for establishing and thereafter initiating each major computational step to be performed during each said computational interval by said computer means, and means intercontrolling said computer means and relay means and actuated in response to said definitive control corresponding to any given numeric word field for initiating each programmed computational operation to be performed for that field and the first major computational step thereof by a relay sequencing interval and to execute said first computational step by an immediately following electronic computational interval and for thereafter alternating said intervals in succession as necessary to the completion for said given field of subsequent major computational steps performed by said computer means in effecting said programmed computational operation.

12. A business machine comprising, means including a document transporting reciprocal carriage for printing lines of plural numeric words, means for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting at other carriage positions bearing a fixed spacial relation to said each carriage position at least one programmed operation, means for storing each programmed operating instruction during the interval required for operation thereof, translating means controlled by each said stored operating instruction and operative during said interval to translate serially by binary bit and serially by digit under program control numeric words from storage in said storage means to said printing means and to and from storage in said storage means, and means controlled by said field definitive means and responsive solely to each said definitive control thereof for controlling the initiation of each translation operation of said translating means with respect to the numeric word field corresponding to said each definitive control.

13. A business machine comprising, means including a document transporting reciprocal carraige for printing lines of plural numeric words, means for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting at other carriage positions bearing a fixed spacial relation to said each carriage position plural successive programmed operating instructions, means for storing each of said plural programmed operating instructions during the interval required for operation according to each thereof, translating means controlled by each said stored operating instruction in succession to translate serially by binary bit and serially by digit and under program control numeric words from storage in said storage means to said printing means and to and from storage in said storage means, and means controlled by said field definitive means and responsive solely to each said definitive control thereof for controlling the initiation of each translation operation of said translating means with respect to the numeric word field corresponding to said each definitive control.

14. A business machine comprising, means including a document transporting reciprocal carriage for printing lines of plural numeric words, field definitive means movable with said carriage for providing a definitive control at each of plural preselected carriage positions each defining the highest order digit position of a numeric word field of a document in preparation and for preselecting for each field plural successive programmed operational instructions, electronic computer means having a computational interval during which successive corresponding order digits of binary-coded numeric words are translated within the computing means serially by binary bits in computational operations thereof, relay means for storing each programmed operating instruction during the interval that said carriage is positioned within the corresponding numeric field and having a relay sequencing interval for establishing and thereafter initiating selectable types of computational operation to be performed during each said computational interval by said computer means, and means intercontrolling said computer means and relay means and actuated in response to said definitive control corresponding to any given numeric word field for initiating each computational operation to be performed for that field and the first major computational step thereof by a relay sequencing interval and to execute said first computational step by an immediately following electronic computational interval and for thereafter under control of said relay means alternating said intervals in succession as necessary to the completion for said given field of subsequent major computational steps executed by said computer means in effecting said plural successive programmed operations in conformity with said field operating instructions.

15. A business machine comprising, means including a document transporting reciprocal carriage for printing lines of plural numeric words, means for storing in each of plural word storage positions binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting for each said field any of said plural word storage positions of said storage means from which numeric information is received and translated to said printing means for printing thereby, translating means controlled by said field definitive means for translating serially by binary bit and serially by digit said numeric information from each said preselected word storage position to said printing means, and means controlled by said field definitive means and responsive solely to each said definitive control thereof for controlling the initiation of each translation operation of said translating means with respect to the numeric word field corresponding to said each definitive control.

16. A business machine comprising, means including a document transporting reciprocal carriage for printing lines of plural numeric words, means for storing in each of plural word storage positions binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting for each said field any of said plural word storage positions of said storage means from which numeric information is received and translated to said printing means for printing thereby and to and from which numeric words are to be translated, translating means controlled by said field definitive means for translating said numeric information serially by binary bit and serially by digit from each said preselected word storage position to said printing means and for effecting for each said field preselected types of controlled translation of numeric words serially by binary bit and serially by digit to and from storage in said storage means, and means controlled by said field definitive means and responsive solely to each said definitive control thereof for controlling the initiation of each translation operation of said translating means with respect to the numeric word field corresponding to said each definitive control.

17. A business machine comprising, means including a document transporting reciprocal carriage for printing lines of plural numeric words, means having plural word storage positions for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting for each said field any of said plural word storage positions to and from which numeric information is to be translated and plural programmed operations to be performed upon said translated numeric information, translating means operating under control of said field definitive means to effect said preselected information translations serially by binary bit and serially by digit and to effect said programmed operations thereon, and means controlled by said field definitive means and responsive solely to each said definitive control thereof for controlling said translating means and the initiation of each translation operation thereof with respect to the numeric word field corresponding to said each definitive control.

18. A business machine comprising, means including a document transporting reciprocal carriage for printing lines of plural numeric words, means having plural word storage positions for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for preselecting for each said field plural word storage positions to and from which numeric information is to be translated and plural programmed operations to be performed upon said translated numeric information, means for storing while said carriage is positioned in said highest order digit position of each said field each of said plural programmed operational instructions, translating means operated under control of said field definitive means and in response to successive programmed operating instructions supplied thereto from said last-named means to effect said preselected information translations serially by binary bit and serially by digit and to effect said programmed operations thereon, and means controlled by said field definitive means and responsive solely to each said definitive control thereof for controlling said translating means and the initiation of each translation operation thereof with respect to the numeric word field corresponding to said each definitive control.

19. A business machine comprising: means including a document transporting reciprocal carriage for printing lines of plural numeric words; means having plural word storage positions for storing binary-coded words of numeric information translated thereto serially by binary bits and serially by digits; field definitive means movable with said carriage for providing a definitive control at each of plural preselected carriage positions each defining the highest order digit position of a numeric word field of a document in preparation and for preselecting for each said field any of said word storage positions from which numeric information is to be translated to said printing means for printing thereby, any of said word storage positions from which numeric information is to be translated for computation and to which the results of computation are to be returned for storage, and the types of computations to be performed on said information translated from said preselected storage positions; translating and computing means operated under control of said field definitive means for effecting translation of numeric information serially by binary bit and serially by digit to said printing means and for effecting said preselected information translation serially by binary bit and serially by digit and the computations thereon and re-storage of the results thereof; and means controlled by said field definitive means and responsive solely to each said definitive control thereof for controlling said translating means and the initiation of each translation operation thereof with respect to the numeric word field corresponding to said each definitive control.

20. A business machine comprising: means including a document transporting reciprocal carriage for printing lines of plural numeric words; means having plural word storage positions for storing binary-coded words of numeric information translated thereto serially by binary bits and serially by digits; a program tape movable in both directions with movement of said carriage and including rows of index points aligned in columns thereof each corresponding to an individual print position of said printing means; field definitive means responsive to index point recordings in a preselected row thereof for providing at each of preselected carriage positions a first control definitive of the highest order digit position of a numeric field of a document in preparation and responsive to other index point recordings in columns thereof for preselecting for each field any of said word storage positions in said storage means from which numeric information is to be translated to said printing means for printing thereby, any of said word storage positions from which numeric information is to be translated for computation and to which the results of computation are to be returned for storage, and the types of computations to be performed on said information translated from said preselected storage positions; translating and computing means operated under control of said field definitive means for effecting translation serially by binary bit and serially by digt of numeric information from said storage means to said printing means and for effecting said preselected information translation serially by binary bit and serially by digit and the computations thereon and re-storage of the results thereof; and means controlled by said field definitive means and responsive solely to each said definitive control thereof for controlling said translating means and the initiation of each translation operation thereof with respect to the numeric word field corresponding to said each definitive control.

21. A business machine comprising: means including a document transporting reciprocal carriage for printing lines of plural numeric words; means having plural word storage positions for storing binary-coded words of numeric information translated thereto serially by binary bits and serially by digits; a program tape movable in both directions with movement of said carriage and including rows of index points aligned in columns thereof each corresponding to an individual print position of said printing means; field definitive means responsive to index point recordings in a preselected row thereof for providing at each of preselected carriage positions a first control definitive of the highest order digit position of a numeric field of a document in preparation and responsive to other index point recordings in columns thereof for preselecting for each field any of said word storage positions in said storage means from which numeric information is to be translated to said printing means for printing thereby, any of said word storage positions from which numeric information is to be translated for computation and to which the results of computation are to be returned for storage, and the types of computations to be performed on said information translated from said preselected storage positions; electronic computer means having a computational interval during which successive corresponding order digits of numeric words are translated thereby in computational operations thereof; relay means having a relay sequencing interval for establishing selectable types of computational operation and for establishing and thereafter initiating each major computational step to be performed during each said computational interval by said computer means; and means intercontrolling said computer and relay means and actuated in response to said definitive control corresponding to any given numeric word field for initiating each computational operation and the first major computational step thereof to be performed for that field by a relay sequencing interval and to execute said first computational step by an immediately following electronic computational interval and for thereafter under control of said field definitive means alternating said relay-sequence and computational intervals in succession as necessary to effect said translation of information for printing and said computations and storage of computational results.

22. A business machine comprising, means including a document transporting reciprocal carriage for printing lines of plural numeric words, means having plural word storage positions for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for providing at preselected other carriage positions in each said preselection of word storage positions to and from which numeric information is to be translated and preselected programmed operations to be performed, translating means operative during a translation interval to effect said preselected types of controlled translation serially by binary bit and serially by digit of numeric words from storage in said storage means to said printing means and to and from storage in said storage means and to perform said preselected programmed operations thereon, and means controlled by said field definitive means and responsive solely to each said definitive control thereof for controlling the initiation of each translation operation of said translating means with respect to the numeric word field corresponding to said each definitive control.

23. A business machine comprising, means including a document transporting reciprocal carriage for printing lines of plural numeric words, means having plural word storage positions for storing words of numeric information, field definitive means movable with said carriage for providing a definitive control at each of plural preselected carriage positions each defining one margin of a numeric word field of a document in preparation and for providing at these positions and preselected other carriage positions in each said field both preselection of word storage positions to and from which numeric information is to be translated and preselection of programmed operations to be performed on and by use of said translated numeric information, translating means operative during a translation interval to effect said preselected types of controlled translation serially by binary bit and serially by digit of numeric words from storage in said storage means to said printing means and to and from storage in said storage means and to perform said translated programmed operations thereon, and means controlled by said field definitive means and responsive solely to each said definitive control thereof for controlling the initiation of each translation operation of said translating means with respect to the numeric word field corresponding to said each definitive control.

24. A business machine comprising, means including a document transporting reciprocal carriage for printing lines of plural numeric words, means having plural word storage positions for storing binary-coded words of numeric information translated thereto serially by binary bits and serially by digits, field definitive means movable with said carriage for providing a definitive control and print-from-preselected-storage translation instructions at each of plural preselected carriage positions each defining the highest order digit position of a numeric word field of a document in preparation and for providing at preselected other carriage positions in each said field preselection of word storage positions to and from which numeric information is to be translated and preselected programmed operations to be performed on and in relation to said translated numeric information, translating means operative during a translation interval to effect said preselected types of controlled translation serially by binary bit and serially by digit of numeric words from storage in said storage means to said printing means and to and from storage in said storage means, and means controlled by said field definitive means and responsive solely to each said definitive control thereof for controlling the initiation of each translation operation of said translating means with respect to the numeric word field corresponding to said each definitive control.

25. A business machine comprising, means including a document transporting reciprocal carriage for printing lines of plural numeric words, means for storing binary-coded words of numeric information translated thereto serially by binary bits and serially by digits, field definitive means movable with said carriage for preselecting at least one programmed printing operation and for providing a definitive control at each of preselected carriage positions each defining the highest order digit position of a numeric word field of a document in preparation and preselected control of said printing means to effect with relation to each said field the automatic insertion thereby of dollars and cents punctuation, translating means operative during a translation interval to effect controlled translation serially by binary bit and serially by digit of numeric words from preselectable storage positions in said storage means to said printing means, and means controlled by said field definitive control for lating means with respect to the numeric word field corresponding to said each definitive control.

26. A business machine comprising, means including a document transporting reciprocal carriage for printing lines of plural numeric words, means for storing binary-coded words of numeric information translated thereto serially by binary bits and serially by digits, stepping means for counting a predetermined number of character spaces of said carriage, field definitive means including said stepping means for preselecting at least one programmed printing operation and for providing a definitive control at each of preselected carriage positions each defining the highest order digit position of a numeric word field of a document in preparation and preselected control of said printing means to effect with relation to each said field the automatic insertion thereby of dollars and cents punctuation, translating means operative during a translation interval to effect controlled translation serially by binary bit and serially by digit of numeric words from preselectable storage positions in said storage means to said printing means, and means controlled by said field definitive control for controlling the initiation of each operation of said translating means with respect to the numeric word field corresponding to said each definitive control.

27. A business machine comprising, means including a document transporting reciprocal carriage for printing lines of plural numeric words, means for storing binary-coded words of numeric information translated thereto serially by binary bits and serially by digits, field definitive means movable with said carriage for preselecting at least one programmed printing operation and for providing a definitive control at each of preselected carriage positions each defining the highest order digit position of a numeric word field of a document in preparation and preselected control of said printing means to effect with relation to each said field the automatic insertion thereby of dollars and cents punctuation, translating means operative during a translation interval to effect controlled translation serially by binary bit and serially by digit of numeric words from preselectable storage positions in said storage means to said printing means, means controlled by said field definitive control for controlling the initiation of each operation of said translating means with respect to the numeric word field corresponding to said each definitive control, and means responsive to the numeric information translated to said printing means for automatically suppressing the printing of zeros and punctuation thereby to the left of the first significant zero of each numeric word printed.

28. A business machine comprising: means including a document transporting reciprocal carriage for printing lines of plural numeric words; means for storing binary-coded words of numeric information translated thereto serially by binary bits and serially by digits; stepping means for counting a predetermined number of character spaces of said carriage; field definitive means movable with said carriage for providing a definitive control at each of plural preselected carriage positions, each defining the highest order digit position of a numeric word field of a document in preparation, and programmed storage selections and operating instructions relative to each said field; means controlled by said stepping means for storing the programmed storage selections and operating instructions relative to said each field; translating means controlled by said last-mentioned means to effect programmed translation serially by binary bit and serially by digit of numeric information from storage in said storage means to said printing means and to and from storage in said storage means and to effect execution of said operating instructions; and means controlled by said field definitive means and responsive solely to each said definitive control thereof for controlling the initiation of each translation operation of said translating means with respect to the numeric word field corresponding to said each definitive control.

29. A business machine comprising, means including a document transporting reciprocal carriage for printing lines of plural numeric words, means for storing binary-coded words of numeric information translated thereto serially by binary bits and serially by digits, field definitive means movable with said carriage for providing a definitive control at each of plural preselected carriage positions each defining the highest order digit position of a numeric word field of a document in preparation and for concurrently providing a preselection of the width of each said numeric field, translating means operating during a translation interval to effect preselectable types of controlled translation serially by binary bit and serially by digit of numeric words from storage in said storage means to said printing means and to and from storage in said storage means, and means controlled by said field definitive means and responsive solely to each said definitive control thereof for controlling the initiation of each translation operation of said translating means with respect to the numeric word field corresponding to said each definitive control.

30. A business machine comprising: means including a document transporting reciprocal carriage for printing lines of plural numeric words; means for storing binary-coded words of numeric information translated thereto serially by binary bits and serially by digits; stepping means for counting a predetermined number of character spaces of said carriage; field definitive means movable with said carriage for providing a definitive control at each of plural preselected carriage positions each defining one margin of, and under control of said stepping means the width of, a numeric word field of a document in preparation; translating means operative during a translation interval to effect preselectable types of controlled translation serially by binary bit and serially by digit of numeric words from storage in said storage means to said printing means and to and from storage in said storage means; and means controlled by said field definitive means and responsive solely to each said definitive control thereof for controlling the initiation of each translation operation of said translating means with respect to the numeric word field corresponding to said each definitive control.

31. A business machine comprising: means including a document transporting reciprocal carriage for printing lines of plural numeric words; means having plural word storage positions for storing words of numeric information; field definitive means movable with said carriage for providing a definitive control at each of plural preselected carriage positions each defining the highest order digit position of a numeric word field of a document in preparation and identifying a word storage position of said storage means from which numeric information is to be printed by said printing means and for further providing at preselected other carriage positions in each said field preselection of word storage positions to and from which numeric information is to be translated and preselecting computational operations are to be performed on said translated numeric information; translating means controlled by said field definitive means for supplying numeric information from said identified word storage positions to said printing means, for receiving and storing during printing a numeric word in each said field and the storage selection and computational instructions preselected for said each field by said field definitive means, and for executing at the completion of the printing of each said field the successive computational instructions preselected therefor; and means actuated in response to said definitive control for initiating the operation of said translating means with respect to each said field.

32. A business machine comprising: means including a document transporting reciprocal carriage for printing lines of plural numeric words; means having plural word storage positions for storing words of numeric information; field definitive means movable with said carriage for providing a definitive control at each of plural preselected carriage positions each defining the highest order digit position of a numeric word field of a document in preparation and identifying a word storage position of said word storage means from which numeric information is to be printed by said printing means and a first preselected operation to be performed during printing thereof, and for further providing at preselected other carriage positions in each said field preselection of word storage positions to and from which numeric information is to be translated and preselected other operations and successive computations are to be performed on and in relation to said translated numeric information; translating means controlled by said field definitive means for performing said first operation and for supplying numeric information from said identified word storage positions to said printing means, for receiving and storing during printing of a numeric word in each said field the storage selection and field operational and computational instructions preselected for said each field by said field definitive means, and for executing at the completion of printing of each said field the second operational instructions and successive computational instructions preselected therefor; and means actuated in response to said definitive control for initiating the operation of said translating means with respect to each said field.

33. A business machine comprising, electronic computer means having a computational interval during which successive corresponding order digits of numeric words are translated thereby in computational operations thereof, relay means having a relay sequencing interval for establishing selectable types of computational operation and for establishing and thereafter initiating each major computational step to be performed during each said computational interval by said computer means, and means intercontrolling said computer means and relay means to initiate each computational operation and the first major computational step thereof by a relay sequencing interval and to execute said first computational step by an immediately following electronic computational interval and for thereafter alternating said intervals in succession as necessary to the completion of subsequent major computational steps by said computer means.

34. A business machine comprising, electronic computer means operating in digit computational steps during a computational interval wherein successive corresponding order digits of numeric words are translated thereby in computational operations thereof, relay means having selectable sequences of relay operations during a relay sequencing interval by which selectably to establish and control the type of computation to be performed at each computational step by said computer means, and means intercontrolling said computer means and relay means to initiate a succeeding computational step of said computer means in response to completion of each relay sequence of operation and to initiate a succeeding relay sequence of operation in response to completion of each computational step of said computer means.

35. A business machine comprising, electronic computer means operating in digit computational steps during a computational interval wherein successive corresponding order digits of numeric words are translated thereby in computational operations thereof, relay means having selectable sequences of relay operations during a relay sequencing interval by which selectably to establish and control the type of computation to be performed at each computational step by said computer means, counter means for counting the number of computational steps of said computer means, means initiating an initial sequence of said relay means to initiate each computational operation and for concurrently initiating operation of said counter means, means intercontrolling said computer means and relay means for initiating a computer computational interval upon completion of each relay sequencing interval and for initiating a relay sequencing interval upon completion of each computational interval, and means controlled by said counter means for supplying further initiation of a relay sequence of said relay means upon completion of a number of computational steps by said computer means preselected according to the selected type of computation to be performed.

36. A business machine comprising, electronic computer means operating in digit computational steps during a computational interval wherein successive corresponding order digits of numeric words are translated thereby in computational operations thereof, relay means having selectable sequences of relay operations during a relay sequencing interval by which selectably to establish and control the type of computation to be performed at each computational step by said computer means, counter means for counting the number of computational steps of said computer means, programming means for selecting a type of computational operation to be performed and for concurrently presetting said counter means to effect a preselected computational step count during the selected computation, means initiating an initial sequence of said relay means to initiate each computational operation and for concurrently initiating operation of said counter means, means intercontrolling said computer means and relay means for initiating a computer computational interval upon completion of each relay sequencing interval and for initiating a relay sequencing interval upon completion of computation interval, and means controlled by said counter means for supplying further initiation of a relay sequence of said relay means upon completion of said predetermined number of computational steps by said computer means.

37. A business machine comprising: means having plural word storage positions for storing words of numeric information; electronic computer means operating in digit computational steps for receiving plural multi-digit words of numeric information and for performing computations by use thereof serially by corresponding order of successive digits; relay means having selectable sequences of relay operations by which selectably to establish and control the type of computation to be performed at each computational step by said electronic means; counter means; and means including said counter means for intercontrolling said computer means and relay means to initiate a relay sequence providing high order first access to the multiplier storage position of said storage means followed by a computation to evaluate each multiplier digit considered in descending order and to preset said counting means to the value of each thereof, and following each said evaluation to select alternate relay sequences and computer intervals to effect under control of said counter means as preset according to the value of each multiplier digit over-and-over addition of a multiplicand from one storage position and a partial product from another storage position of said storage means and a concluding column shift up operation until multiplication is completed on the units multiplier digit.

38. A business machine comprising, first and second storage means for respectively storing a partial product and multiplicand and each providing successive digit storage positions, an accumulator providing temporary storage of a digit, transfer means for effecting consecutive transfer of a digit from said first and said second storage means to said accumulator and return transfer from said accumulator to said first storage means, means for controlling said transfer means to effect a sequence of said consecutive transfers by equal order of digits beginning low order first and continuing through the highest order digit storage position, and counter means for counting the number of complete sequences of transfers to terminate the operation of said transfer means upon completion of a total number of sequences corresponding to the value of a multiplier digit and thereby effect storage in said one storage means of a partial product.

39. A business machine comprising: a plurality of storage means, each providing a preselected number of successive digit storage positions, adapted to store a multiplicand, a multiplier and a product; an accumulator; evaluating means; transfer means for effecting transfer of each of successive digits high order first from said multiplier storage means to said evaluating means and subsequent to each said transfer to effect consecutive transfers of equal order digits from said product storage means and said multiplicand storage means to said accumulator and return of a resultant digit from said accumulator to the same position in storage in said product storage means with said consecutive transfers continuing through a sequence thereof beginning with the lowest order digit storage position and continuing to the highest order digit storage position; and means including counter means controlled by said evaluating means to continue for each multiplier digit a succession of said transfer sequences in number corresponding to the value of said each multiplier digit as established by said evaluating means and to follow each succession of transfer sequences except the last thereof by transfer of each product digit from a given order of digit storage position in said product storage means through said accumulator to the next higher order of digit storage position in said product storage means.

40. A business machine comprising: a plurality of storage means, each providing a preselected number of successive digit storage positions, adapted to store a multiplicand, a multiplier and a product; an accumulator; evaluating means; transfer means for effecting transfer of each of successive digits high order first from said multiplier storage means through said accumulator to said evaluating means and subsequent to each said transfer to effect consecutive transfers of equal order digits from said product storage means and said multiplicand storage means to said accumulator and return of a resultant digit from said accumulator to the same position in storage in said product storage means with said consecutive transfers continuing through a sequence thereof beginning with the lowest order digit storage position and continuing through the highest order digit storage position; and means including counter means controlled by said evaluating means to continue for each multiplier digit a succession of said transfer sequences in number corresponding to the value of said each multiplier digit as established by said evaluating means and to follow each succession of transfer sequences except the last thereof by transfer of each product digit through a given order of digit storage position in said product storage means through said accumulator to the next higher order of digit storage position in said product storage means with the number of said last-mentioned transfers controlled by said counter means to correspond to said preselected number of storage positions of said storage means.

References Cited in the file of this patent

UNITED STATES PATENTS

| | | |
|---|---|---|
| 2,332,755 | Robertson et al. | Oct. 26, 1943 |
| 2,540,029 | Hamilton et al. | Jan. 30, 1951 |
| 2,629,549 | Butler | Feb. 24, 1953 |
| 2,636,672 | Hamilton et al. | Apr. 28, 1953 |
| 2,652,196 | Sterling | Sept. 15, 1953 |
| 2,714,985 | Saxby et al. | Aug. 9, 1955 |
| 2,717,733 | Luhn et al. | Sept. 13, 1955 |
| 2,800,539 | Edminster et al. | July 23, 1957 |
| 2,864,554 | Rolph et al. | Dec. 16, 1958 |

UNITED STATES PATENT OFFICE
CERTIFICATION OF CORRECTION

Patent No. 3,008,635                          November 14, 1961

Fred E. Sakalay

It is hereby certified that error appears in the above numbered patent requiring correction and that the said Letters Patent should read as corrected below.

Column 1, line 69, for "described" read -- desired --; column 8, line 3, for "balanc" read -- balance --; column 11, line 72, for "realy" read -- relay --; column 12, line 24, for "rest" read -- reset --; column 13, line 67, after "until" insert -- after --; column 14, line 4, for "followed" read -- follower --; column 15, line 74, for "then" read -- thus --; column 20, line 29, for "followed" read -- follower --; line 68, for "6-28" read -- 6-88 --; column 27, line 2, strike out "timing pulse", second occurrence; column 29, line 74, for "systeresis" read -- hysteresis --; column 34, lines 28 and 29, for "accumula" read -- accumulator --; column 39, line 10, for "informcation" read -- information --; line 58, after "pick" insert -- up --; column 40, line 17, for "type" read -- typed --; column 42, line 37, for "seelcted" read -- selected --; column 46, line 39, for "hghest" read -- highest --; line 61, for "denfiing" read -- defining --; column 52, line 4, for "positons" read -- positions --; line 12, for "digt" read -- digit --; column 54, line 9, after "for" insert -- controlling the initiation of each operation of said trans- --.

Signed and sealed this 5th day of June 1962.

SEAL)
.ttest:

RNEST W. SWIDER                                        DAVID L. LADD
ttesting Officer                                              Commissioner of Patents